(12) United States Patent
Sawada

(10) Patent No.: US 12,736,075 B2
(45) Date of Patent: Sep. 15, 2026

(54) COUPLING STRUCTURE AND COUPLING DEVICE

(71) Applicant: KYORITSU DIE CAST KAKOSHO CO.LTD., Hyogo (JP)

(72) Inventor: Akira Sawada, Hyogo (JP)

(73) Assignee: Kyoritsu Die Cast Kakosho Co. Ltd., Hyogo (JP)

( * ) Notice: Subject to any disclaimer, the term of this patent is extended or adjusted under 35 U.S.C. 154(b) by 63 days.

(21) Appl. No.: 18/911,896

(22) Filed: Oct. 10, 2024

(65) Prior Publication Data

US 2025/0092898 A1 Mar. 20, 2025

Related U.S. Application Data

(63) Continuation of application No. PCT/JP2023/031347, filed on Aug. 29, 2023.

(30) Foreign Application Priority Data

Aug. 31, 2022 (JP) ................................ 2022-138427
Oct. 13, 2022 (JP) ................................ 2022-165095
Nov. 7, 2022 (JP) ................................ 2022-178023
Feb. 15, 2023 (JP) ................................ 2023-021688
Aug. 25, 2023 (JP) ................................ 2023-137631
Aug. 29, 2023 (JP) ................................ 2023-138619

(51) Int. Cl.
*F16B 7/04* (2006.01)

(52) U.S. Cl.
CPC ................................ *F16B 7/0493* (2013.01)

(58) Field of Classification Search
CPC .. F16B 7/0493; F16B 1/02; F16B 2/06; F16B 2/18; F16B 5/10; F16B 7/04; B01L 9/00; F16M 11/12
USPC ......................... 248/161, 519, 518, 574, 575
See application file for complete search history.

(56) References Cited

U.S. PATENT DOCUMENTS 1,895,156 A * 1/1933 Fisher ...................... B01L 9/50 81/118
2,017,292 A * 10/1935 Porter .................... G03B 21/10 353/39
2,483,395 A * 10/1949 Benson ............... F16L 27/1274 285/902
2,521,406 A * 9/1950 Pinto ..................... F25D 31/002 62/297

(Continued)

FOREIGN PATENT DOCUMENTS

JP 2015-131111 B2 7/2015
JP 201776477 A 4/2017

*Primary Examiner* — Muhammad Ijaz
(74) *Attorney, Agent, or Firm* — Farber LLC

(57) ABSTRACT

A coupling device has a support groove that, in a state in which the coupling device is attached to a first shaft-shaped section, allows a member having a shaft shape to be inserted therein in a direction crossing the first shaft-shaped section. The coupling device can fix, to the support groove, a second shaft-shaped section of a tool such as a clamp, which is a supported object, by using a second direction fixing screw while the second shaft-shaped section passes through the support groove. The coupling device can perform coupling to the second shaft-shaped section by means of a second coupling section which is formed by using the support groove and the second direction fixing screw.

5 Claims, 42 Drawing Sheets

(56) References Cited

U.S. PATENT DOCUMENTS

| | | | | | |
|---|---|---|---|---|---|
| 2,559,317 | A * | 7/1951 | Perlstein | B01L 9/00 | 126/30 |
| D235,478 | S * | 6/1975 | Armbruster | D15/140 | |
| 3,935,884 | A * | 2/1976 | Hazelton | B65B 1/22 | 141/80 |
| 4,770,746 | A * | 9/1988 | Mayo | B01D 3/4205 | 202/205 |
| 5,108,066 | A * | 4/1992 | Lundstrom | F16M 11/28 | 285/902 |
| 6,179,514 | B1 * | 1/2001 | Cheng | F16L 37/08 | 285/902 |
| 6,309,603 | B1 * | 10/2001 | Locke | B67B 7/02 | 81/3.55 |
| 6,551,464 | B1 * | 4/2003 | Kimel | B01D 3/04 | 202/160 |
| 6,663,060 | B1 * | 12/2003 | Gifford, Sr. | F16M 11/28 | 248/161 |
| 7,086,631 | B2 * | 8/2006 | Lee | F16M 11/26 | 248/407 |
| 7,611,104 | B1 * | 11/2009 | Gifford, Sr. | F16M 11/28 | 248/176.3 |
| 7,628,360 | B2 * | 12/2009 | Anthes | F16M 11/28 | 248/161 |
| 8,308,123 | B1 * | 11/2012 | Accordino | A45B 23/00 | 248/220.21 |
| 8,496,217 | B2 * | 7/2013 | Cerezo Lotina | B61D 45/00 | 248/351 |
| 8,579,242 | B2 * | 11/2013 | Huang | F16M 11/10 | 248/161 |
| 11,208,819 | B2 * | 12/2021 | MacKarvich | E04G 25/04 | |
| D1,008,331 | S * | 12/2023 | Wu | D16/131 | |
| D1,040,880 | S * | 9/2024 | Wu | D16/136 | |
| D1,044,903 | S * | 10/2024 | Jiang | D16/136 | |
| 12,522,784 | B2 * | 1/2026 | Xu | C11D 17/00 | |
| 2008/0265120 | A1 * | 10/2008 | Altshuler | G02B 21/26 | 248/405 |
| 2019/0003896 | A1 * | 1/2019 | Maulder | G01D 11/30 | |
| 2024/0043773 | A1 * | 2/2024 | Xu | C11D 17/00 | |
| 2025/0092898 | A1 * | 3/2025 | Sawada | F16B 2/06 | |

* cited by examiner

FIG. 12
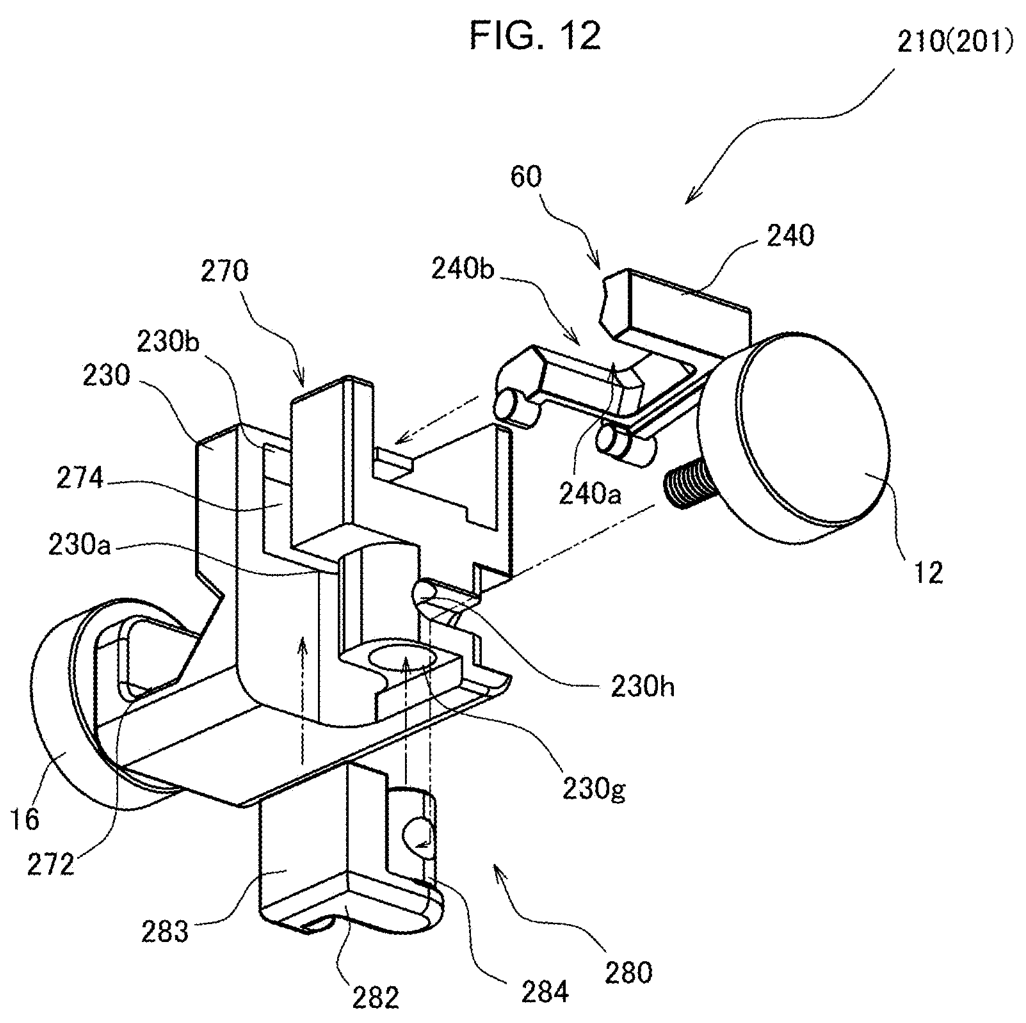

FIG. 26(a)
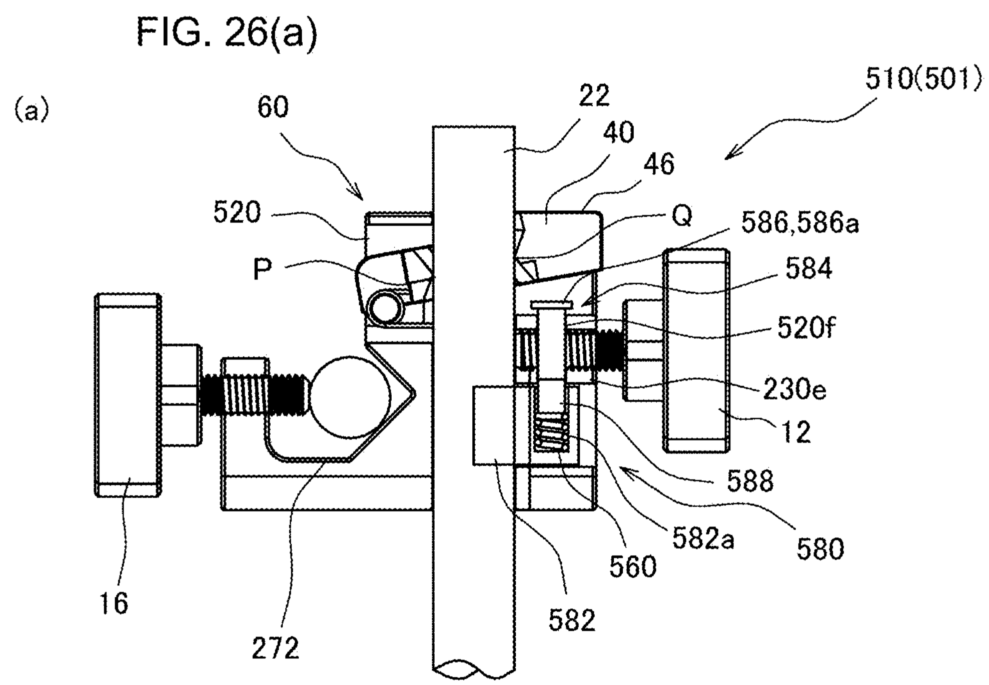
FIG. 26(b)
FIG. 26(c)
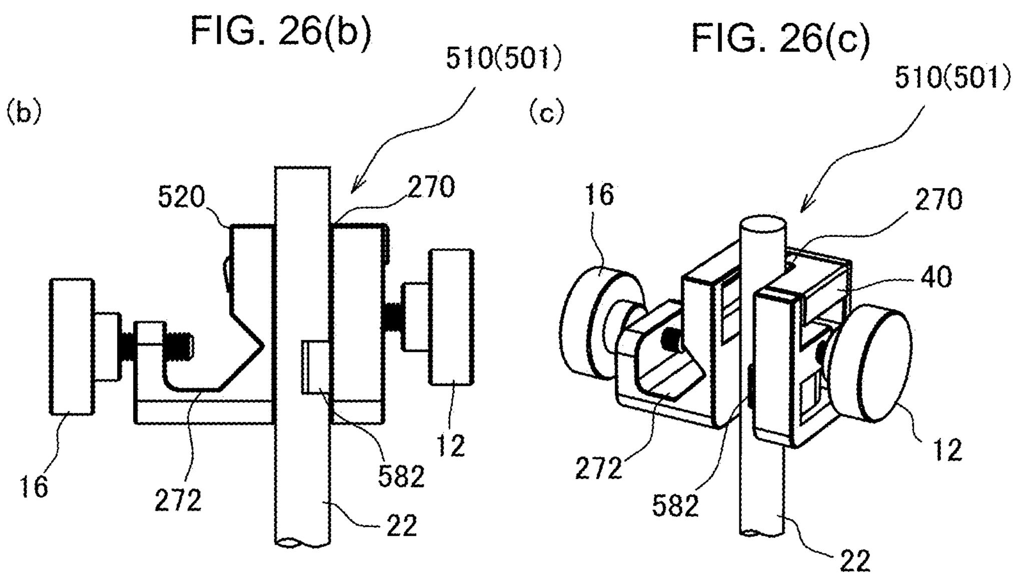

FIG. 27(a)
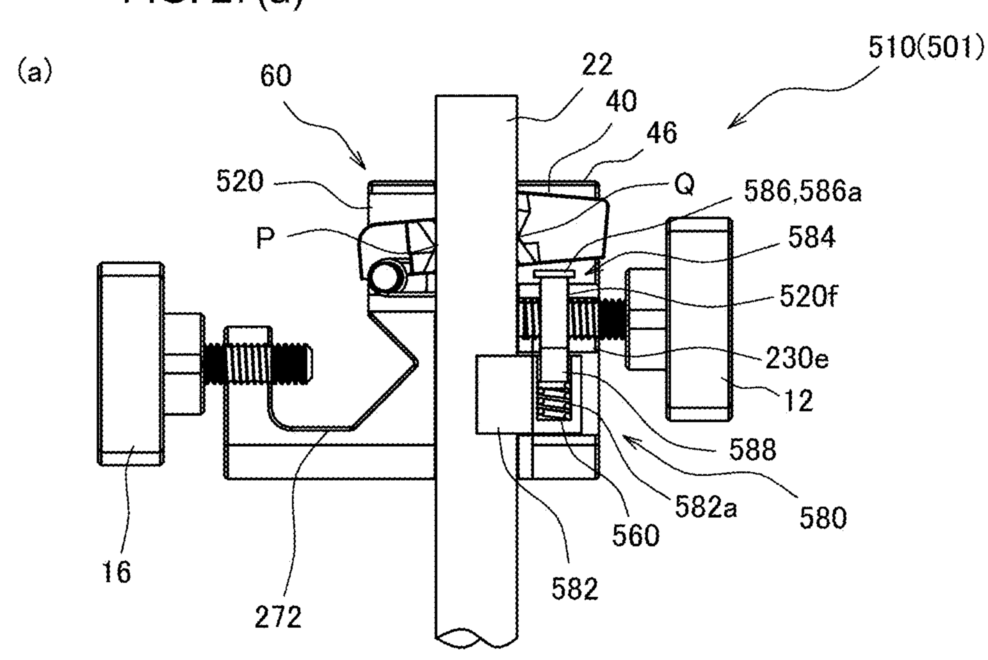
FIG. 27(b)
FIG. 27(c)
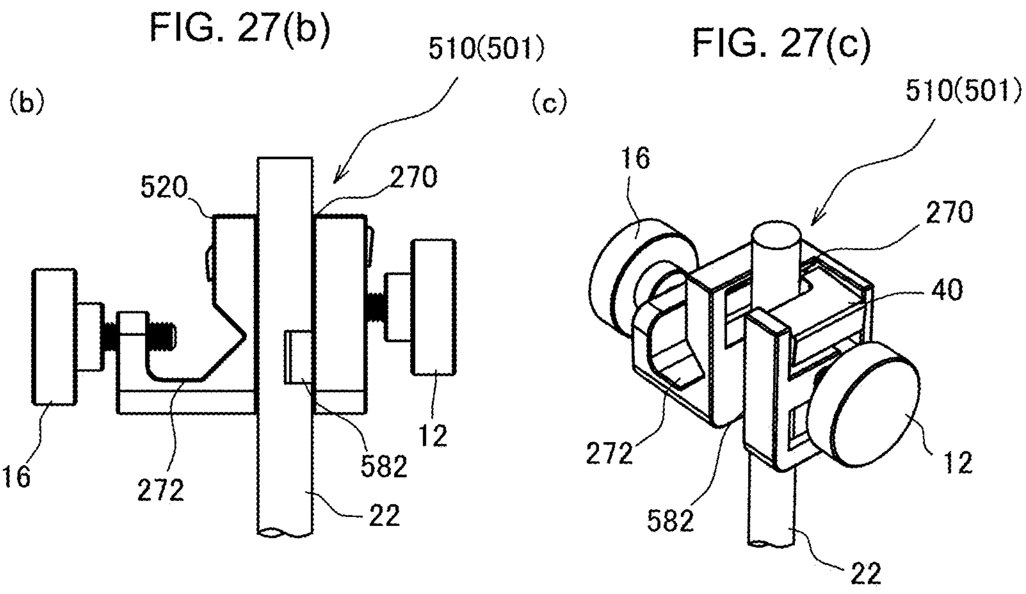

FIG. 28(a)
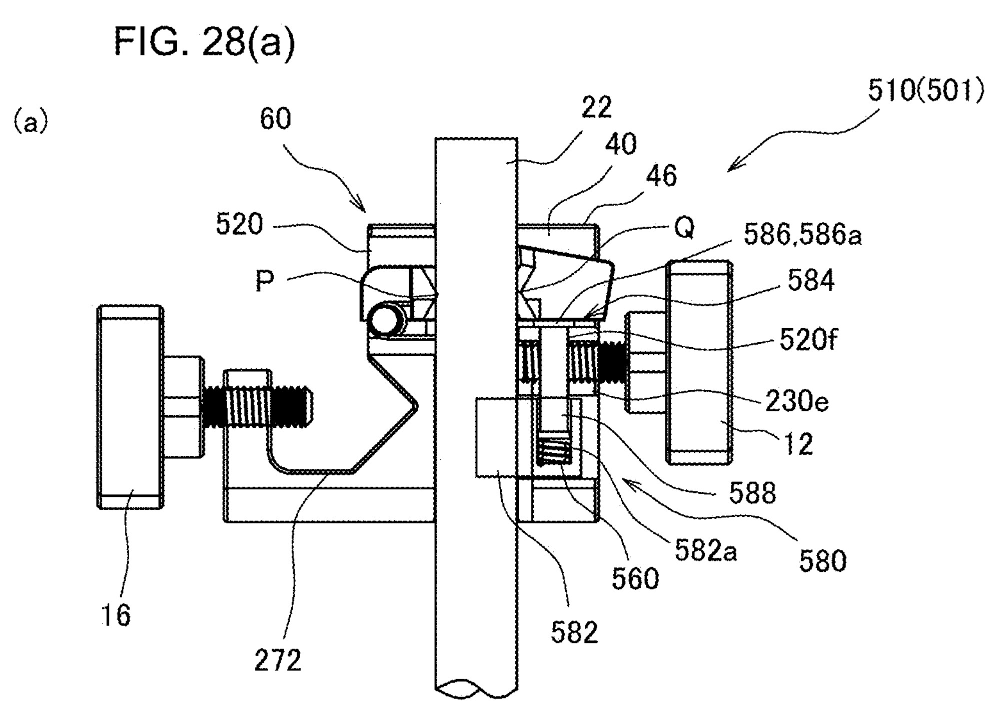
FIG. 28(b)
FIG. 28(c)
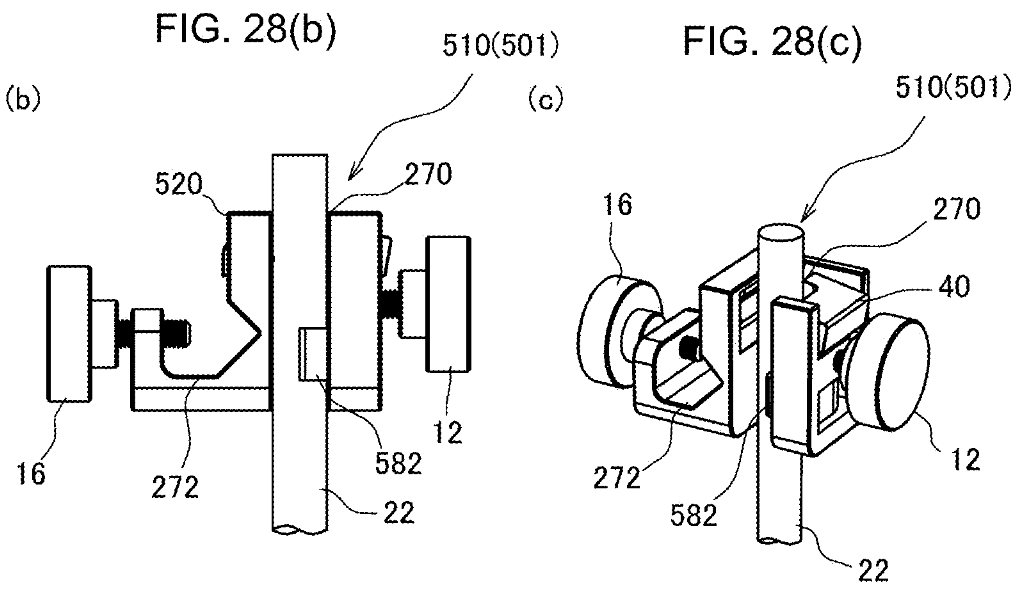

FIG. 29(a)
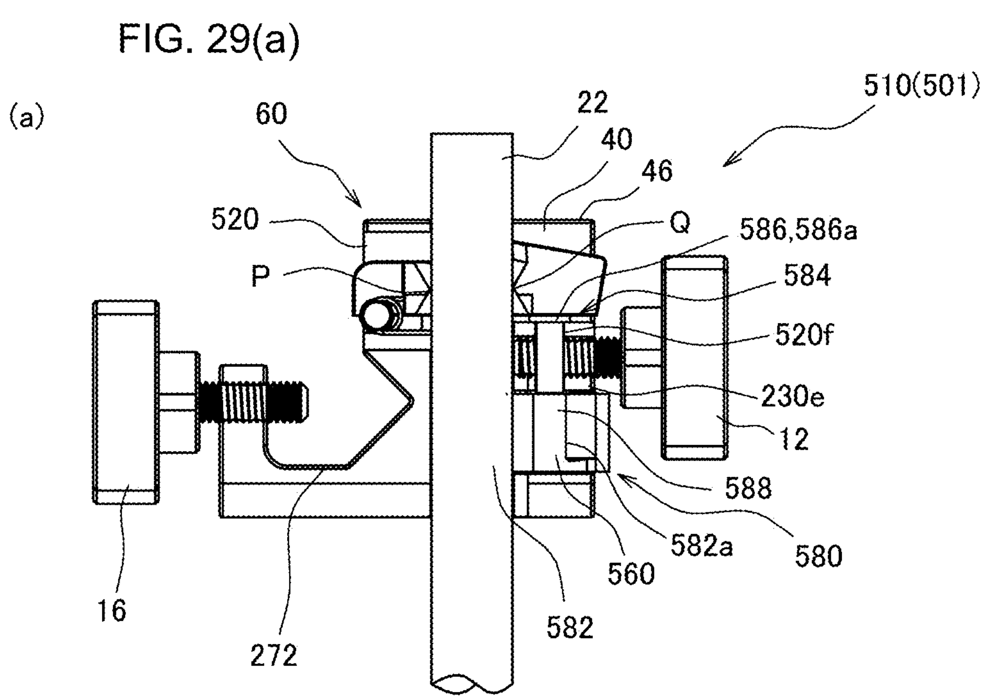
FIG. 29(b)
FIG. 29(c)
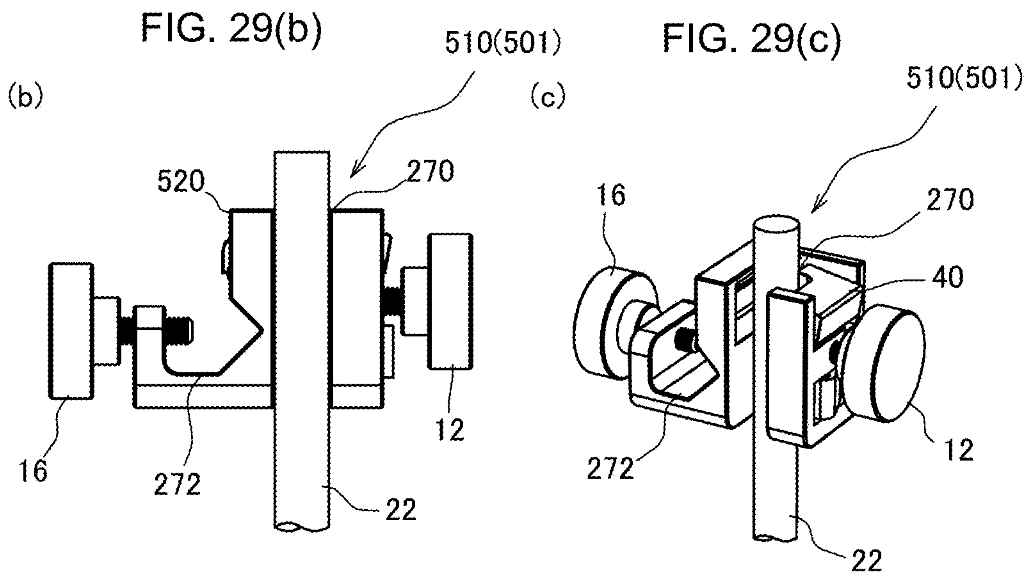

(a)

22
684
640
640a
B
44
682
682b
684a
686
686a (b)

(a)
682c
682a
682
640
44
682c 684
686f
682c
682a
682
686d
640,686a
686p
686e
686b
44
682c
686f 686d
682c
682a
684p
682
684f
684
686f
684e
684d
640,684a,686a
686
44
686p
682c
686f (a)
640
A
682
44
22
601, 610

(b)
684
686
682b
(c)
684
682b
686
22
684a
686a (d)
684
22
(e)
684a
684

(f)
686
22

(g)
686a
686

601,610
640
B
682
44
22

684
686
682b 684
684a
22
686
686a 684
22

684p
684d
684
22

684p
684d
684
22

686
22

686
686d
686p
22

686
686d
686p
22

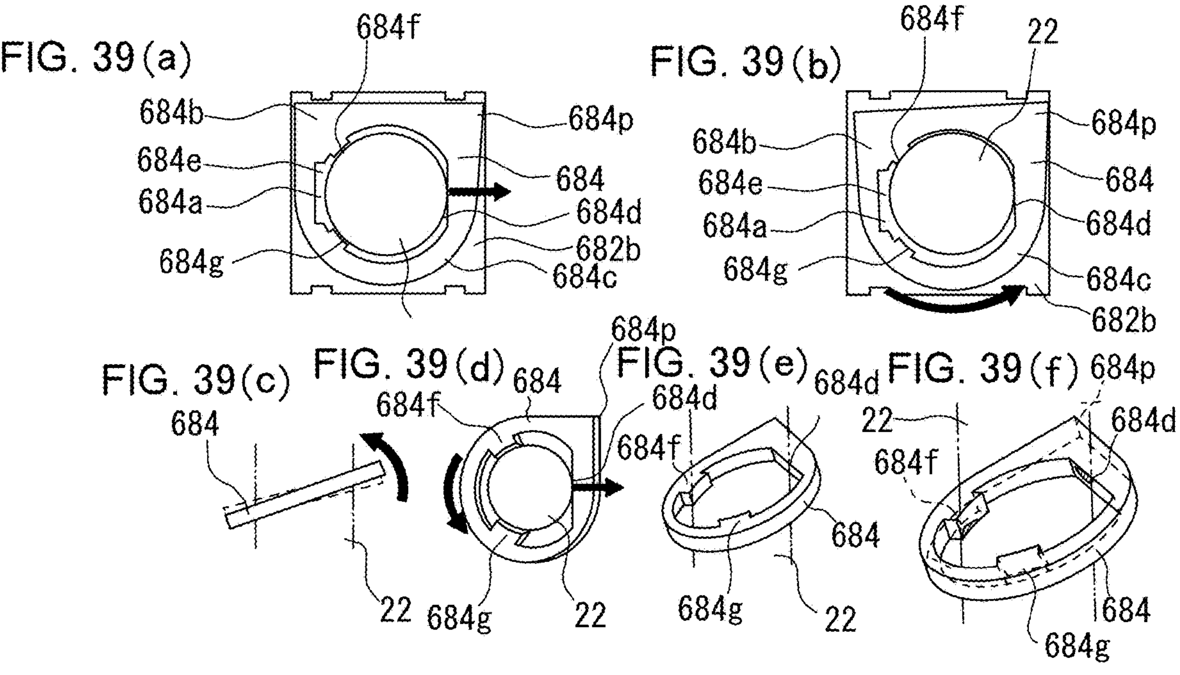
FIG. 39(a)
684f
684b
684p
684e
684
684a
684d
682b
684g
684c
FIG. 39(b)
684f
22
684p
684b
684
684e
684d
684a
684c
684g
682b
FIG. 39(c)
684
22
FIG. 39(d)
684p
684
684f
684d
684g
22
FIG. 39(e)
684d
684f
684
684g
22
FIG. 39(f)
684p
22
684d
684f
684
684g
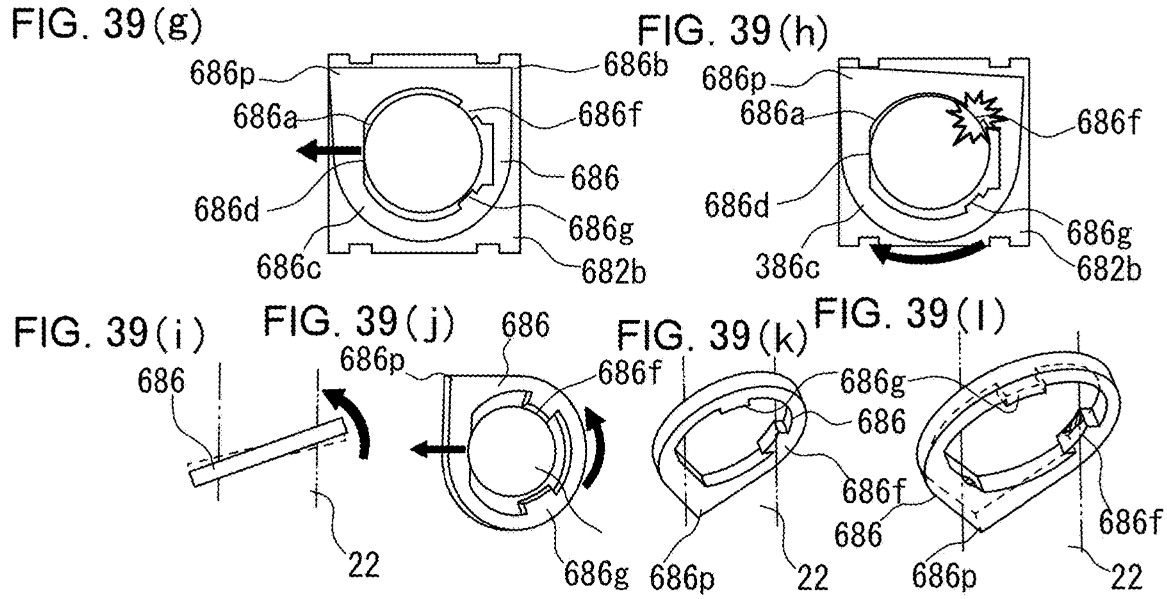
FIG. 39(g)
686p
686b
686a
686f
686
686d
686g
686c
682b
FIG. 39(h)
686p
686a
686f
686d
686g
386c
682b
FIG. 39(i)
686
22
FIG. 39(j)
686
686p
686f
686g
FIG. 39(k)
686g
686
686f
686p
22
FIG. 39(l)
686
686f
686p
22

684p
684d
684f
684
684g
22

684p
684d
684f
684
684g
22

684p
684d
684g
684
684f
22

684d
684p
684g
684
684f
22

686g
686
686f
686d
686p
22

686
686g
686f
686d
686p
22

686g
686f
686
686p
22

686
686g
686f
686p
22

684p
684d
684f
684g
684
22

684p
684d
684g
684
684f
22

684p
684d
684f
684
684g
22

684p
684d
684g
684
684f
22

686g
686
686f
686d
22
686p 686g
686f
22
686d
686p 686g
686
686f
686d
686p
22

686g
686f
22
686d
686p 684
686
22

COUPLING STRUCTURE AND COUPLING DEVICE

FIELD OF THE INVENTION

The present invention relates to a coupling structure and a coupling device.

BACKGROUND OF THE INVENTION

Conventionally, as a tool used in a physicochemical experiment, etc., there is a tool having a shaft-like part like a clamp disclosed in Japanese Published Unexamined Patent Application No. 2021-205112 (Patent Literature 1). As a member for coupling such a tool to a shaft-shaped portion that configures a separately prepared support device (stand), etc., a member is provided such as a holder disclosed in Patent Literature 1.

Specifically, in the prior art, a coupling device (holder in Patent Literature 1) called a muff, etc., is installed by fixing to a pipe fixed to a support device with a fixing screw at a predetermined position in the axis direction. The coupling device of the prior art has a support groove formed in a V-shape, and is used by fixing a shaft-shaped part (hereinafter, also referred to as a "shaft-shaped member") such as a clamp, which is an object of support, with a fixing screw while making the shaft-shaped member pass through the groove in the front-rear direction.

Patent Literature 1: Japanese Published Unexamined Patent Application No. 2021-205112.

SUMMARY OF THE INVENTION

Here, an operation of adjusting a position of an experimental object including an experimental tool such as a flask or a test tube held by the tool such as the clamp supported by the support device (stand) via the coupling device of the prior art described above is performed by loosening the fixing screw. In a case of adjusting a position in the front-rear direction, even if the fixing screw is loosened, the fixing screw is caught by the support groove of the support member, so that a stationary state can be maintained without fall, etc. However, in a case of adjusting the position in the up and down direction, when the fixing screw is loosened, a load in the falling direction acts. At this time, a load that is unexpected to a user acts, and there is a concern that the experimental tool may fall.

Also, in the coupling device of the prior art, even if the fixing screw is loosened, the coupling device, the experimental tool supported by the coupling device, and the experimental object may not fall immediately. Specifically, when the coupling device is inclined due to a load of the experimental object, the coupling device interferes with the pipe on the support device side at two points on the upper side and the lower side of the coupling device and is brought into a pried state, and the coupling device may not fall even if an operator releases his/her hand. In the coupling device of the prior art, there is a concern that the user becomes arrogant when such a state occurs and performs work, etc., without fixing the coupling device. On the other hand, in a state in which the coupling device and the pipe interfere with each other and are brought into a pried state as described above, the pried state described above can be resolved only by a slight impact or vibration acting on the coupling device, so that there is a concern that the experimental tool may fall unexpectedly.

Therefore, an object of the present invention is to realize a coupling structure capable of suppressing a fall that is unexpected to a user, and a coupling device including the coupling structure.

A coupling structure of the present invention provided in order to solve the problem described above and a coupling device including the coupling structure capable of coupling a support object, which is an object of support, to a support device that supports the support object, the coupling structure and the coupling device being characterized by including a lock mechanism capable of switching between a locked state in which axial movement of a shaft-shaped portion of shaft shape provided in the support device is suppressed and an unlocked state in which the axial movement is permitted, the coupling structure and the coupling device being characterized in that the lock mechanism includes a control body (also referred to as a first control body, a second control body/"control bodies" simply) that includes a shaft insertion portion (also referred to as a second shaft insertion portion/"shaft insertion portion" simply) into which the shaft-shaped portion is inserted and that is made swingable with respect to the shaft-shaped portion in a state in which the shaft-shaped portion is inserted into the shaft insertion portion, and a biasing member that exerts a bias force in the direction of swinging the control body inserted into the shaft insertion portion, and when the control body swings due to an influence of the bias force by the biasing member, and the control body swings about a swing axis intersecting an axis of the shaft-shaped portion while turning in the direction around the axis of the shaft-shaped portion inserted into the shaft insertion portion, and interferes with the shaft-shaped portion and is brought into a pried state, the coupling structure and the coupling device are brought into the locked state.

According to the present invention, it is possible to realize a coupling structure that solves the above problem and a coupling device including the coupling structure. The present invention can be favorably utilized over the coupling device in general which can be favorably utilized for installing various devices, instruments, tools, etc., for example for physicochemical experiments and other suitable uses.

BRIEF DESCRIPTION OF THE DRAWINGS

FIG. 4 is an exploded perspective view of the coupling device illustrated in FIG. 3.

FIG. 5(*a*) and FIG. 5(*b*) are cross-sectional views illustrating a use state of the coupling device illustrated in FIG. 1, in which FIG. 5(*a*) illustrates a locked state and FIG. 5(*b*) illustrates an unlocked state.

FIG. 12 is an exploded perspective view of the coupling device according to the second embodiment of the present invention.

FIG. 18 is a cross-sectional view of the coupling device according to the third embodiment.

Figure 22:
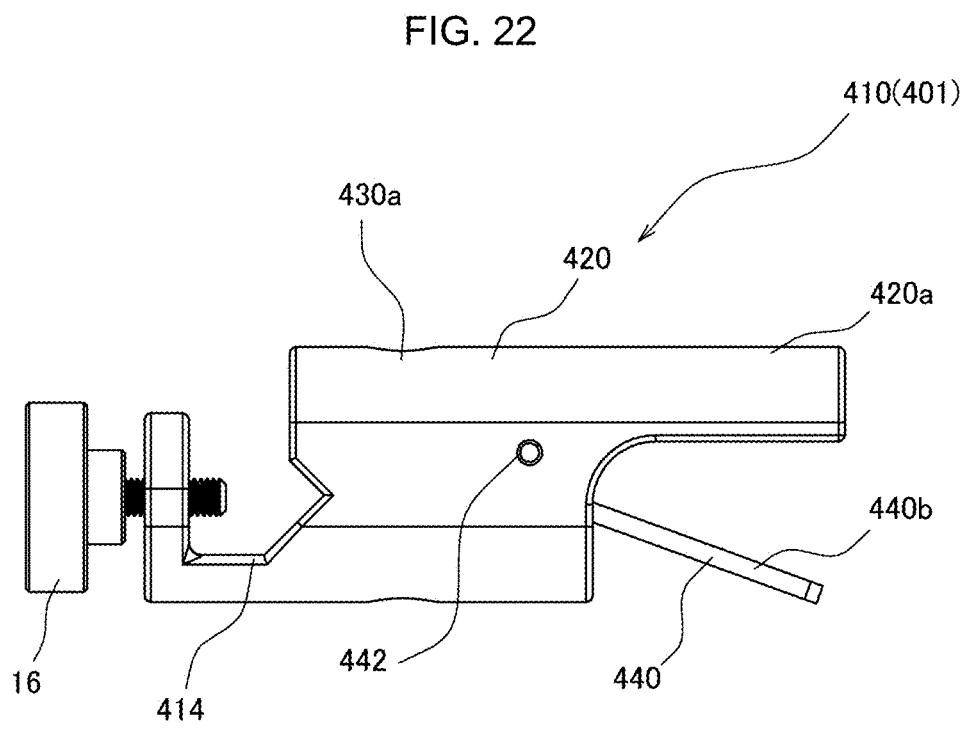

FIG. 22 is a front view of the coupling device according to the fourth embodiment.

FIG. 26(*a*) to FIG. 26(*c*) are views illustrating a state in which the coupling device according to the fifth embodiment is fixed to a shaft-shaped portion, in which FIG. 26(*a*) is a cross-sectional view, FIG. 26(*b*) is a side view, and FIG. 26(*c*) is a perspective view.

FIG. 27(*a*) to FIG. 27(*c*) are views illustrating a state of the coupling device according to the fifth embodiment, in which fixing in the axis direction of the shaft-shaped portion is cancelled and movement in the direction intersecting the axis direction is regulated, in which FIG. 27(*a*) is a cross-sectional view, FIG. 27(*b*) is a side view, and FIG. 27(*c*) is a perspective view.

FIG. 28(*a*) to FIG. 28(*c*) are views illustrating a state during an operation of the coupling device according to the fifth embodiment, in which the fixing in the axis direction of the shaft-shaped portion is cancelled and regulation of the movement in the direction intersecting the axis direction by a falling-off suppression mechanism is cancelled, in which FIG. 28(*a*) is a cross-sectional view, FIG. 28(*b*) is a side view, and FIG. 28(*c*) is a perspective view.

FIG. 29(*a*) to FIG. 29(*c*) are views illustrating a state of the coupling device according to the fifth embodiment, in which the fixing in the axis direction of the shaft-shaped portion is cancelled and the regulation of the movement in the direction intersecting the axis direction by the falling-off suppression mechanism is cancelled, in which FIG. 29(*a*) is a cross-sectional view, FIG. 29(*b*) is a side view, and FIG. 29(*c*) is a perspective view.

FIG. 39(*a*) is a plan view illustrating a first abutting state in which the first control body receives a pressing force from the shaft-shaped portion due to an influence of a bias force in the coupling device according to the sixth embodiment, FIG. 39(*b*) is a plan view illustrating a second abutting state in which the first control body turns from the state according to FIG. 39(*a*), FIG. 39(*c*) is a side view illustrating an action of the first control body with respect to the shaft-shaped portion, FIG. 39(*d*) is a plan view illustrating an action of the first control body with respect to the shaft-shaped portion, FIG. 39(*e*) is a perspective view illustrating the relationship between the first control body and the shaft-shaped portion, FIG. 39(*f*) is a perspective view viewed from an angle different from FIG. 39(*e*), FIG. 39(*g*) is a plan view illustrating the first abutting state in which the second control body receives a pressing force from the shaft-shaped portion due to the influence of the bias force, FIG. 39(*h*) is a plan view illustrating the second abutting state in which the second control body turns from the state according to FIG. 39(*g*), FIG. 39(*i*) is a side view illustrating an action of the second control body with respect to the shaft-shaped portion, FIG. 39(*j*) is a plan view illustrating an action of the second control body with respect to the shaft-shaped portion, FIG. 39(*k*) is a perspective view illustrating the relationship between the second control body and the shaft-shaped portion, and FIG. 39(*l*) is a perspective view viewed from an angle different from FIG. 39(*k*).

DETAILED DESCRIPTION OF THE PREFERRED EMBODIMENTS

Figure 1:
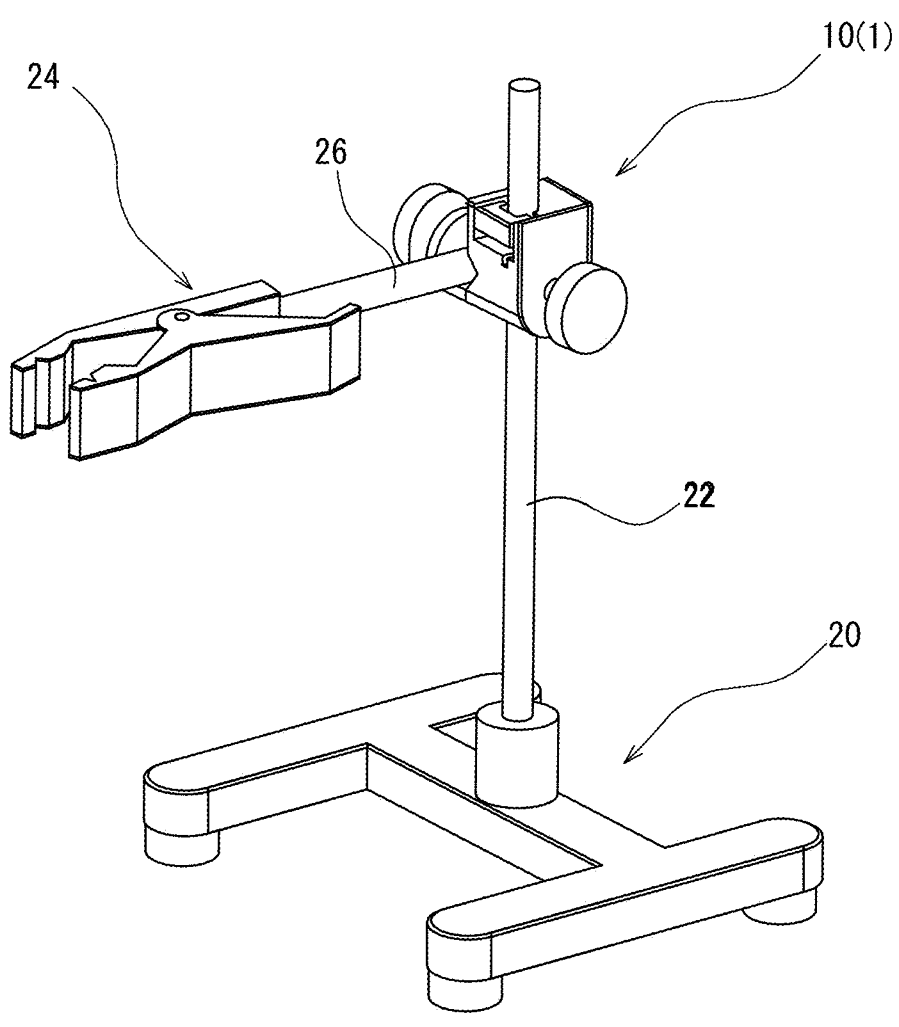
FIG. 1 is a perspective view illustrating a use state of a coupling device according to a first embodiment of the present invention.

Hereinafter, a coupling device 10 and a coupling structure 1 according to a first embodiment of the present invention will be described in detail with reference to the drawings. In the following description, first, characteristic configurations of the coupling device 10 and the coupling structure 1 will be described, and then a specific example of the coupling device 10 will be described.

Characteristic Configurations of Coupling Device 10 and Coupling Structure 1 according to the First Embodiment: FIG. 1 to FIG. 6 exemplify the coupling device 10 and the coupling structure 1 that configures the coupling device. The coupling device 10 couples a support object 24, which is an object of support, to a support device 20 that supports the support object 24 by being placed between the support object 24 and the support device 20. The coupling device 10 includes a first coupling portion 70 and a second coupling portion 72. The first coupling portion 70 is a part to be coupled to a first shaft-shaped portion 22 of shaft shape provided in the support device 20. The second coupling portion 72 is a part to be coupled to a second shaft-shaped portion 26 of shaft shape provided in the support object 24. In the coupling device 10, any one of or both of the first coupling portion 70 and the second coupling portion 72 are configured by the coupling structure 1. In the present embodiment, the first coupling portion 70 is configured by the coupling structure 1. The coupling structure 1 includes a lock mechanism 60.

The lock mechanism 60 is a mechanism for making switchable between a locked state in which axial movement of the first shaft-shaped portion 22 of shaft shape provided in the support device 20 is suppressed, and an unlocked state in which the axial movement is permitted. The lock mechanism 60 has a main body portion 30 (accommodating portion), a stopper member 40, and a biasing member 50.

Figure 2:
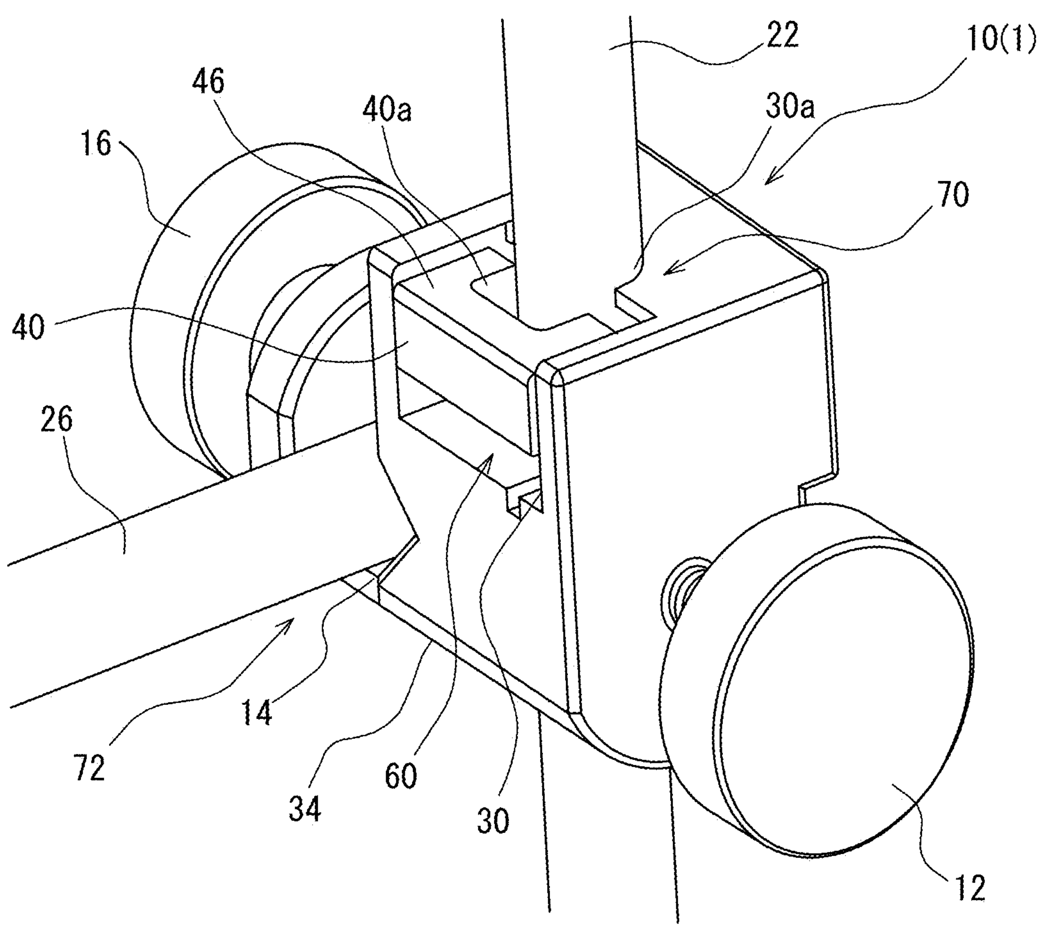
FIG. 2 is an enlarged view of a main part of FIG. 1.
Figure 3:
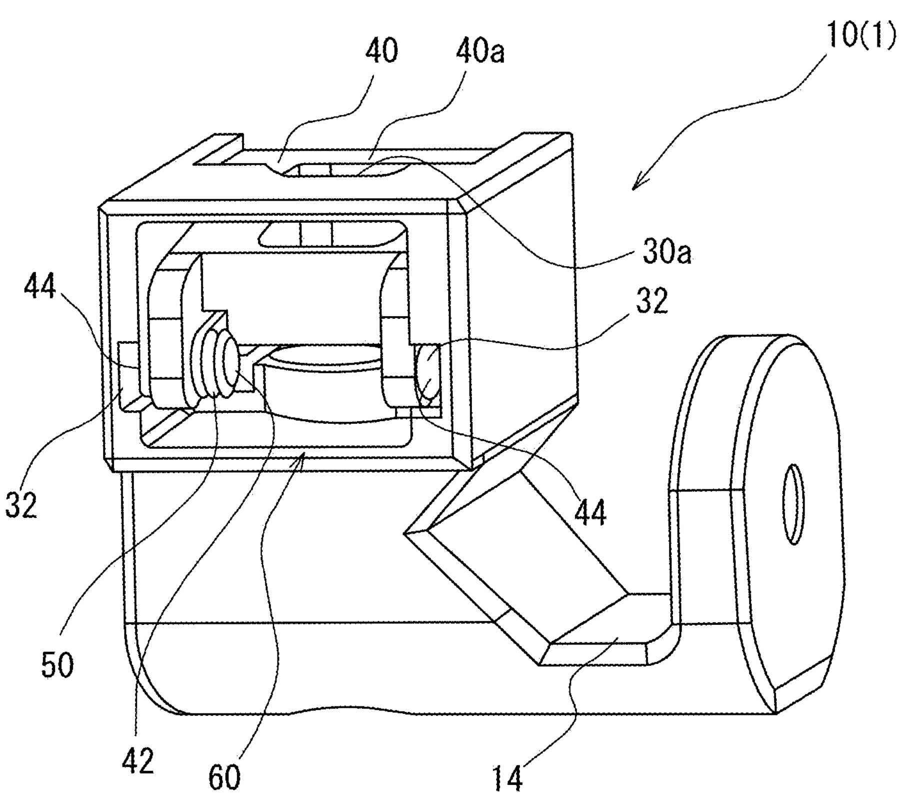
FIG. 3 is a perspective view illustrating the coupling device illustrated in FIG. 1.
Figure 4:
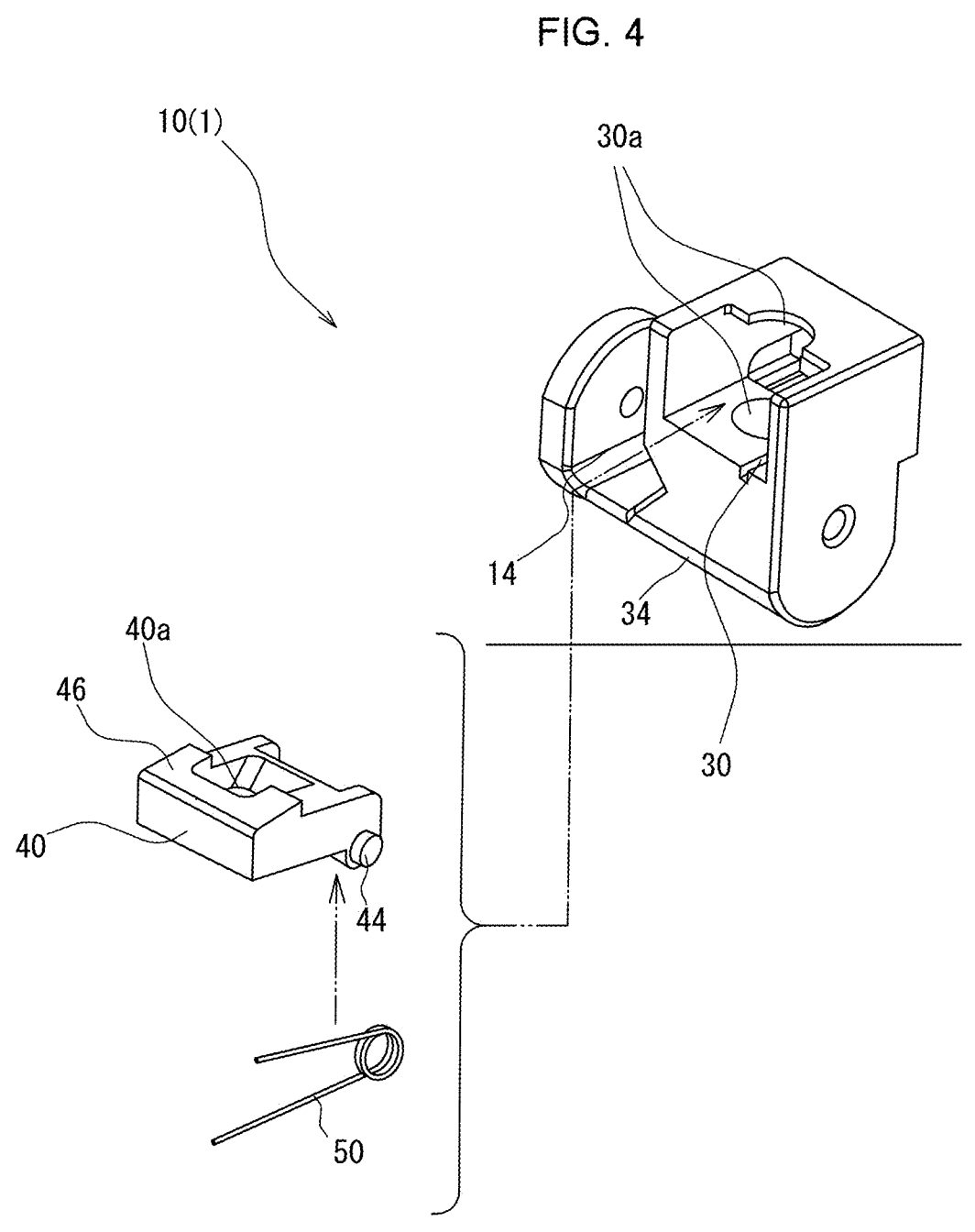

The main body portion 30 configures the accommodating portion to which the stopper member 40 and the biasing member 50 are assembled. The main body portion 30 has a first shaft insertion portion **30*a* (main body shaft insertion portion) into which the first shaft-shaped portion 22 is inserted. The main body portion 30 swingably supports the stopper member 40. As illustrated in FIG. 2 and FIG. 4, an opposing portion 34 is provided in the main body portion 30. With respect to a pressing portion 46 of the stopper member 40 to be described later, the opposing portion 34 is positioned on the opposite side of the acting direction of a pressing force to be acting on the pressing portion 46**.

The stopper member 40 includes a second shaft insertion portion **40*a* (lock mechanism shaft insertion portion) into which the first shaft-shaped portion 22 is inserted. In a state in which the first shaft-shaped portion 22 is inserted into the second shaft insertion portion 40*a*, it is made swingable with respect to the second shaft insertion portion 40*a*. The pressing portion 46 is provided in the stopper member 40. The pressing portion 46 is a part where a user makes the pressing force act on the stopper member 40**.

The biasing member 50 biases the stopper member 40 in the axis direction of the first shaft-shaped portion 22 inserted into the second shaft insertion portion **40*a***.

The lock mechanism 60 is capable of switching between the locked state and the unlocked state. Specifically, the lock mechanism 60 is brought into the locked state (locked state) with respect to the shaft-shaped portion when, in a state in which the first shaft-shaped portion 22 is inserted into both the first shaft insertion portion 30*a* and the second shaft insertion portion 40*a*, the stopper member 40 is biased in the axis direction by the biasing member 50, and the stopper member 40 is brought into contact with the first shaft-shaped portion 22 at a first contact portion P and a second contact portion Q which is placed on the opposite side of the first contact portion P across an axial center position of the first shaft-shaped portion 22 and separated from the first contact portion P in the axis direction. Meanwhile, the lock mechanism 60 is brought into the state (lock cancelled state) in which contact at the first contact portion P and the second contact portion Q is cancelled by pressing and swinging the stopper member 40 against a bias force by the biasing member 50 in the locked state.

In the coupling device 10 (coupling structure 1), it is possible to perform a pressing operation in which the user makes the pressing force act on the stopper member 40 while gripping with one hand when the user places his/her first finger (for example, his/her index finger) onto the pressing portion 46 and places his/her finger different from the first finger (for example, a thumb) onto the opposing portion 34.

Specific Example of Coupling Device 10 and Coupling Structure 1 according to First Embodiment: Hereinafter, the specific example of the coupling device 10 and the coupling structure 1 according to the first embodiment will be described.

FIG. 1 is a perspective view illustrating a use state of the coupling device 10 according to the present embodiment. The coupling device 10 has a configuration as illustrated in FIG. 2 to FIG. 6. The coupling device 10 is used in a state in which the axial movement of the first shaft-shaped portion 22 is regulated by the lock mechanism 60 to be described in detail later by inserting the first shaft-shaped portion 22 (pipe) fixed to the support device 20 (stand) to stand, while the coupling device 10 is fixed by a first direction fixing screw 12 at a predetermined position of the first shaft-shaped portion 22. That is, the coupling device 10 can be coupled to the first shaft-shaped portion 22 by the first coupling portion 70 configured by using the lock mechanism 60.

Also, the coupling device 10 has a support groove 14 into which a shaft-shaped member is insertable toward the direction intersecting (in the present embodiment, the direction orthogonal to) the first shaft-shaped portion 22 in a state in which the coupling device 10 is attached to the first shaft-shaped portion 22. In the coupling device 10, while making the shaft-shaped part (second shaft-shaped portion 26) provided in a tool such as a clamp which is the support object 24 pass through the support groove 14, the second shaft-shaped portion 26 can be fixed by a second direction fixing screw 16. That is, the coupling device 10 can be coupled to the second shaft-shaped portion 26 by the second coupling portion 72 configured by using the support groove 14 and the second direction fixing screw 16.

With the coupling device 10, it is possible to couple the support object 24 to the support device 20 by coupling the first coupling portion 70 and the second coupling portion 72 described above to the first shaft-shaped portion 22 and the second shaft-shaped portion 26 while placing between the support object 24, which is the object of support, and the support device 20 for supporting the support object 24.

The coupling device 10 includes the lock mechanism 60, and even in a case where the first direction fixing screw 12 (up and down direction fixing screw) for fixing to the first shaft-shaped portion 22 is loosened, the stopper member 40 that forms the lock mechanism 60 interferes with the first shaft-shaped portion 22 and is brought into a pried state (locked state), and the coupling device 10 becomes static.

In a case where the lock mechanism 60 is in the locked state, the coupling device 10 is movable upward but immovable downward. In the coupling device 10, in a case where the lock mechanism 60 is in the locked state, by performing an operation of pressing in the stopper member 40 and bringing the lock mechanism 60 into the unlocked state, interference between the stopper member 40 and the first shaft-shaped portion 22 is cancelled, and insertion into the first shaft-shaped portion 22 and adjustment of an up-and-down position are made possible. The coupling device 10 can be used in a fixed state by bringing the lock mechanism 60 into the unlocked state and performing position adjustment in the axis direction of the first shaft-shaped portion 22, and then fastening the first direction fixing screw 12.

The coupling device 10 includes the lock mechanism 60 configured by assembling the main body portion 30, the stopper member 40, and the biasing member 50 configured by a kick spring as major constituent parts. At the time of assembling the coupling device 10, first, the biasing member 50 is inserted into and engaged with an inside projecting portion 42 provided inside the stopper member 40. Also, the coupling device 10 can be assembled by engaging an outside projecting portion 44 provided outside the stopper member 40 into which the biasing member 50 is inserted with an engagement groove 32 formed on an inside surface of the main body portion 30, and pushing the stopper member 40 into the main body portion 30 along the engagement groove 32.

When the coupling device 10 is assembled as described above, the biasing member 50 is placed between the stopper member 40 and the main body portion 30. Thereby, the bias force in the direction of pushing the stopper member 40 up always acts on the stopper member 40 by the biasing member 50.

Figures 5A, 5B:
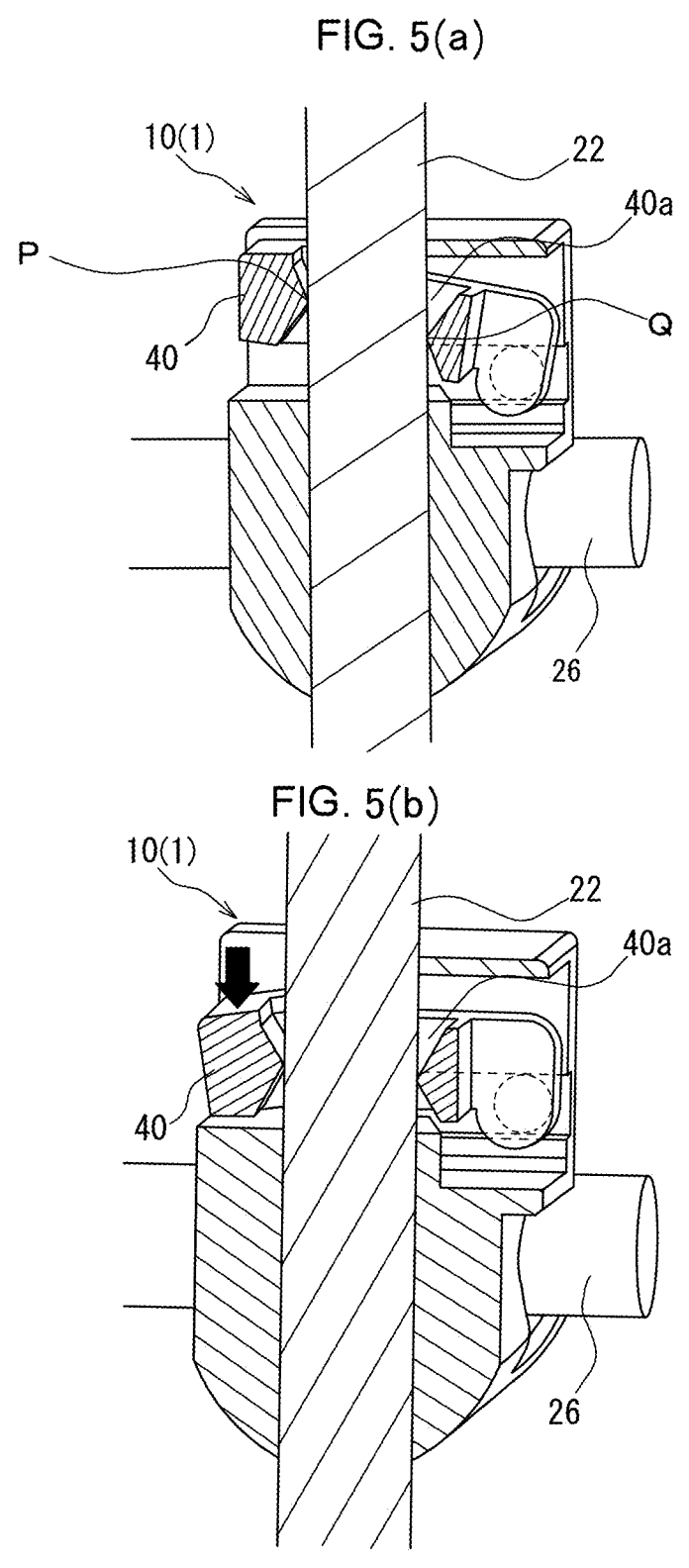
Figure 6A:
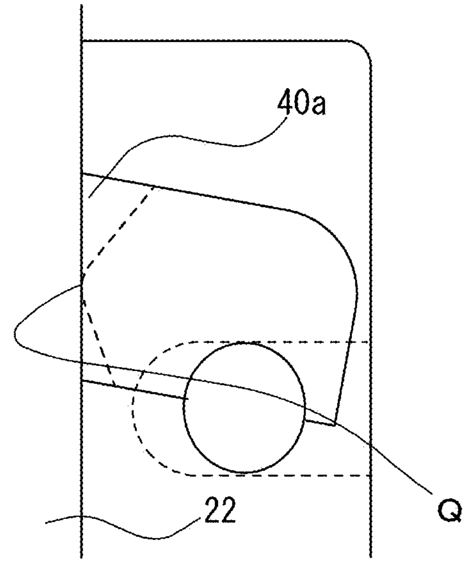
FIG. 6(*a*) and FIG. 6(*b*) are explanatory diagrams schematically illustrating a main part of the cross-sectional views illustrated in FIG. 5, in which FIG. 6(*a*) illustrates the locked state and FIG. 6(*b*) illustrates the unlocked state.
Figure 6B:
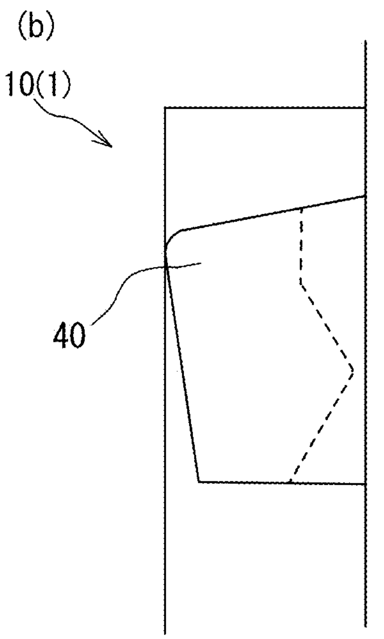
Figure 6B:
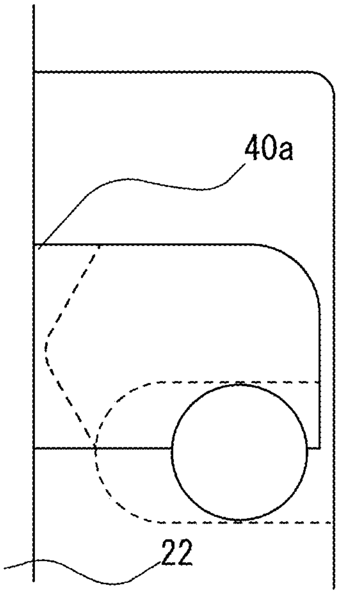

In the lock mechanism 60, in a state in which the first shaft-shaped portion 22 is inserted into the first shaft insertion portion 30*a* provided in the main body portion 30 and the second shaft insertion portion 40*a* provided in the stopper member 40, a state in which the stopper member 40 is always pushed against the first shaft-shaped portion 22 can be maintained. As illustrated in FIG. 5 and FIG. 6, the coupling device 10 is brought into the locked state when the stopper member 40 interferes with the first shaft-shaped portion 22 at two points and is brought into a pried state, the axial movement of the first shaft-shaped portion 22 is suppressed, and the coupling device 10 is brought into a static state. A falling force of the coupling device 10 is transmitted to the stopper member 40 as a force of pushing against the first shaft-shaped portion 22. Therefore, the coupling device 10 further less easily falls. Also, even when the coupling device 10 receives impact or vibration, the stopper member 40 interferes with the first shaft-shaped portion 22 at two points and maintains a pried state. Thus, the coupling device 10 less easily falls.

In the coupling device 10, by pushing in the stopper member 40 against the bias force by the biasing member 50, it is possible to bring the lock mechanism 60 into the unlocked state. That is, in the coupling device 10, by pushing in the stopper member 40 against the bias force by the biasing member 50 and swinging in the direction in which the stopper member 40 comes close to the horizontal direction, a clearance is formed between the first shaft-shaped portion 22 and the stopper member 40. Thereby, the coupling device 10 is brought into a state movable in the axis direction of the first shaft-shaped portion 22 without the stopper member 40 interfering with the first shaft-shaped portion 22. Also, the coupling device 10 has a structure in which even in a case where a hand of an operator is brought away by an unexpected load in a state in which the lock mechanism 60 is cancelled, the stopper member 40 is pushed back by the bias force by the biasing member 50 and the locked state is restored. Therefore, the coupling device 10 does not fall but instantaneously gets still.

Figure 13:
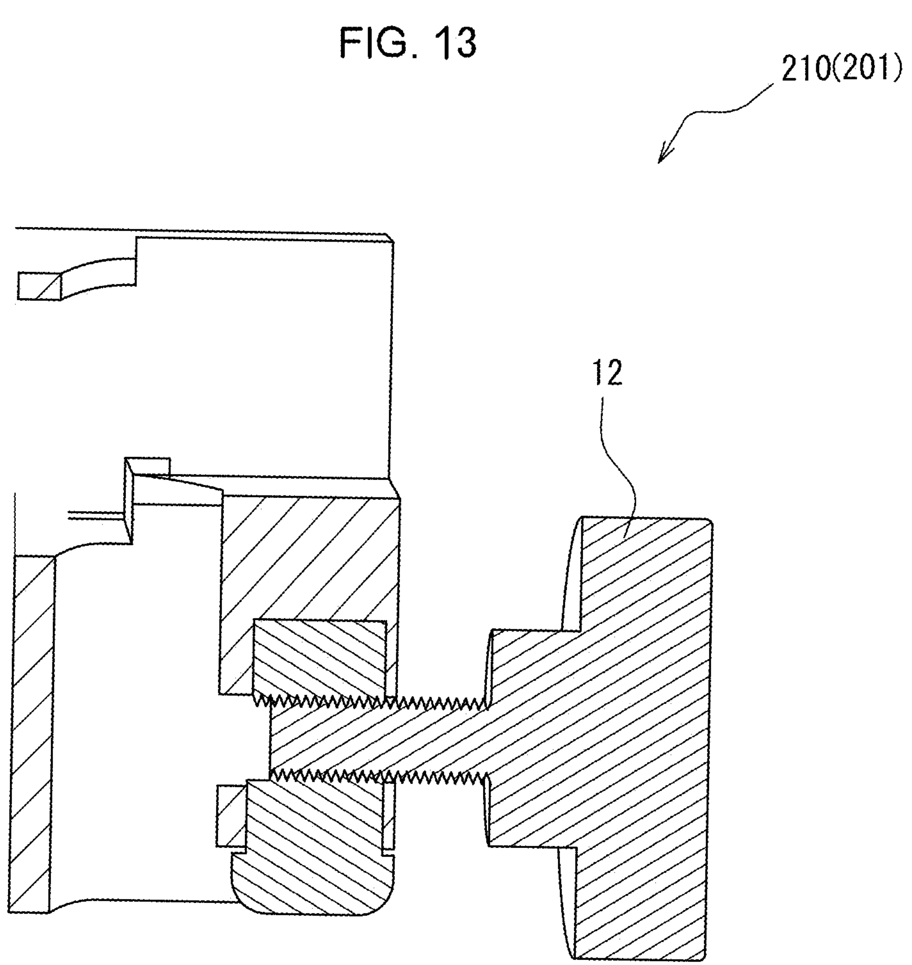
FIG. 13 is a cross-sectional view illustrating a use state of the coupling device illustrated in FIG. 9.
Figure 14:
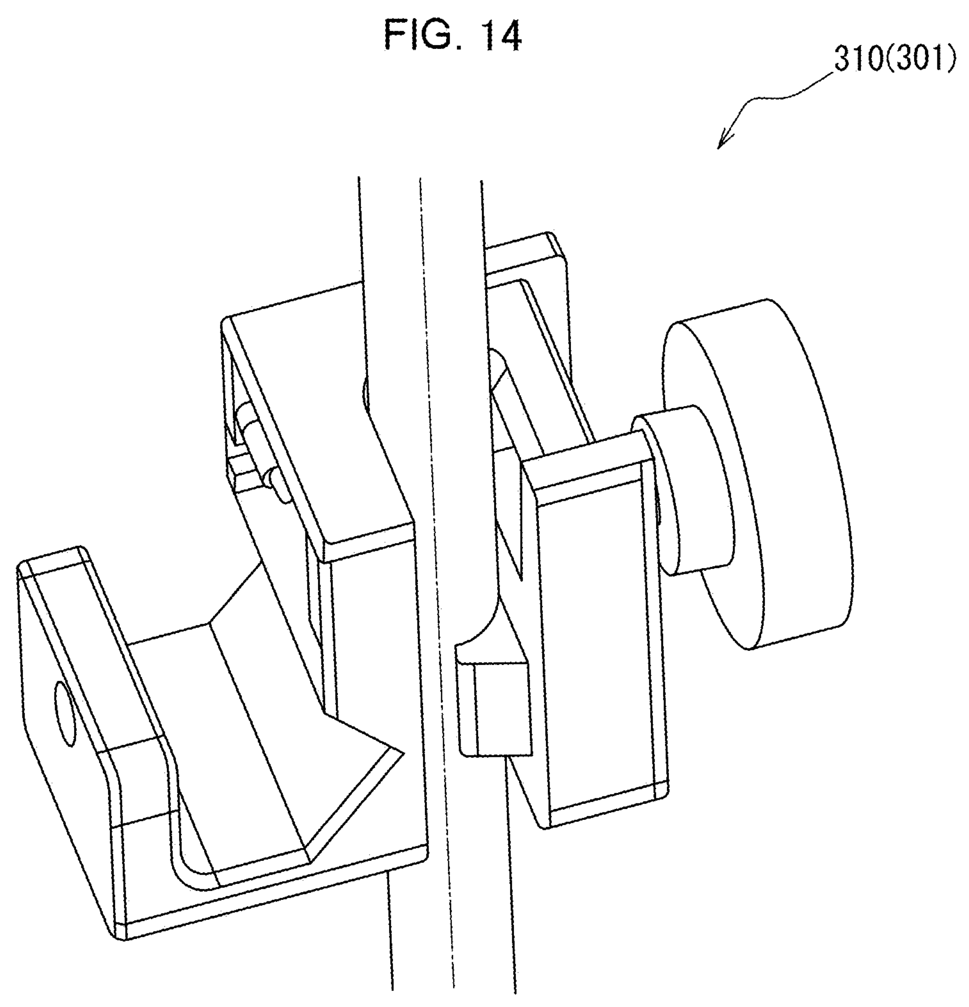
FIG. 14 is a perspective view illustrating a use state of a coupling device according to a third embodiment of the present invention.
Figure 15:
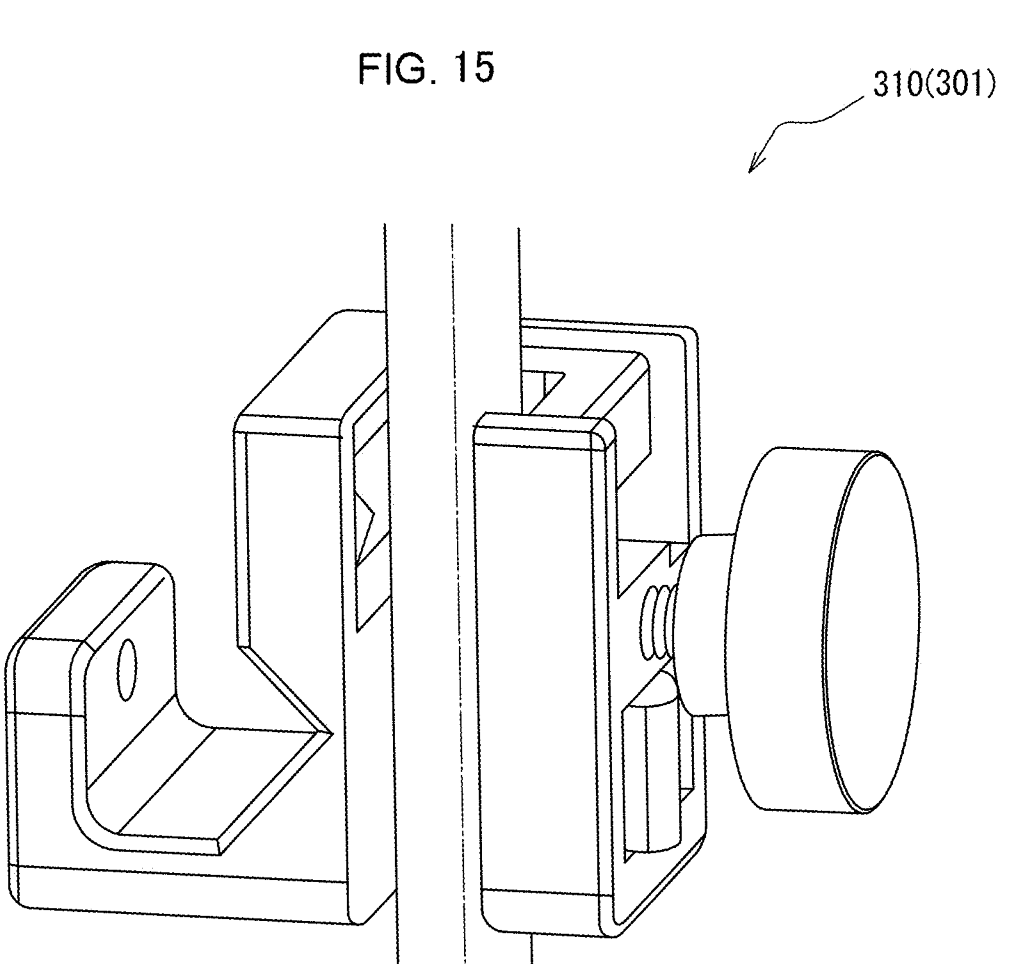
FIG. 15 is a perspective view illustrating a use state of the coupling device according to the third embodiment of the present invention as viewed from an angle different from that in FIG. 14.
Figure 16:
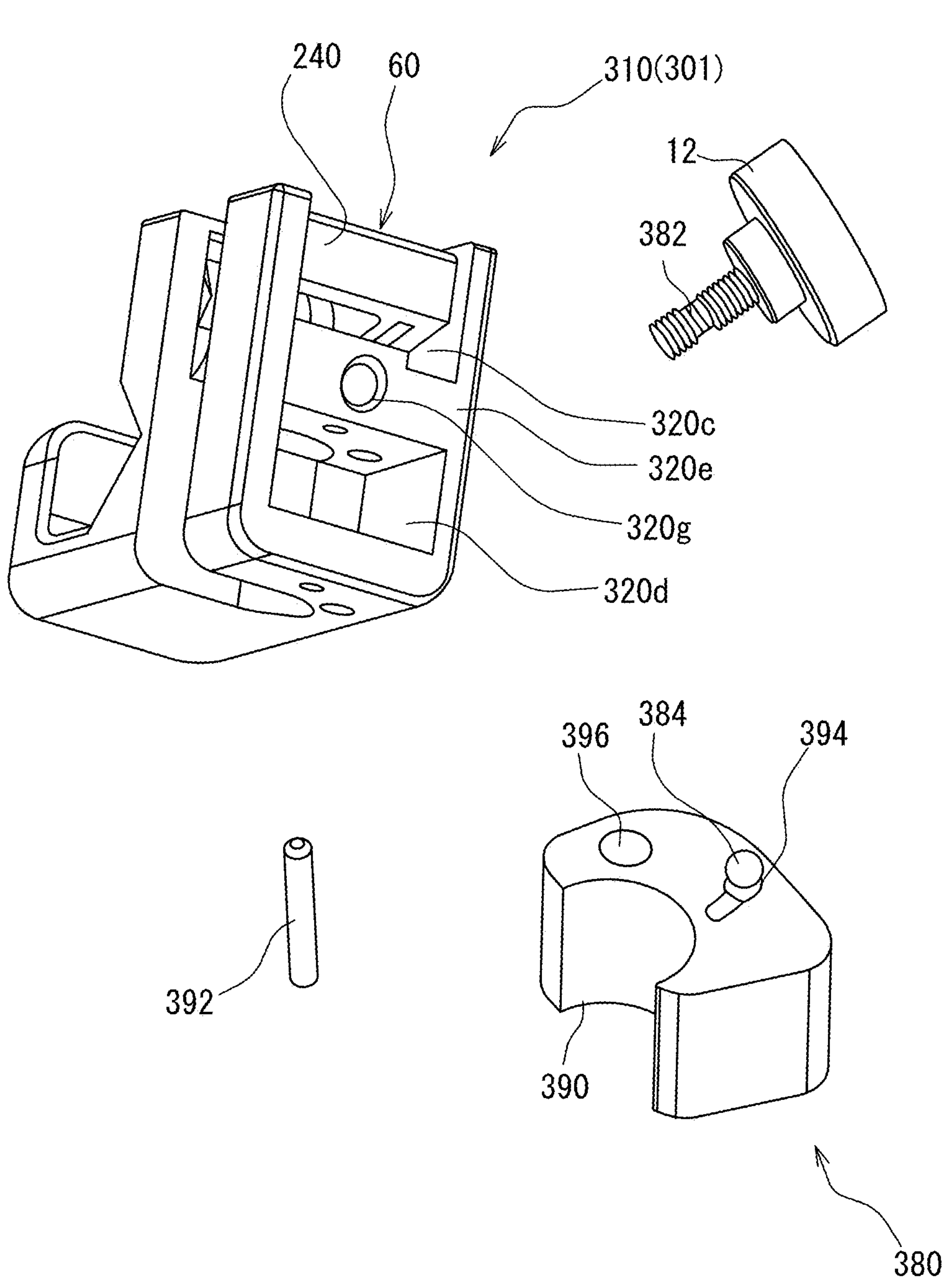
FIG. 16 is an exploded perspective view of the coupling device according to the third embodiment.
Figure 17:
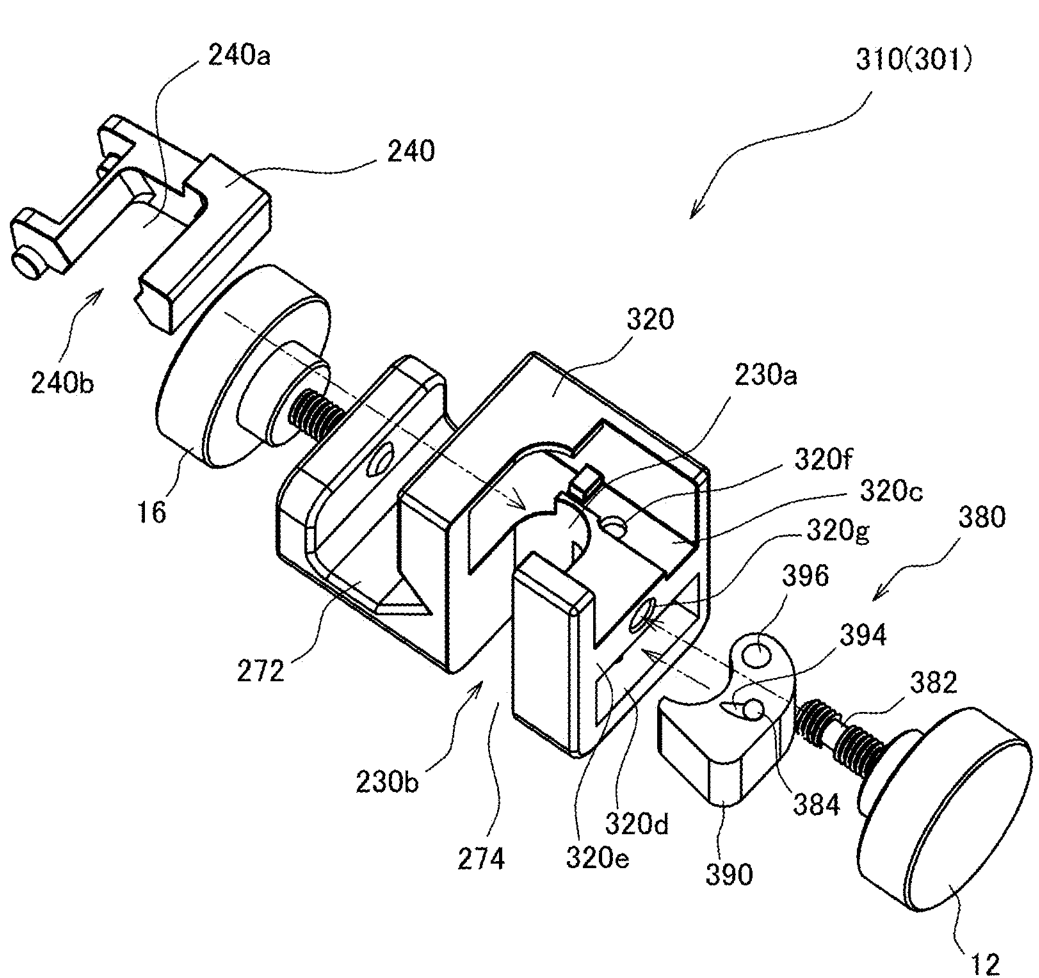
FIG. 17 is an exploded perspective view of the coupling device according to the third embodiment.

Second Embodiment: Hereinafter, a coupling device 210 and a coupling structure 201 according to a second embodiment of the present invention will be described in detail with reference to FIG. 7(*a*) to FIG. 13. In the following description, first, characteristic configurations of the coupling device 210 and the coupling structure 201 will be described, and then a specific example of the coupling device 210 and the coupling structure 201 will be described. It is noted that in a description of the characteristic configurations and the specific example of the coupling device 210 and the coupling structure 201 according to the second embodiment, configurations that are common to the coupling device 10 and the coupling structure 1 described above will be given the same reference signs and a description of details will be omitted.

Characteristic Configurations of Coupling Device 210 and Coupling Structure 201 according to Second Embodiment: The coupling device 210 has a main body portion 230 and a stopper member 240 instead of the main body portion 30 and the stopper member 40 of the coupling device 10 and the coupling structure 1. The main body portion 230 and the stopper member 240 have substantially similar configurations to the main body portion 30 and the stopper member 40 described above, but are different in a point that in addition to a first shaft insertion portion 230*a* corresponding to the first shaft insertion portion 30*a* and a second shaft insertion portion 240*a* corresponding to the second shaft insertion portion 40*a*, the main body portion 230 includes a main body shaft receiving portion 230*b* and in a point that the stopper member 240 includes a lock mechanism shaft receiving portion 240*b*. Also, the coupling device 210 and the coupling structure 201 have different configurations from the coupling device 10 and the coupling structure 1 in a point that a falling-off suppression mechanism 280 (intersecting direction movement regulating portion) is provided.

The main body shaft receiving portion 230*b* is a part formed for bringing the first shaft-shaped portion 22 into and out from the first shaft insertion portion 230*a* provided in the main body portion 230. The main body shaft receiving portion 230*b* is a part that is open so as to bring the first shaft-shaped portion 22 in and out in the direction intersecting the axis direction of the first shaft-shaped portion 22 inserted into the first shaft insertion portion 230*a*. The main body shaft receiving portion 230*b* is formed by cutting out the main body portion 230 so as to communicate with the first shaft insertion portion 230*a*.

The lock mechanism shaft receiving portion 240*b* is a part formed for bringing the first shaft-shaped portion 22 into and out from the second shaft insertion portion 240*a* provided in the stopper member 240. The lock mechanism shaft receiving portion 240*b* is a part that is open so as to bring the first shaft-shaped portion 22 in and out in the direction intersecting the axis direction of the first shaft-shaped portion 22 inserted into the second shaft insertion portion 240*a*. The main body shaft receiving portion 230*b* is formed by cutting out the stopper member 240 so as to communicate with the second shaft insertion portion 240*a*.

The coupling device 210 includes an opening portion 274 with which the main body shaft receiving portion 230*b* and the lock mechanism shaft receiving portion 240*b* communicate in a state in which the stopper member 240 is assembled to the main body portion 230, the opening portion that is open to the side. With the coupling device 210, from the side of the main body portion 230, via the opening portion 274, the first shaft-shaped portion 22 can be inserted into and drawn out from the first shaft insertion portion 230*a* and the second shaft insertion portion 240*a*.

The falling-off suppression mechanism 280 is to suppress the first shaft-shaped portion 22 from unexpectedly getting out via the opening portion 274 and suppress the coupling device 210 (coupling structure 201) from falling off from the first shaft-shaped portion 22 by regulating relative movement of the first shaft-shaped portion 22 and the main body portion 230 in the direction intersecting the axis direction of the first shaft-shaped portion 22.

The falling-off suppression mechanism 280 can perform an operation of switching between a regulated state in which entrance and exit of the first shaft-shaped portion 22 via the main body shaft receiving portion 230*b* provided in the main body portion 230 and the lock mechanism shaft receiving portion 240*b* are regulated, and a regulation cancelled state in which the entrance and the exit of the first shaft-shaped portion 22 via the main body shaft receiving portion 230*b* and the lock mechanism shaft receiving portion 240*b* are permitted.

Specific Example of Coupling Device 210 and Coupling Structure 201 according to Second Embodiment: Hereinafter, the specific example of the coupling device 210 and the coupling structure 201 according to the second embodiment will be described.

Figure 7A:
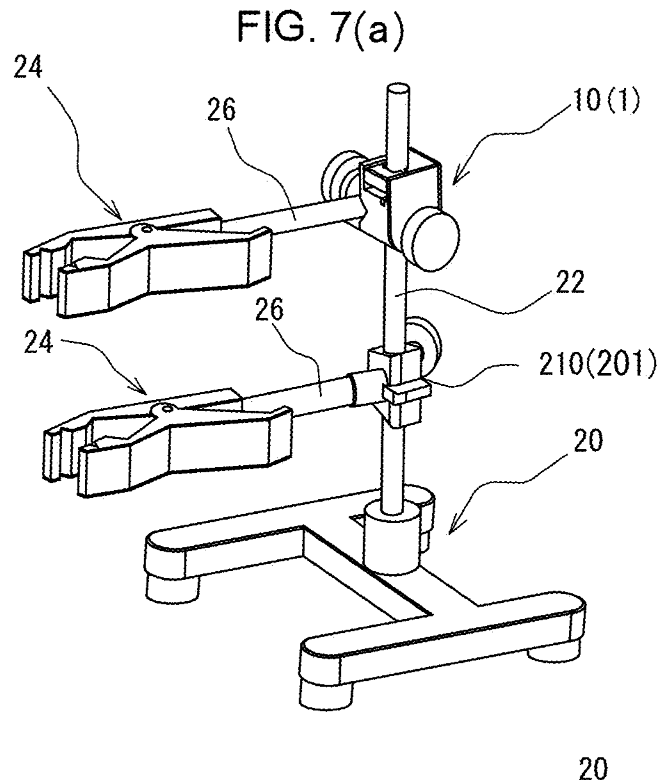
FIG. 7(*a*) and FIG. 7(*b*) are perspective views illustrating a use state of a coupling device according to a second embodiment of the present invention.
Figure 7B:
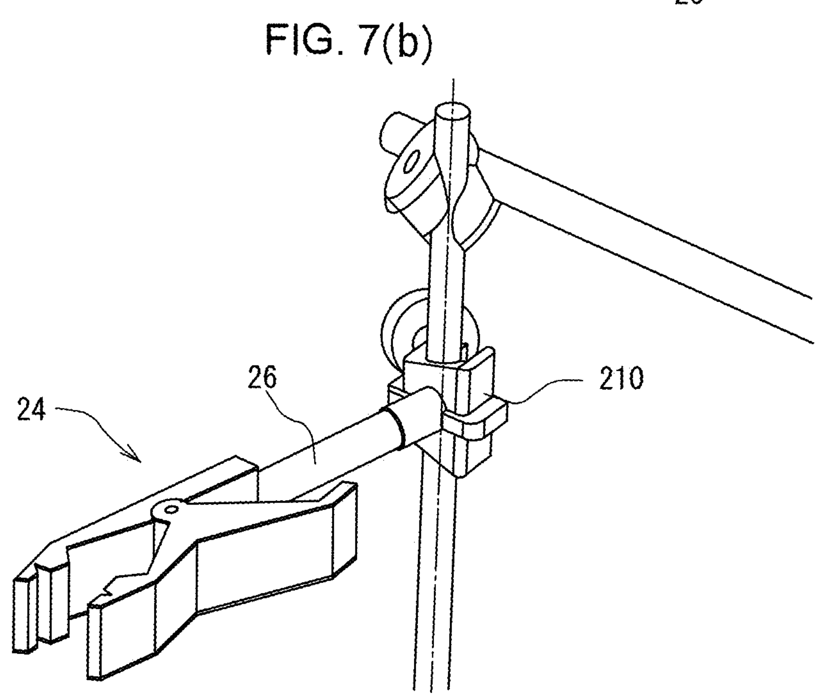
Figure 8:
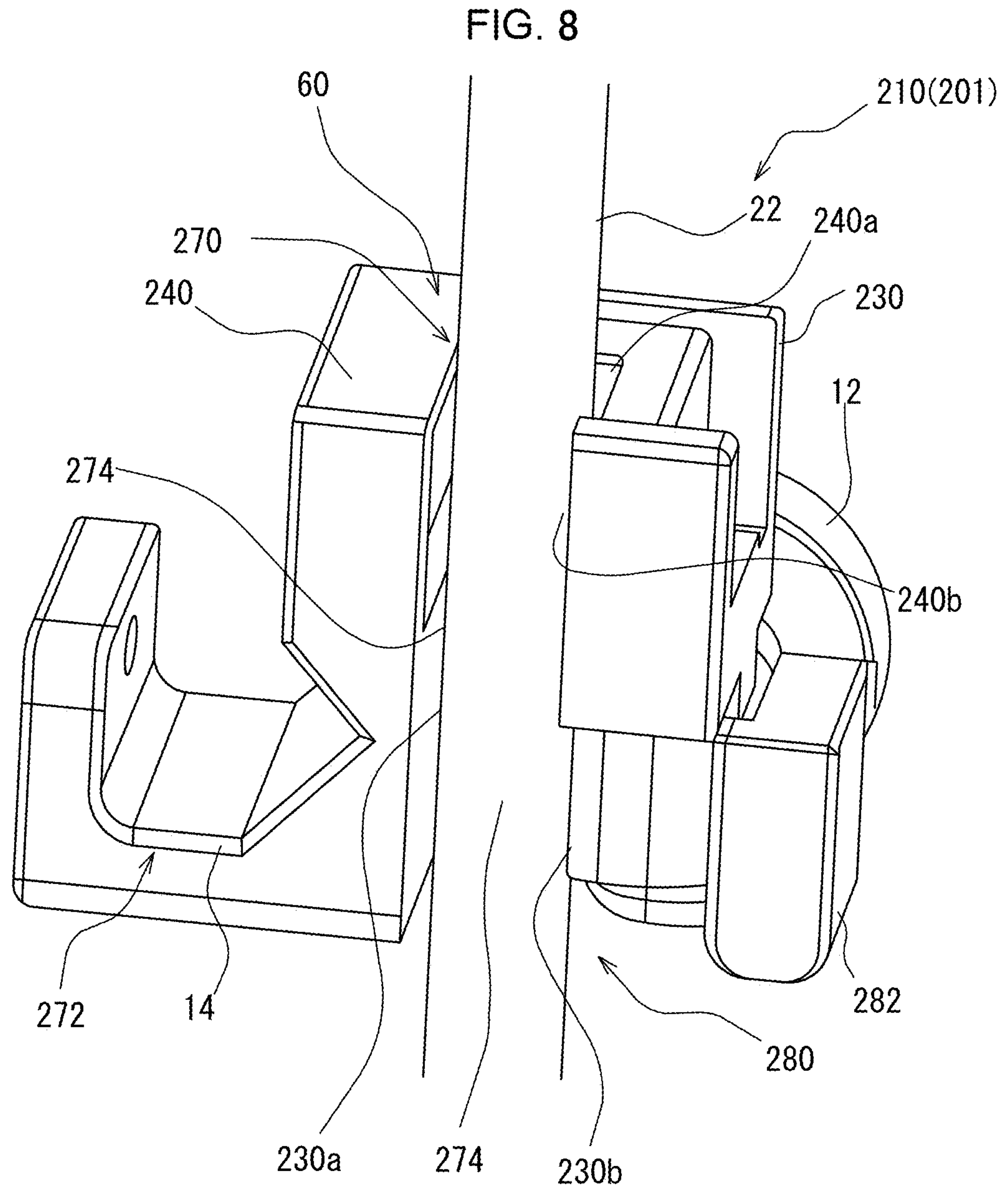
FIG. 8 is an enlarged perspective view of a main part.
Figure 9:
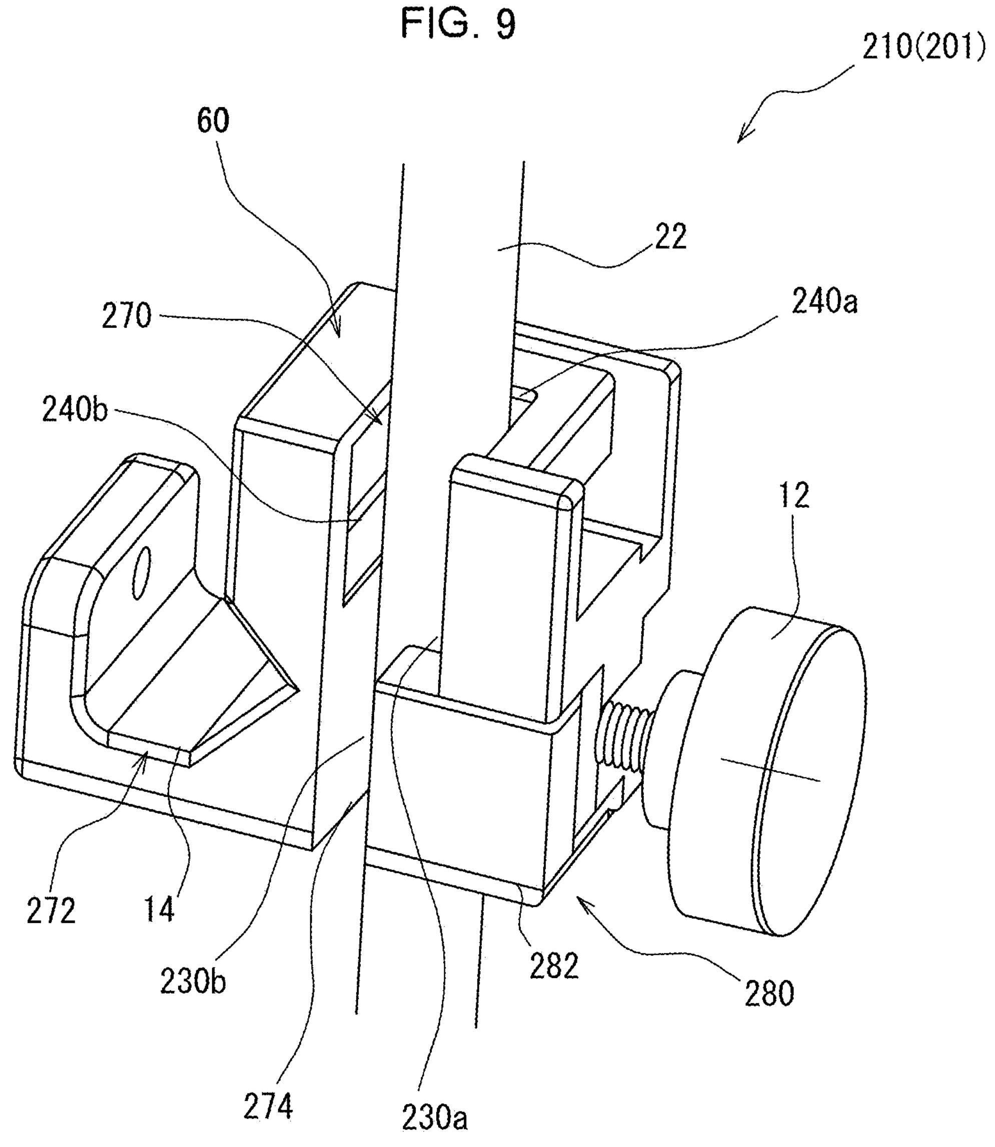
FIG. 9 is an enlarged view illustrating a state in which the main part is viewed from an angle different from that in FIG. 8.
Figure 10:
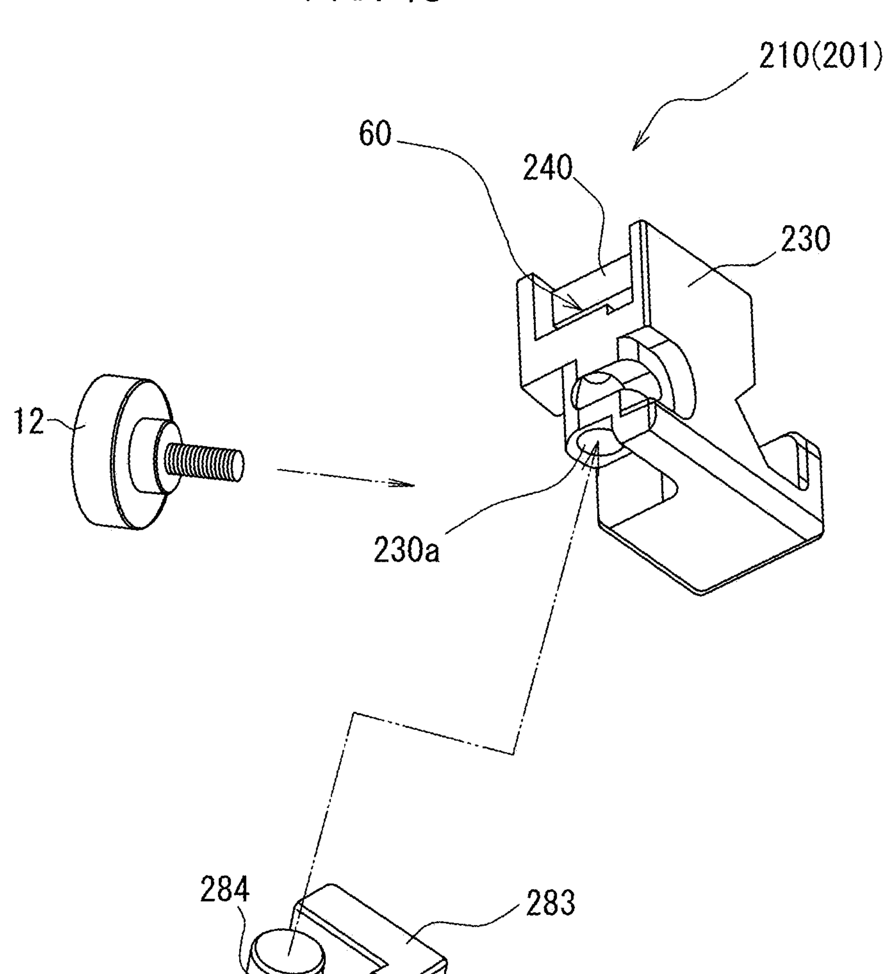
FIG. 10 is an exploded perspective view of the coupling device illustrated in FIG. 9.
Figure 11:
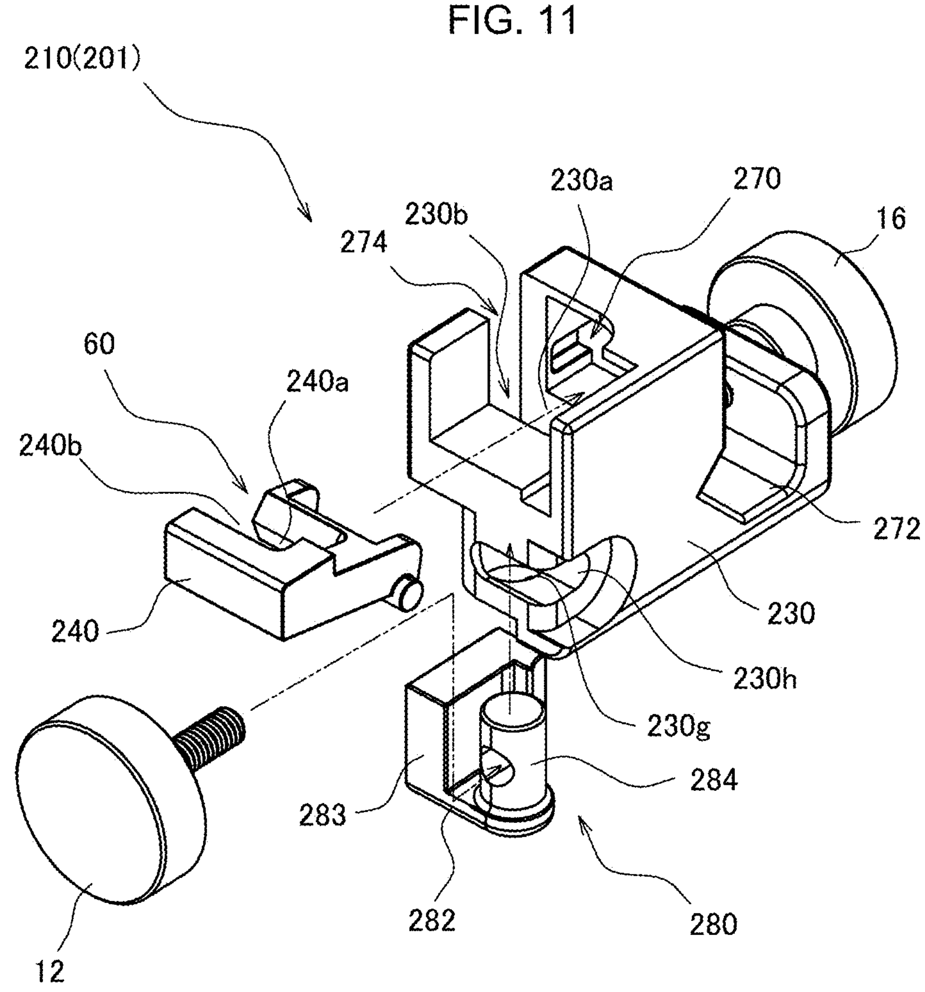
FIG. 11 is an exploded perspective view of the coupling device according to the second embodiment of the present invention.

As illustrated in FIG. 7(*a*) and FIG. 7(*b*), the coupling device 210 can be favorably utilized in a case, for example, where it is desired to additionally and separately attach a tool having a shaft-shaped part such as a clamp described above (second shaft-shaped portion 26) as a support object 24, etc., at a point in which the coupling device 10 is already attached on the upper side in the axis direction of the first shaft-shaped portion 22, or with respect to the first shaft-shaped portion 22 provided in an experimental base assembled in a frame shape.

The coupling device 210 has a hook shape. The coupling device 210 has a configuration as illustrated in FIG. 8 to FIG. 13. The coupling device 210 includes a first coupling portion 270 corresponding to the first coupling portion 70 described above and a second coupling portion 272 that is similar to the second coupling portion 72. The second coupling portion 272 has the same configuration as the second coupling portion 72 described above. Also, the first coupling portion 270 includes the lock mechanism 60 similarly to the first coupling portion 70 described above. In addition to this, the first coupling portion 270 includes the opening portion 274 formed so that the first shaft-shaped portion 22 can be inserted by moving the first shaft-shaped portion 22 in the direction intersecting the axis of the first shaft-shaped portion 22 by forming into a hook shape, and the falling-off suppression mechanism 280 for suppressing the first shaft-shaped portion 22 from falling off from the second coupling portion 272.

As illustrated in FIG. 8 to FIG. 13, the falling-off suppression mechanism 280 is configured by using a moving body 282 (cover). The moving body 282 is movable in the directions of advancing toward and exiting from the opening portion 274 that forms an entrance/exit path of the first shaft-shaped portion 22 via the main body shaft receiving portion 230*b* and the lock mechanism shaft receiving portion 240*b*. In the present embodiment, the moving body 282 includes a moving body main body 283 having a substantially "L" shape in a plan view, and a cylindrical projection 284. The moving body 282 is assembled to the main body portion 230 by inserting the cylindrical projection 284 provided in the moving body 282 into a hole 230*g* provided in a bottom portion of the main body portion 230 (see FIG. 11 and FIG. 12). Thereby, the moving body 282 is turnably connected to the main body portion 230 with the projection 284 as a spindle. Also, the falling-off suppression mechanism 280 can switch between a state in which the opening portion 274 is closed by the moving body main body 283 (regulated state), and a state in which the opening portion 274 is open (regulation cancelled state) by turning the projection 284 as the spindle.

The falling-off suppression mechanism 280 is configured so that, in addition to use of assembling the moving body 282 (cover) to the main body portion of the coupling device 210, the first direction fixing screw 12 (up and down direction fixing screw) can also be utilized as use as a lever for an opening and closing action. After the moving body 282 is assembled to the main body portion 230 by inserting the projection 284 of the moving body 282 into the hole 230*g* provided in the bottom portion of the main body portion 230, by inserting and engaging the first direction fixing screw 12 into and with the moving body 282 through a release hole 230*h* provided in the main body portion 230, it is possible to fix the moving body 282 to the main body portion 230. In the moving body 282, by gradually loosening the first direction fixing screw 12 and drawing out the first direction fixing screw 12 from the release hole 230*h* provided in the main body portion of the coupling device 210, and by turning the moving body 282 with the projection 284 as the spindle, it is possible to perform the opening and closing action of the opening portion 274. With the falling-off suppression mechanism 280, by making the first direction fixing screw 12 the lever and rotating the moving body 282 by 90 degrees, the first shaft-shaped portion 22 is brought into an attachable and detachable state. The falling-off suppression mechanism 280 requires a predetermined number of rotations (5 to 6 rotations in the present embodiment) as an operation of rotating the first direction fixing screw 12. Thereby, the falling-off suppression mechanism 280 performs an opening and closing operation when the operator intentionally operates the first direction fixing screw 12. Also, since the falling-off suppression mechanism 280 is configured so that the first direction fixing screw 12 can be utilized not only as a member for assembling the moving body 282 to the main body portion of the coupling device 210 but also as the lever for the opening and closing action, the number of parts is small, and actions and configurations thereof are simple.

Third Embodiment: Hereinafter, a coupling device 310 and a coupling structure 301 according to a third embodiment of the present invention will be described in detail with reference to FIG. 14 to FIG. 20. In the following description, first, characteristic configurations of the coupling device 310 and the coupling structure 301 will be described, and then a specific example of the coupling device 310 and the coupling structure 301 will be described. It is noted that in a description of the characteristic configurations and the specific example of the coupling device 310 and the coupling structure 301 according to the third embodiment, configurations that are common to the coupling device 10, the coupling device 210, the coupling structure 1, and the coupling structure 201 described above will be given the same reference signs and a description of details will be omitted.

Characteristic Configurations of Coupling Device 310 and Coupling Structure 301 according to Third Embodiment): The coupling device 310 and the coupling structure 301 are the substantially same as the coupling device 210 and the coupling structure 201 of the second embodiment but are different in a point that a falling-off suppression mechanism 380 is provided instead of the falling-off suppression mechanism 280. Also, the coupling device 310 and the coupling structure 301 are different in a point that a main body portion 320 is provided instead of the main body portion 230 provided in the coupling device 210 and the coupling structure 201 of the second embodiment for assembling of the falling-off suppression mechanism 380, etc.

Similarly to the main body portion 230 provided in the coupling device 210 (coupling structure 201) of the second embodiment described above, the main body portion 320 is a member to which the lock mechanism 60 formed by the stopper member 40 and the biasing member 50 is assembled. The main body portion 320 includes the first shaft insertion portion 230*a* and the main body shaft receiving portion 230*b* of the main body portion 230 exemplified in the second embodiment. Also, the main body portion 320 includes a lock mechanism assembling portion 320*d* to which the lock mechanism 60 is assembled. Further, the main body portion 320 includes a moving body assembling portion 320*c* on the opposite side to the lock mechanism assembling portion 320*d* (on the lower side in the example in the drawings) via a partition wall portion 320*e*.

Figure 18:
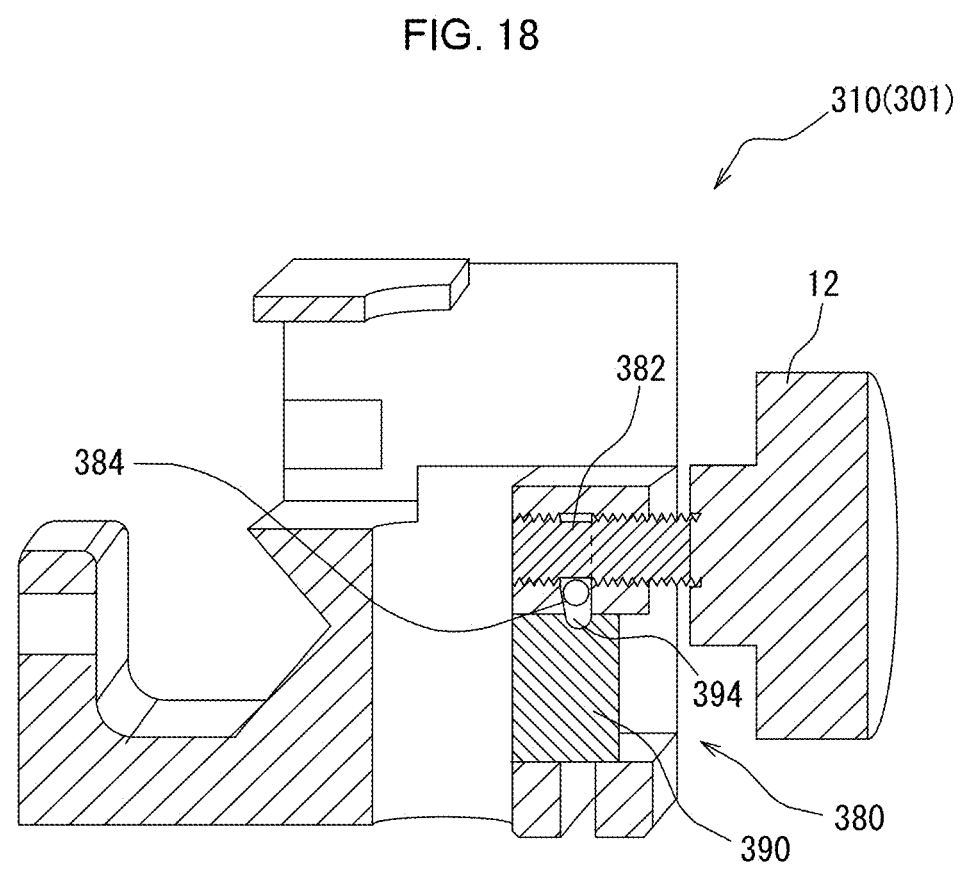
Figure 19:
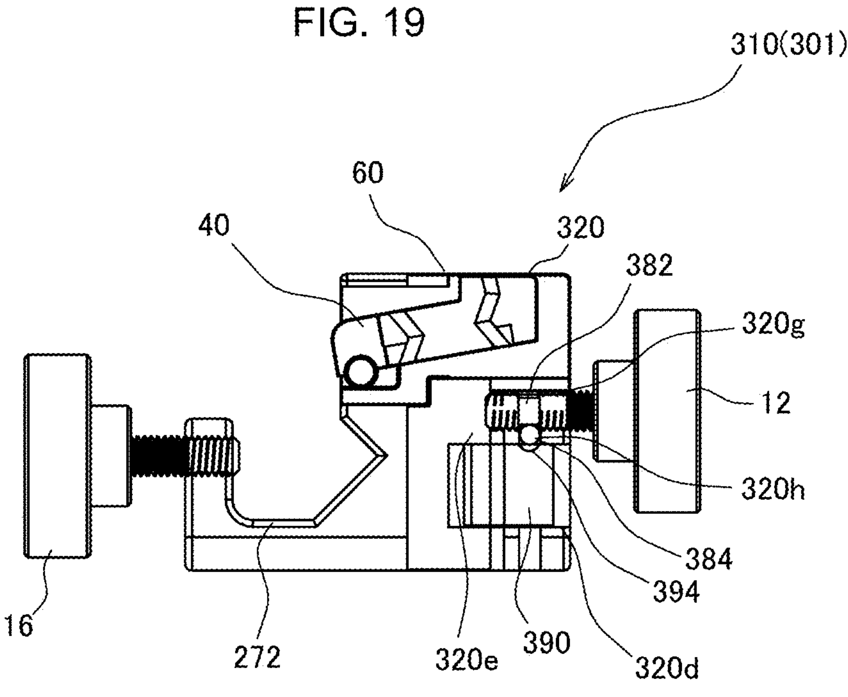
FIG. 19 is a cross-sectional view of the coupling device according to the third embodiment.
Figure 20A:
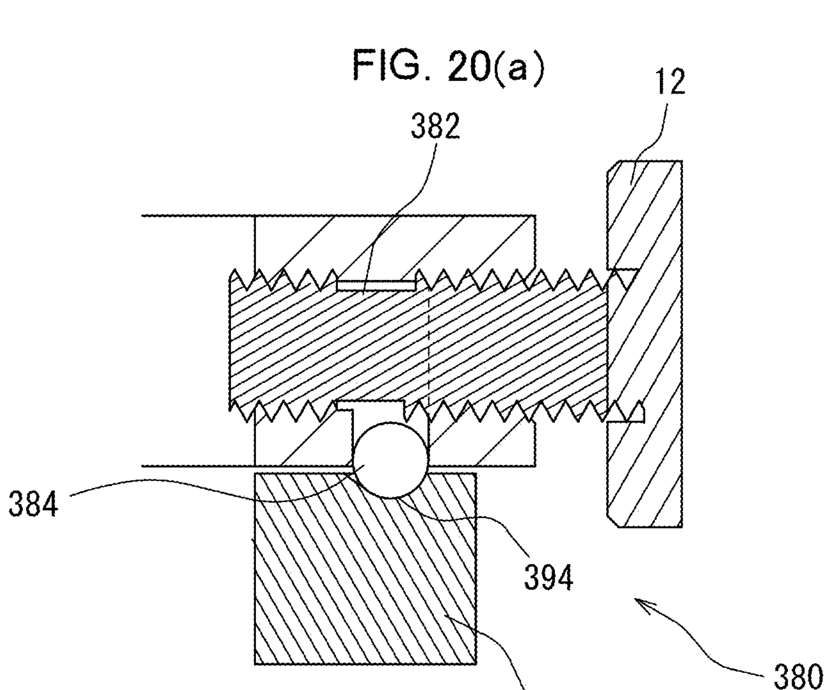
FIG. 20(*a*) and FIG. 20(*b*) are enlarged views of main parts of the cross-sectional view according to FIG. 18, in which FIG. 20(*a*) illustrates a state in which a hook member is fixed, and FIG. 20(*b*) illustrates a state in which fixing of the hook member is cancelled.
Figure 20B:
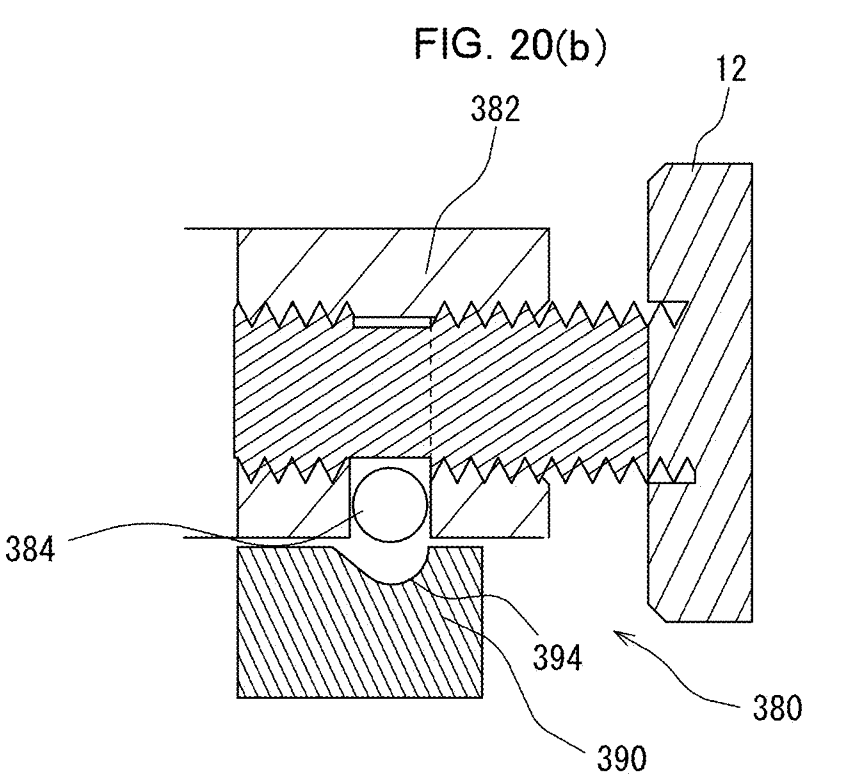
Figures 21A, 21B:
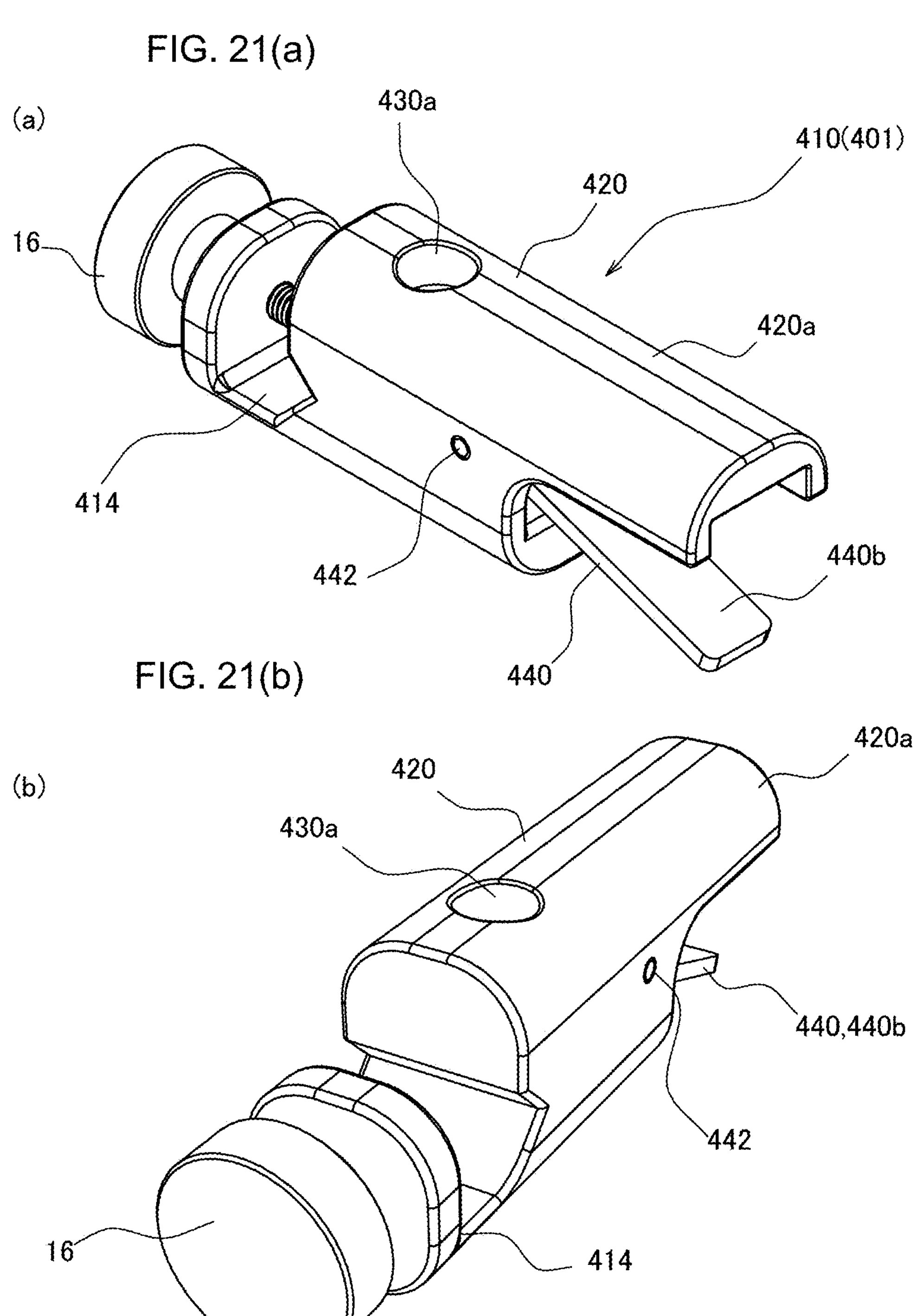
FIG. 21(*a*) is a perspective view illustrating a coupling device according to a fourth embodiment of the present invention as viewed from one side, and FIG. 21(*b*) is a perspective view illustrating the coupling device as viewed from the other side.

The moving body assembling portion 320*c* is a part to which a hook member 390 of the falling-off suppression mechanism 380 to be described in detail later is assembled. The moving body assembling portion 320*c* communicates with the main body shaft receiving portion 230*b*, and also communicates with the opposite side to the main body shaft receiving portion 230*b*. Also, in the main body portion 320, the partition wall portion 320*e* that forms a top surface of the moving body assembling portion 320*c* is provided, and a pin insertion hole 320*f* is provided over a bottom surface of the moving body assembling portion 320*c*. The pin insertion hole 320*f* is provided for inserting a pin 392 for turnably supporting the hook member 390 that is assembled to the moving body assembling portion 320*c*. Also, in the partition wall portion 320*e*, a screw hole 320*g* for screwing the first direction fixing screw 12 from the opposite side of the moving body assembling portion 320*c* toward the moving body assembling portion 320*c* is provided. Further, as illustrated in FIG. 18 to FIG. 20, in the partition wall portion 320*e*, a screw hole communication portion 320*h* is provided in a surface facing the moving body assembling portion 320*c* side (bottom surface of the partition wall portion 320*e*). The screw hole communication portion 320*h* is a communication hole provided to provide communication between the moving body assembling portion 320*c* and the screw hole 320*g*.

The falling-off suppression mechanism 380 is to suppress the first shaft-shaped portion 22 from unexpectedly getting out via the opening portion 274 and suppress the coupling device 310 (coupling structure 301) from falling off from the first shaft-shaped portion 22 by regulating relative movement of the first shaft-shaped portion 22 and the main body portion 320 in the direction intersecting the axis direction of the first shaft-shaped portion 22.

The falling-off suppression mechanism 380 can perform the operation of switching between the regulated state in which the entrance and the exit of the first shaft-shaped portion 22 via the main body shaft receiving portion 230*b* and the lock mechanism shaft receiving portion 240*b* are regulated, and the regulation cancelled state in which the entrance and the exit of the first shaft-shaped portion 22 via the main body shaft receiving portion 230*b* and the lock mechanism shaft receiving portion 240*b* are permitted.

The falling-off suppression mechanism 380 includes the hook member 390 instead of the moving body 282 of the falling-off suppression mechanism 280 according to the second embodiment described above. Also, the falling-off suppression mechanism 280 is configured so that the moving body 282 can be fixed so as not to be unexpectedly opened by the first direction fixing screw 12. Meanwhile, the falling-off suppression mechanism 380 is configured so that the hook member 390 can be fixed so as not to be unexpectedly opened by using a cut-out 382 provided in the first direction fixing screw 12, a spherical member 384, and a recessed portion 394 provided in the hook member 390.

Specific Example of Coupling Device 310 and Coupling Structure 301 according to Third Embodiment: Hereinafter, the specific example of the coupling device 310 and the coupling structure 301 according to the third embodiment will be described.

As illustrated in FIG. 14 to FIG. 19, in the coupling device 310 (coupling structure 301), the lock mechanism 60 and the falling-off suppression mechanism 380 (intersecting direction movement regulating portion) are assembled to the main body portion 320. The falling-off suppression mechanism 380 includes the hook member 390 instead of the moving body 282 of the falling-off suppression mechanism 280 of the second embodiment described above. The hook member 390 is assembled to the moving body assembling portion 320*c* of the main body portion 320.

The coupling device 310 includes the hook member 390 for preventing a fall by engaging with the first shaft-shaped portion 22. The hook member 390 has a curved hook shape in a plan view. The hook member 390 has the recessed portion 394 on the top surface side (surface facing the partition wall portion 320*e* side in an assembled state to the moving body assembling portion 320*c*). Also, the hook member 390 includes a pin insertion hole 396 that passes through from a top surface to a bottom surface on the one end side. The hook member 390 is assembled to the main body portion 320 by fitting into the moving body assembling portion 320*c* and inserting the pin 392 through the pin insertion hole 396 and the pin insertion hole 320*f* provided on the main body portion 320 side. Thereby, the hook member 390 can turn with the pin 392 as a spindle, and an end portion on the opposite side to an end portion where the pin insertion hole 396 is provided can enter and exit from the main body shaft receiving portion 230*b*.

The coupling device 310 includes a lock structure of the hook member 390 configured by utilizing the cut-out 382 provided in an intermediate portion of the first direction fixing screw 12 (up and down direction fixing screw), and the spherical member 384. The coupling device 310 is assembled so that the spherical member 384 enters the recessed portion 394 provided on an upper surface of the hook member 390, the screw hole communication portion 320*h* provided in the partition wall portion 320*e* of the main body portion 320, and the cut-out 382 provided in the first direction fixing screw 12.

In the coupling device 310, following turning for fastening the first direction fixing screw 12, the cut-out 382 is moved in the axis direction of the first direction fixing screw 12, and a thread ridge of the first direction fixing screw 12 reaches a position corresponding to the screw hole communication portion 320*h*. In this state, the thread ridge of the first direction fixing screw 12 abuts against the spherical member 384. Thereby, as illustrated in FIG. 20(*a*), a downward pressing force acts on the spherical member 384, and the spherical member 384 presses and fixes the hook member 390. Meanwhile, when the first direction fixing screw 12 is gradually loosened, the cut-out 382 retreats in the axis direction of the first direction fixing screw 12, and the cut-out 382 of the first direction fixing screw 12 reaches the position corresponding to the screw hole communication portion 320*h*. In this state, the spherical member 384 is brought into a state of being capable of retreating to the cut-out 382. Thereby, a force (fixing force) of pushing the hook member 390 by the spherical member 384 is cancelled.

Fourth Embodiment: A coupling device 410 and a coupling structure 401 according to a fourth embodiment of the present invention will be described in detail with reference to FIG. 21 to FIG. 24. In the following description, first, characteristic configurations of the coupling device 410 and the coupling structure 401 will be described, and then a specific example of the coupling device 410 and the coupling structure 401 will be described. It is noted that in a description of the coupling device 410 and the coupling structure 401 according to the fourth embodiment, configurations that are common to the coupling device 10 (coupling structure 1), the coupling device 210 (coupling structure 201), and the coupling device 310 (coupling structure 301) described above will be given the same reference signs and a description of details will be omitted.

Characteristic Configurations of Coupling Device 410 and Coupling Structure 401 according to Fourth Embodiment: The coupling device 410 and the coupling structure 401 have a main body portion 420 instead of the main body portion 30 in comparison to the coupling device 10 and the coupling structure 1 of the first embodiment described above. The coupling device 410 and the coupling structure 401 are formed in a shape in which the main body portion 420 extends in a rod shape, and have a main-body-side gripping portion 420*a* (handle portion). Also, the coupling device 410 and the coupling structure 401 have a stopper gripping portion 440*b* (lever portion) that can perform the operation of directly or indirectly (directly in the present embodiment) swinging a stopper member 440. Thereby, the coupling device 410 and the coupling structure 401 can perform the operation of swinging the stopper gripping portion 440*b* in a state in which the user places his/her finger onto and grips the lever-shaped stopper gripping portion 440*b* while placing part of his/her hand (for example, a palm) onto the rod-shaped main-body-side gripping portion 420*a*.

Specific Example of Coupling Device 410 and Coupling Structure 401 according to Fourth Embodiment: Hereinafter, the specific example of the coupling device 410 and the coupling structure 401 according to the fourth embodiment will be described.

The coupling device 410 is as in FIG. 21 to FIG. 24. The coupling device 410 has the main body portion 420. The main body portion 420 is apart that forms a main body of the coupling device 410. The main body portion 420 has the main-body-side gripping portion 420*a* in which the user can grip one side of the main body portion 420 in the longitudinal direction. The main body portion 420 has a support groove 414 corresponding to the support groove 14 described above on the other side in the longitudinal direction, and has a first shaft insertion portion 430*a* corresponding to the first shaft insertion portion 30*a* in an intermediate portion in the longitudinal direction. The first shaft insertion portion 430*a* passes through in the direction intersecting (in the present embodiment, the direction orthogonal to) the longitudinal direction of the main body portion 420, and the first shaft-shaped portion 22 can be inserted into the first shaft insertion portion 430*a*. In the coupling device 410, the stopper member 440 is provided instead of the stopper member 40 provided in the coupling device 10 described above.

Figure 23:
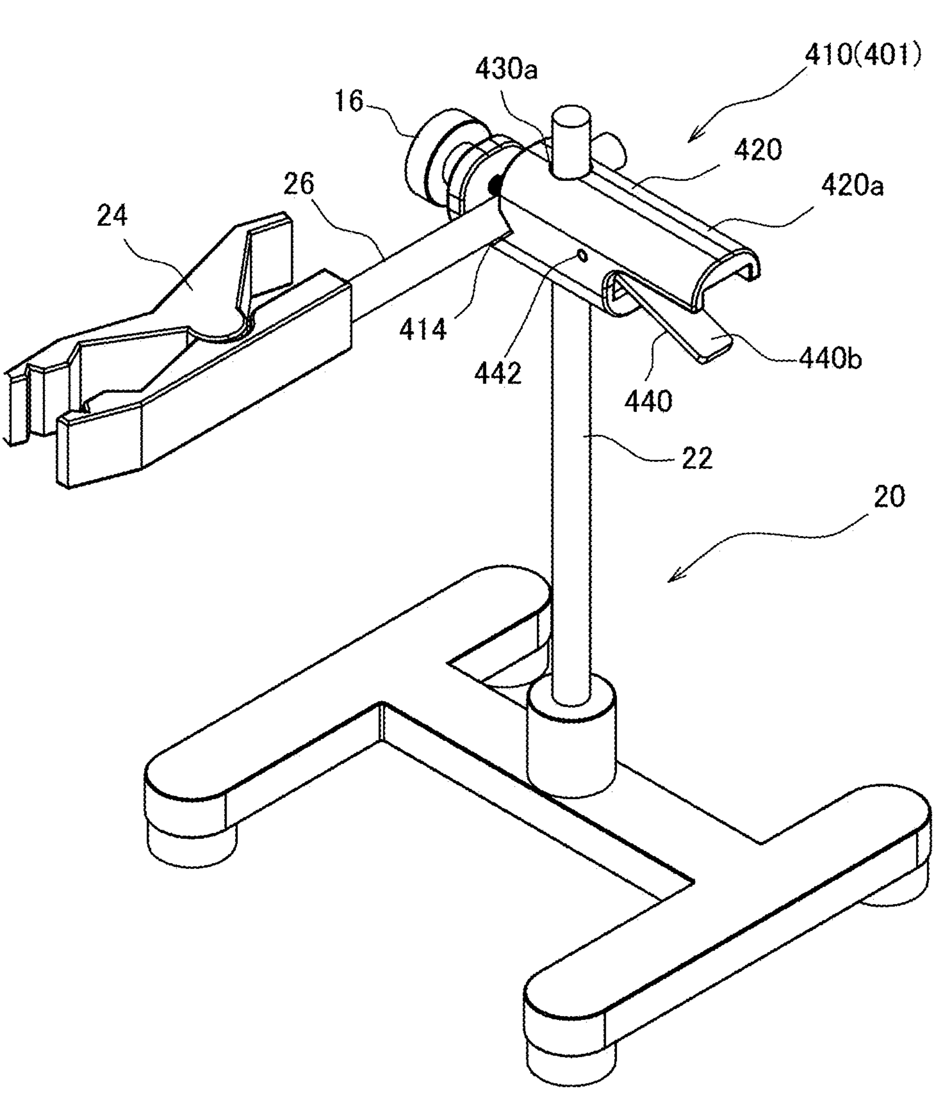
FIG. 23 is a perspective view illustrating a use state of the coupling device according to the fourth embodiment.

Further specifically, of the main body portion 420, a part on the main-body-side gripping portion 420*a* side with respect to the support groove 414 is hollow, as illustrated in FIG. 23. The stopper member 440 is a plate-shaped member, and one side of the stopper member 440 in the longitudinal direction is inserted into the main body portion 420, and the other side is taken out from an opening formed in an intermediate part of the main body portion 420. The stopper member 440 is supported swingably with a swing support portion 442 as a fulcrum point with respect to the main body portion 420. The stopper member 440 has a second shaft insertion portion 440*a* on the one end side (far side in the direction of entering the main body portion 420) of the swing support portion 442. The second shaft insertion portion 440*a* is a hole into which the first shaft-shaped portion 22 can be inserted similarly to the second shaft insertion portion 40*a* in the coupling device 10 of the first embodiment described above.

In the stopper member 440, a part on the other end side (side taken out from the main body portion 420) of the swing support portion 442 described above extends out to a position that opposes the main-body-side gripping portion 420*a* of the main body portion 420. Therefore, in the stopper member 440, a part that opposes the main-body-side gripping portion 420*a* is the stopper gripping portion 440*b* (lever portion) with which the user can place his/her finger with respect to the stopper member 440 in a state in which the user places his/her palm onto the main-body-side gripping portion 420*a*.

The stopper member 440 is biased by a biasing member such as a spring (not shown) so that the stopper gripping portion 440*b* is separated from the main-body-side gripping portion 420*a*. Therefore, in the stopper member 440, when the user grips in a state in which the user places his/her palm onto the main-body-side gripping portion 420*a* and places his/her finger onto the stopper member 440 so that a force acts in the direction against a bias force by the biasing member (direction in which the stopper gripping portion 440*b* comes close to the main-body-side gripping portion 420*a*), it is possible to operate to swing the stopper member 440.

The coupling device 410 is installed in the support device 20, in a state in which the first shaft-shaped portion 22 of the support device 20 is inserted into the first shaft insertion portion 430*a* of the main body portion 420 as illustrated in FIG. 23. In this state, as illustrated in FIG. 24, inside the main body portion 420, the first shaft-shaped portion 22 is inserted into the second shaft insertion portion 440*a* provided in the stopper member 440.

Figure 24:
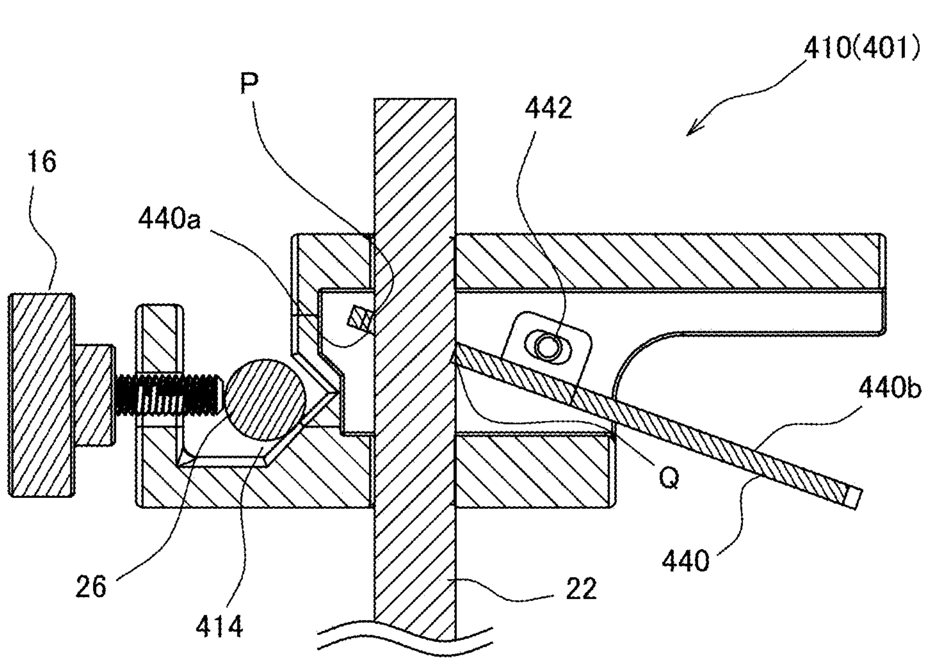
FIG. 24 is a cross-sectional view illustrating a use state of the coupling device according to the fourth embodiment.
Figure 25:
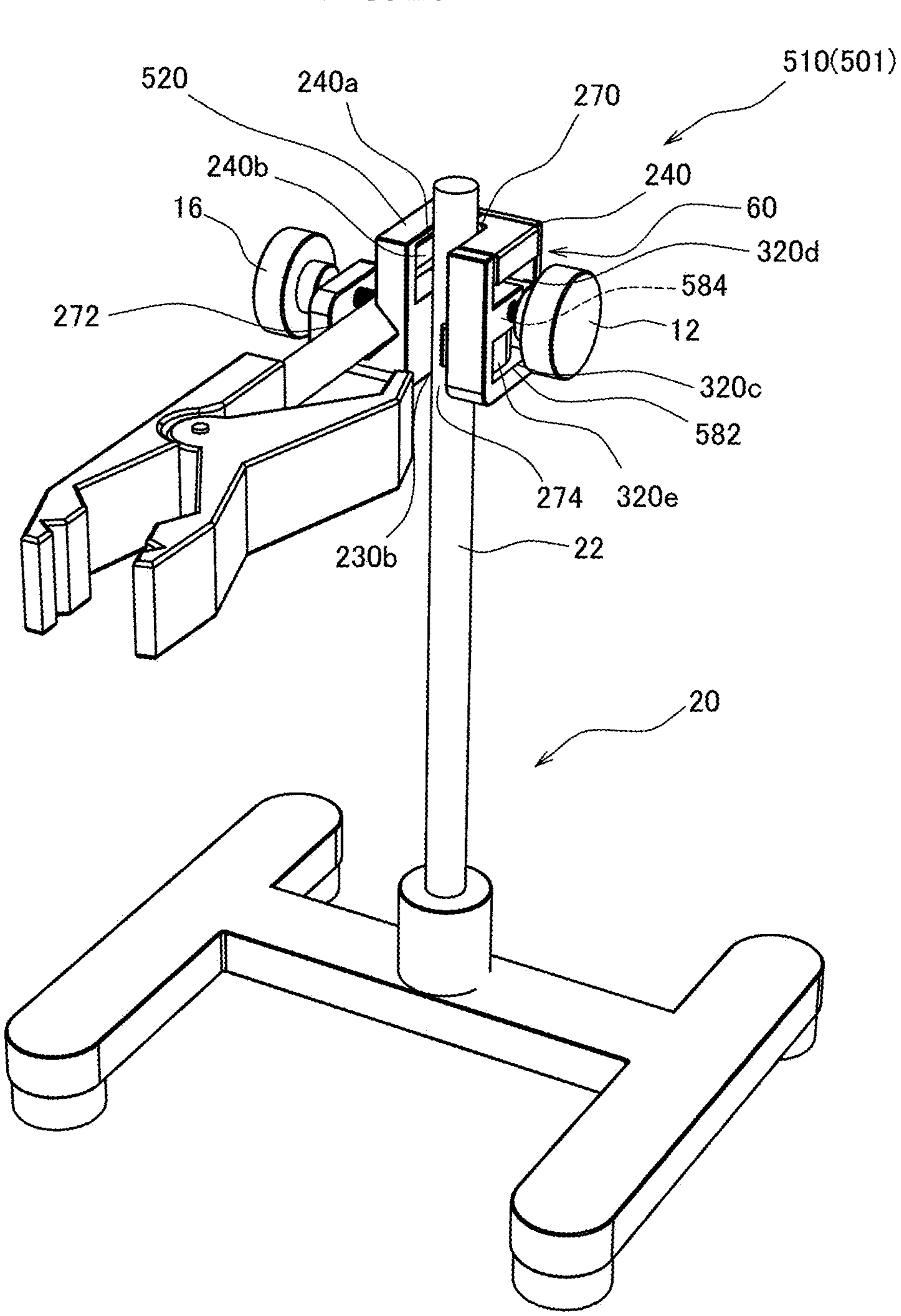
FIG. 25 is a perspective view illustrating a use state of a coupling device according to a fifth embodiment.
Figure 30:
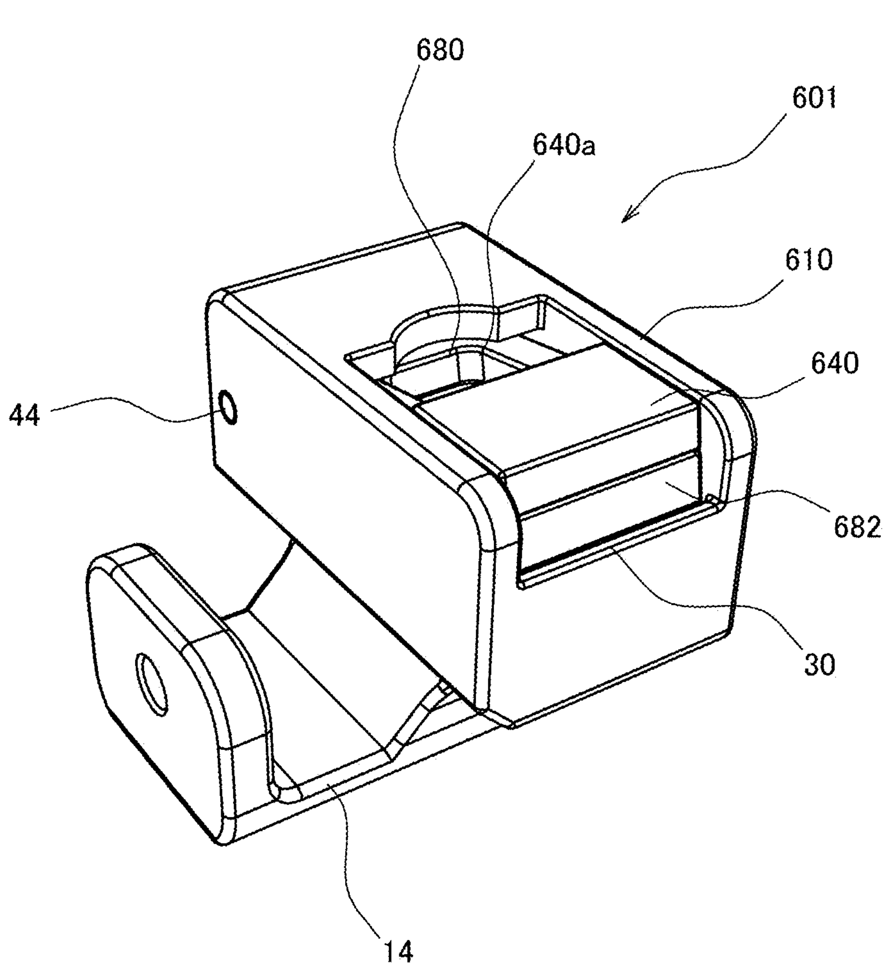
FIG. 30 is a perspective view illustrating a coupling device according to a sixth embodiment.

As described above, at normal times, the stopper member 440 is biased by the biasing member (not shown) and brought into an inclined state as illustrated in FIG. 24. Therefore, at normal times, an opening edge that forms the second shaft insertion portion 440*a* of the stopper member 440 is pressed against an outer peripheral surface of the first shaft-shaped portion 22 on one side and the other side across the first shaft-shaped portion 22 at positions that are separated from each other in the axis direction of the first shaft-shaped portion 22. Thereby, the coupling device 410 is brought into the locked state when the stopper member 440 interferes with the first shaft-shaped portion 22 at two points and is brought into a pried state, movement of the coupling device 410 in the axis direction of the first shaft-shaped portion 22 is suppressed, and the coupling device 410 is brought into a static state.

Meanwhile, when, while placing his/her palm onto the main-body-side gripping portion 420*a* of the main body portion 420 and placing his/her finger onto the stopper member 440, the user grips the stopper member 440 so that the force acts in the direction in which the stopper gripping portion 440*b* comes close to the main-body-side gripping portion 420*a* against the bias force by the biasing member, the pried state in which the stopper member 440 interferes with the first shaft-shaped portion 22 at two points as described above is cancelled, and the unlocked state is brought about. Thereby, in a state in which the user grips the main body portion 420 and the stopper member 440, it is possible to perform an operation of sliding the coupling device 410 in the axis direction of the first shaft-shaped portion 22.

Fifth Embodiment: Hereinafter, a coupling device 510 and a coupling structure 501 according to a fifth embodiment of the present invention will be described in detail with reference to FIG. 25 to FIG. 29. In the following description, first, characteristic configurations of the coupling device 510 and the coupling structure 501 will be described, and then a specific example of the coupling device 510 and the coupling structure 501 will be described. It is noted that in a description of the characteristic configurations and the specific example of the coupling device 510 and the coupling structure 501 according to the fifth embodiment, configurations that are common to the coupling device 10 (coupling structure 1), the coupling device 210 (coupling structure 201), the coupling device 310 (coupling structure 301), and the coupling device 410 (coupling structure 401) described above will be given the same reference signs and a description of details will be omitted.

Characteristic Configurations of Coupling Device 510 and Coupling Structure 501 according to Fifth Embodiment: The coupling device 510 and the coupling structure 501 are the substantially same as the coupling device 210 (coupling structure 201) of the second embodiment and the coupling device 310 (coupling structure 301) of the third embodiment but are different in a point that a falling-off suppression mechanism 580 (intersecting direction movement regulating portion) is provided instead of the falling-off suppression mechanism 280 and the falling-off suppression mechanism 380. Also, a main body portion 520 that configures the coupling device 510 and the coupling structure 501 has a configuration that is substantially common to the main body portion 320 exemplified in the third embodiment described above, but part of the configuration of the main body portion 520 is different from the main body portion 320 for assembling of the falling-off suppression mechanism 580, etc. In the following description, regarding the falling-off suppression mechanism 580 and the main body portion 520, parts that are common to the falling-off suppression mechanism 380 and the main body portion 320 will be given the same reference signs and different points will be mainly described.

Similarly to the falling-off suppression mechanism 280 and the falling-off suppression mechanism 380, the falling-off suppression mechanism 580 can perform the operation of switching between the regulated state in which the entrance and the exit of the first shaft-shaped portion 22 via the main body shaft receiving portion 230*b* and the lock mechanism shaft receiving portion 240*b* are regulated, and the regulation cancelled state in which the entrance and the exit of the first shaft-shaped portion 22 via the main body shaft receiving portion 230*b* and the lock mechanism shaft receiving portion 240*b* are permitted. The falling-off suppression mechanism 580 includes a moving body 582 instead of the moving body 282 and the hook member 390. Also, the falling-off suppression mechanism 580 has a switching mechanism 584.

The moving body 582 is movable in the directions of advancing toward and exiting from the opening portion 274 that serves as the entrance/exit path of the first shaft-shaped portion 22 via the main body shaft receiving portion 230*b* and the lock mechanism shaft receiving portion 240*b*. The moving body 582 can bring the falling-off suppression mechanism 580 into the regulated state by going to the entrance/exit path of the first shaft-shaped portion 22 and bring the falling-off suppression mechanism 580 into the regulation cancelled state by exiting from the entrance/exit path of the first shaft-shaped portion 22.

The switching mechanism 584 is a mechanism for enabling switching between a movement regulated state in which movement of the moving body 582 described above is regulated and a movement permitted state in which the movement of the moving body 582 is permitted. The switching mechanism 584 has a switching operation portion 586.

The switching operation portion 586 is to perform an operation of the switching mechanism 584. The switching operation portion 586 may be capable of being operated independently from the other members of the stopper member 40, etc., but in the present embodiment, can be operated in conjunction with the operation of swinging the stopper member 40. Also, although the switching operation portion 586 can be operated with an appropriate action such as swing, the switching operation portion 586 can be operated by making a pressing force act (pressing portion 586*a*) in the present embodiment. The pressing portion 586*a* that forms the switching operation portion 586 is provided in a movable region of the stopper member 40. In the present embodiment, with the switching operation portion 586 (pressing portion 586*a*), the pressing force acts on the switching operation portion 586 (pressing portion 586*a*) from the stopper member 40 and it is made possible to switch the switching mechanism 584 from the movement regulated state to the movement permitted state by pressing and swinging the stopper member 40 against the bias force by the biasing member 50 further beyond a position where the lock mechanism 60 is switched from the locked state to the unlocked state by the operation of swinging the stopper member 40.

Specific Example of Coupling Device 510 and Coupling Structure 501 according to Fifth Embodiment: Hereinafter, the specific example of the coupling device 510 and the coupling structure 501 according to the fifth embodiment will be described.

Similarly to the coupling device 310 (coupling structure 301) of the third embodiment, the coupling device 510 (coupling structure 501) has the lock mechanism 60 configured by assembling the stopper member 40 and the biasing member 50 to the main body portion 520. The coupling device 510 includes the moving body 582 instead of the moving body 282 and the hook member 390 in the coupling device 210 of the second embodiment and the coupling device 310 of the third embodiment.

The moving body 582 is formed in a hook shape similarly to the hook member 390. Similarly to the moving body 282 and the hook member 390 described above, the moving body 582 is provided at a position adjacent to a space where the lock mechanism 60 including the stopper member 40 and the biasing member 50 is assembled in the main body portion 520. In the present embodiment, similarly to hook member 390 of the third embodiment, it is assembled to the moving body assembling portion 320*c* provided at a position adjacent to the lock mechanism assembling portion 320*d* to which the lock mechanism 60 including the stopper member 40 and the biasing member 50 is assembled in the main body portion 320. Similarly to the hook member 390 being turnable with respect to the main body portion 320 with the pin 392 as the spindle in the third embodiment, the moving body 582 is supported turnably with respect to the main body portion 520 with the pin 392 as the spindle. The moving body 582 is movable in the directions of advancing toward and exiting from the opening portion 274 that serves as the entrance/exit path of the first shaft-shaped portion 22 via the main body shaft receiving portion 230*b* and the lock mechanism shaft receiving portion 240*b* by turning with the pin 392 as the spindle.

The coupling device 510 includes the switching mechanism 584 described above. The switching mechanism 584 includes the switching operation portion 586, a fixing body 588, and a fixing body biasing member 560.

The switching operation portion 586 is configured by a pin-shaped member. A pin that forms the switching operation portion 586 is inserted into a communication hole 520*f* that communicates with the partition wall portion 320*e* that partitions the moving body assembling portion 320*c* and the lock mechanism assembling portion 320*d* in the main body portion 520 over the moving body assembling portion 320*c* and the lock mechanism assembling portion 320*d*. The switching operation portion 586 has a length that is the substantially same as or more than a length of the communication hole 520*f*. The communication hole 520*f* is open at a position on the lower side of the pressing portion 46 of the stopper member 40 arranged in the lock mechanism assembling portion 320*d*. Therefore, the switching operation portion 586 inserted into the communication hole 520*f* is in a state of projecting in the movable region of the stopper member 40 (lock mechanism assembling portion 320*d* in the present embodiment).

The fixing body 588 is configured by a pin-shaped member. Also, the fixing body biasing member 560 is configured by a spring. The pin that forms the fixing body 588 and the spring that forms the fixing body biasing member 560 are fitted into a fixing body accommodating portion 582*a* provided to be open on the top surface side of the moving body 582. The fixing body 588 is arranged on the fixing body biasing member 560 arranged on the bottom side of the fixing body accommodating portion 582*a*. The sum of a length of the fixing body 588 and a natural length of the spring that forms the fixing body biasing member 560 is longer than a depth (length) of the hole that forms the fixing body accommodating portion 582*a*. Also, the length of the fixing body 588 and the natural length of the spring that forms the fixing body biasing member 560 are shorter than the depth (length) of the hole that forms the fixing body accommodating portion 582*a*. Therefore, in a state in which a pressing force in the axis direction does not act on the fixing body 588, while the lower end side of the fixing body 588 is accommodated in the fixing body accommodating portion 582*a*, the upper end side of the fixing body 588 projects more than the top surface of the moving body 582 (see FIG. 26(*a*), FIG. 27(*a*)). Also, when the pressing force in the axis direction acts on the fixing body 588, the fixing body biasing member 560 is contracted, and it is possible to bring the upper end side of the fixing body 588 into a state that is flush with the top surface of the moving body 582 or sinking below the top surface of the moving body 582 (see FIG. 28(*a*), FIG. 29(*a*)).

In a state in which the falling-off suppression mechanism 580 is brought into the regulated state by making the moving body 582 go to the entrance/exit path of the first shaft-shaped portion 22 (see FIG. 26(*a*), FIG. 27(*a*)), the fixing body accommodating portion 582*a* described above is provided at a position to communicate with the communication hole 520*f* provided in the partition wall portion 320*e* of the main body portion 520. Therefore, in a state in which the falling-off suppression mechanism 580 is in the regulated state, an upper end portion of the fixing body 588 fitted into the fixing body accommodating portion 582*a* of the moving body 582 projects toward the communication hole 520*f* of the partition wall portion 320*e*, and is fitted into the communication hole 520*f*. Thereby, the moving body 582 is brought into a non-turnable state. Also, the switching operation portion 586 inserted into the communication hole 520*f* is abutted and moved by the fixing body 588, and brought into a state of projecting to the lower side of the stopper member 40 (pressing portion 46) arranged in the lock mechanism assembling portion 320*d*.

Also, in the coupling device 510, in a state in which the falling-off suppression mechanism 580 is in the regulated state, when the stopper member 40 (pressing portion 46) is pressed against the bias force of the biasing member 50, the stopper member 40 and the first shaft-shaped portion 22 are brought into contact with each other at the first contact portion P and the second contact portion Q, and from the state in which the axial movement of the first shaft-shaped portion 22 is suppressed, contact at the first contact portion P and the second contact portion Q is cancelled, and movement in the up and down direction is permitted. When the stopper member 40 (pressing portion 46) is pressed further from this state, the stopper member 40 abuts against an upper end portion of the switching operation portion 586. When the stopper member 40 is pressed further from this state, as illustrated in FIG. 28(*a*), the switching operation portion 586 is pushed in by the stopper member 40, and the fixing body 588 that abuts against a lower end portion of the switching operation portion 586 is pushed and moved against a bias force of the fixing body biasing member 560. As a result, when the upper end portion of the fixing body 588 is drawn from the communication hole 520*f*, the moving body 582 is brought into a freely-turnable state. Thereby, the moving body 582 exits from the opening portion 274, and the coupling device 510 is brought into a state in which the first shaft-shaped portion 22 can enter and exit via the main body shaft receiving portion 230*b* and the lock mechanism shaft receiving portion 240*b*, that is, a state in which the coupling device 510 is attachable to and detachable from the first shaft-shaped portion 22 via the opening portion 274.

Sixth Embodiment: Hereinafter, a coupling device 610 and a coupling structure 601 according to a sixth embodiment of the present invention will be described in detail with reference to FIG. 30 to FIG. 42. In the following description, first, characteristic configurations of the coupling device 610 and the coupling structure 601 will be described, and then a specific example of the coupling device 610 and the coupling structure 601 will be described. It is noted that in a description of the characteristic configurations and the specific example of the coupling device 610 and the coupling structure 601 according to the sixth embodiment, configurations that are common to the coupling device 10 (coupling structure 1), the coupling device 210 (coupling structure 201), the coupling device 310 (coupling structure 301), the coupling device 410 (coupling structure 401), and the coupling device 510 (coupling structure 501) described above will be given the same reference signs and a description of details will be omitted. Also, shapes of control bodies 684, 686 to be described in detail later are partially different due to convenience of illustration, etc., between an exemplification in FIG. 30 to FIG. 36 and an exemplification in FIG. 37 to FIG. 42. However, since both the exemplifications exert the same actions and effects, the exemplifications are not distinguished but described as the same in the following description.

Characteristic Configurations of Coupling Device 610 and Coupling Structure 601 according to Sixth Embodiment: In the coupling device 610 according to the sixth embodiment, the coupling structure 601 has configurations that are similar to the coupling structure 1 that configures the coupling device 10 of the first embodiment. However, the configurations are different in a point that a stopper member 640 is used instead of the stopper member 40. By a principle that is similar to the coupling device 10 in which the axial movement (fall) of the first shaft-shaped portion 22 is suppressed when the stopper member 40 and the first shaft-shaped portion 22 are brought into contact with each other and is brought into a pried state, in the coupling device 610 (coupling structure 601), it is possible to suppress the axial movement (fall) of the first shaft-shaped portion 22 when the stopper member 640 is brought into contact with the first shaft-shaped portion 22 and is brought into a pried state (see FIG. 34).

In addition to this, by a lock mechanism 680 provided in the stopper member 640, the coupling device 610 (coupling structure 601) can be brought into a state in which turning around the first shaft-shaped portion 22 is suppressed or a state in which turning is permitted. That is, the coupling device 610 (coupling structure 601) includes a turning control function with respect to an axis body which is an object to be installed (first shaft-shaped portion 22 in the present embodiment) in addition to an axial movement control function in the axis direction with respect to the axis body (first shaft-shaped portion 22).

Figure 31:
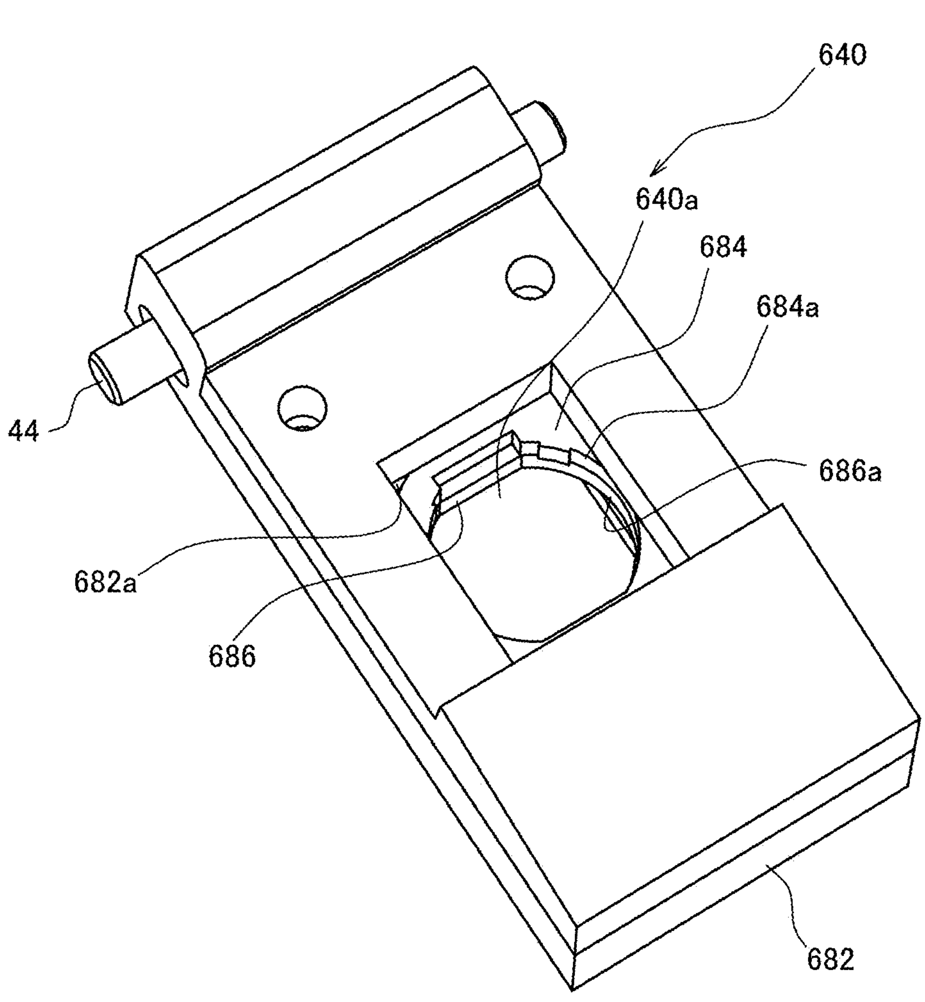
FIG. 31 is a perspective view illustrating a stopper member provided in the coupling device according to the sixth embodiment.
Figure 32:
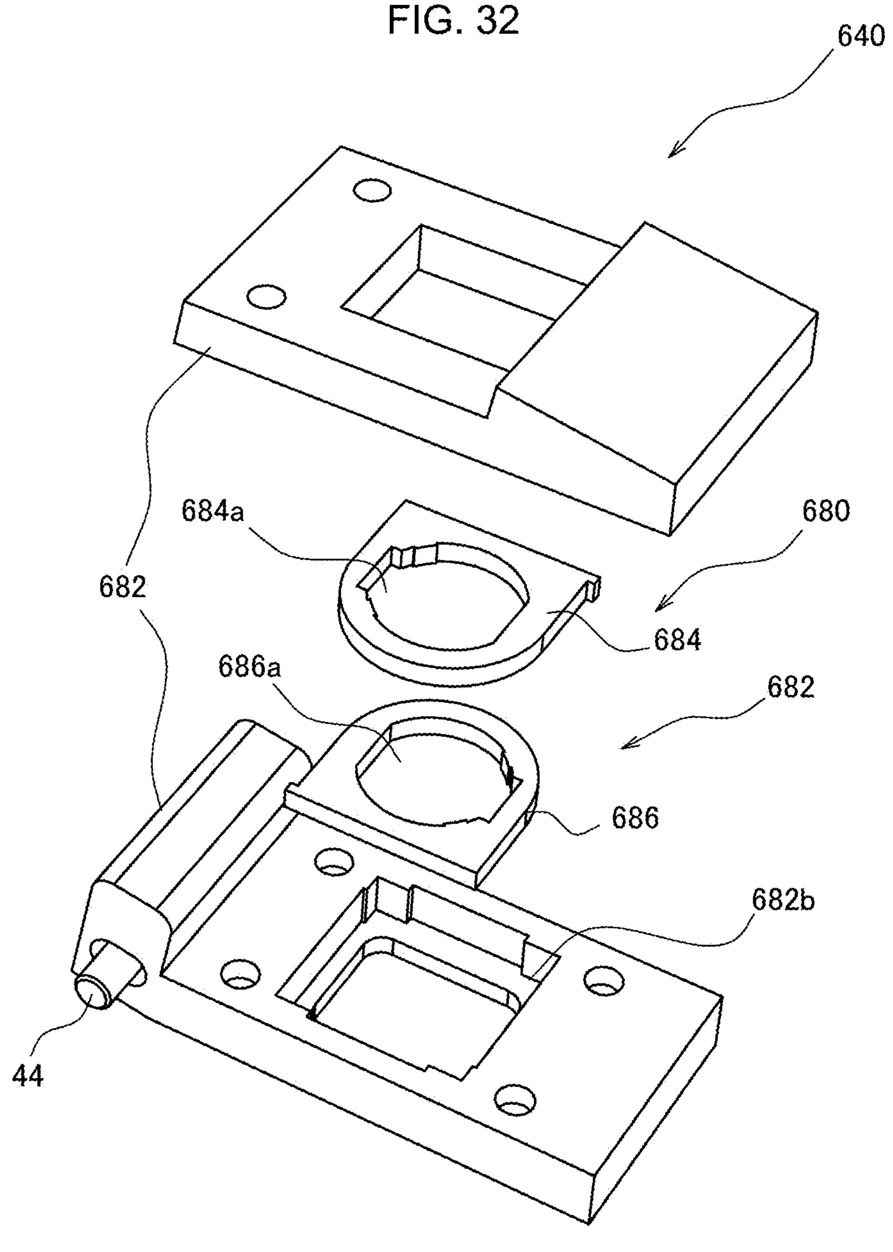
FIG. 32 is an exploded perspective view illustrating the stopper member provided in the coupling device according to the sixth embodiment.

As illustrated in FIG. 31, FIG. 32, etc., in the stopper member 640, the first control body 684 and the second control body 686 that form the lock mechanism 680 are accommodated in an accommodating portion 682*a* formed by a space that is formed inside a stopper member main body 682. The stopper member main body 682 has a second shaft insertion portion 640*a* similarly to the second shaft insertion portion 40*a* provided in the stopper member 40. The accommodating portion 682*a* can accommodate the first control body 684 and the second control body 686 formed in a plate shape in a superimposed state in a part where the stopper member main body 682 is provided. The first control body 684 and the second control body 686 are formed in the same shape, and assembled in a state in which the control bodies 684 and 686 are fitted into a recessed portion 682*b* provided in the accommodating portion 682*a* in a posture that the control bodies 684 and 686 are reversed with respect to each other. In the first control body 684 and the second control body 686, shaft insertion holes 684*a*, 686*a* into which the first shaft-shaped portion 22 can be inserted similarly to the stopper member main body 682 are provided.

Figure 33A:
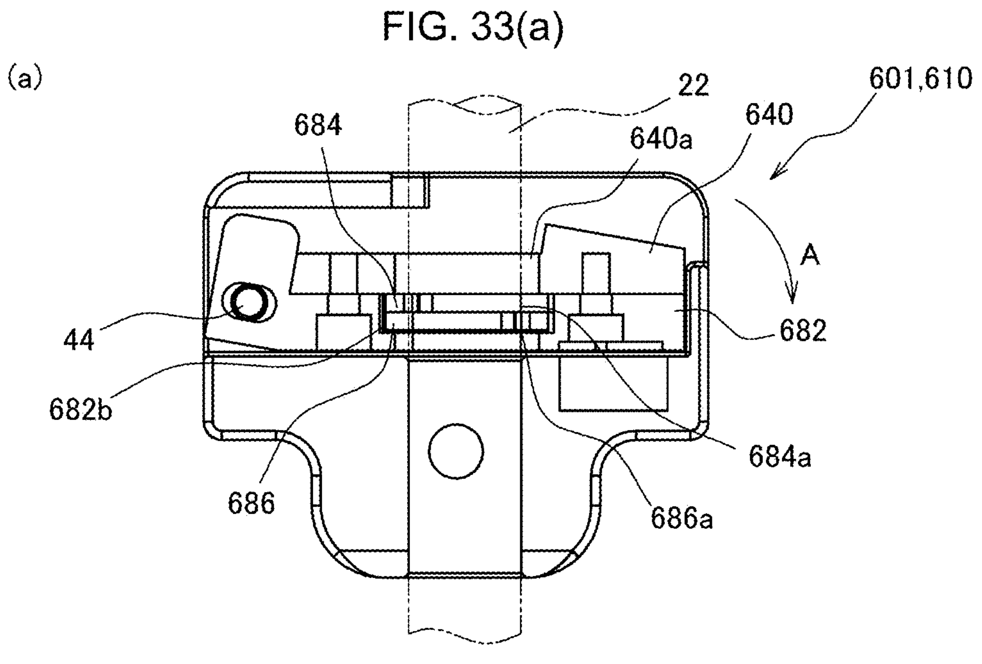
FIG. 33(*a*) is a cross-sectional view illustrating a state in which the stopper member is pressed in the coupling device according to the sixth embodiment, and FIG. 33(*b*) is a plan view illustrating a state of a lock mechanism in the state of FIG. 33(*a*).
Figure 33B:
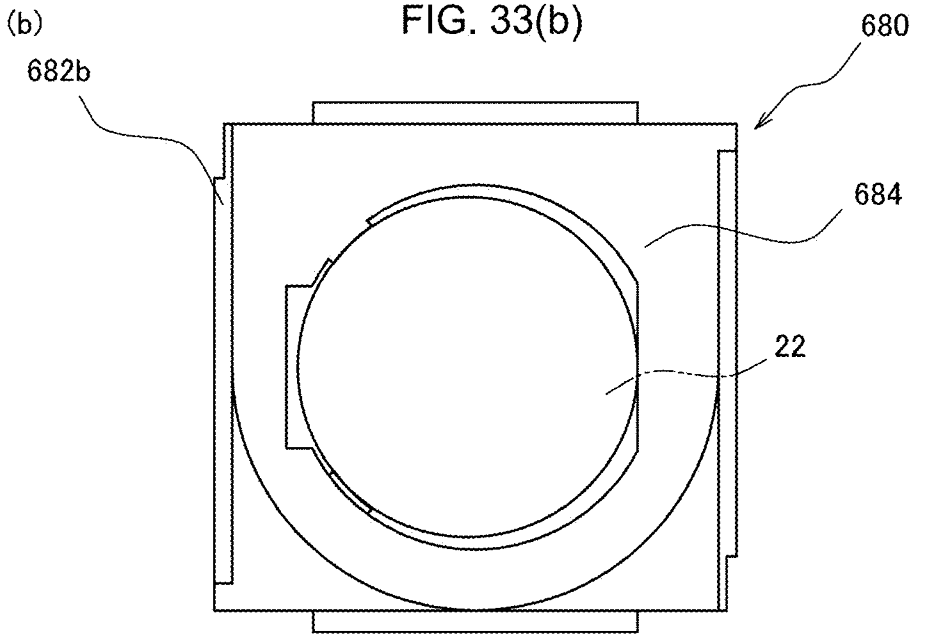
Figures 37A, 37B, 37C, 37D, 37E, 37F, 37G:
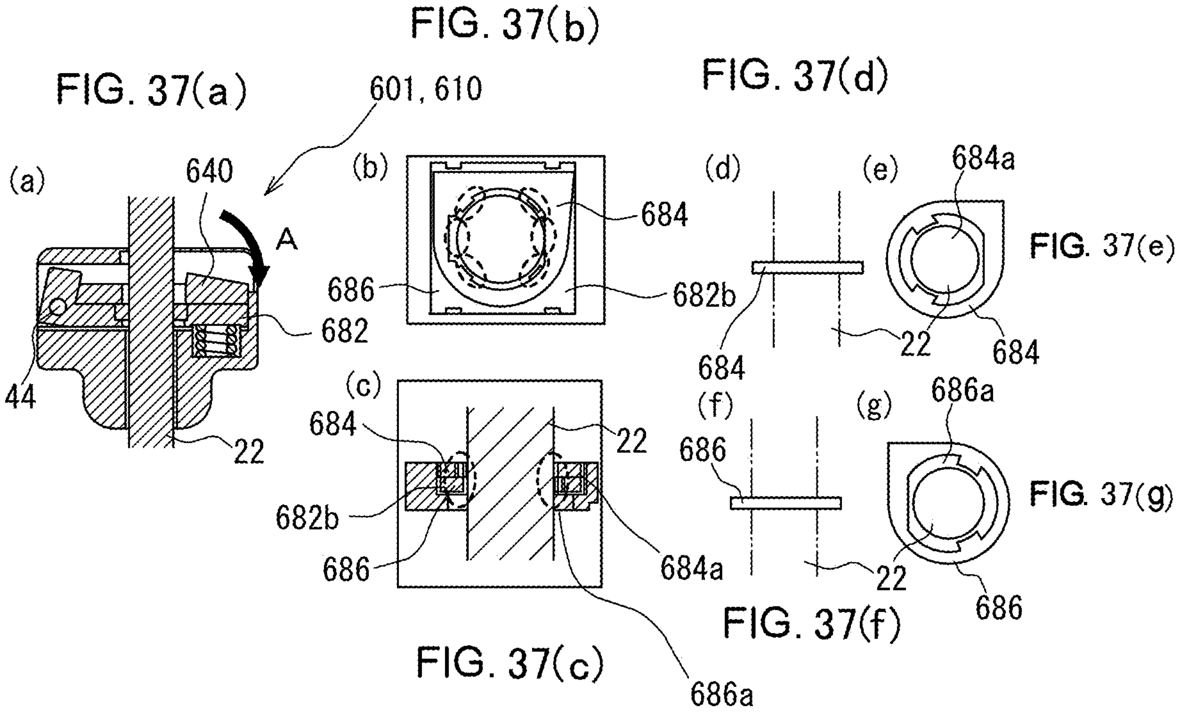
FIG. 37(*a*) to FIG. 37(*g*) are views illustrating a state in which the stopper member is pressed in the coupling device according to the sixth embodiment, in which FIG. 37(*a*) is a cross-sectional view, FIG. 37(*b*) is a plan view illustrating a state of the lock mechanism in which markings are applied to points corresponding to a first abutting portion to a third abutting portion, FIG. 37(*c*) is an enlarged view of a main part of FIG. 37(*a*), FIG. 37(*d*) is a side view illustrating a relationship between the first control body and the shaft-shaped portion, FIG. 37(*e*) is a plan view illustrating the relationship between the first control body and the shaft-shaped portion, FIG. 37(*f*) is a side view illustrating a relationship between the second control body and the shaft-shaped portion, and FIG. 37(*g*) is a plan view illustrating the relationship between the second control body and the shaft-shaped portion.

In a state in which the stopper member 640 is pressed like an arrow A in FIG. 33(*a*), both the stopper member main body 682 and the lock mechanism 680 (the first control body 684 and the second control body 686) assembled to the stopper member main body 682 do not interfere with the first shaft-shaped portion 22, and a pried state is not brought about (see FIG. 33(*b*), FIG. 37(*b*) to FIG. 37(*g*)). Therefore, in this state, in the coupling device 610 (coupling structure 601), the axial movement and circumferential movement with respect to the first shaft-shaped portion 22 are not regulated, and it is possible to freely move in the axis direction and turn in the direction around the axial center.

Figures 34A, 34B:
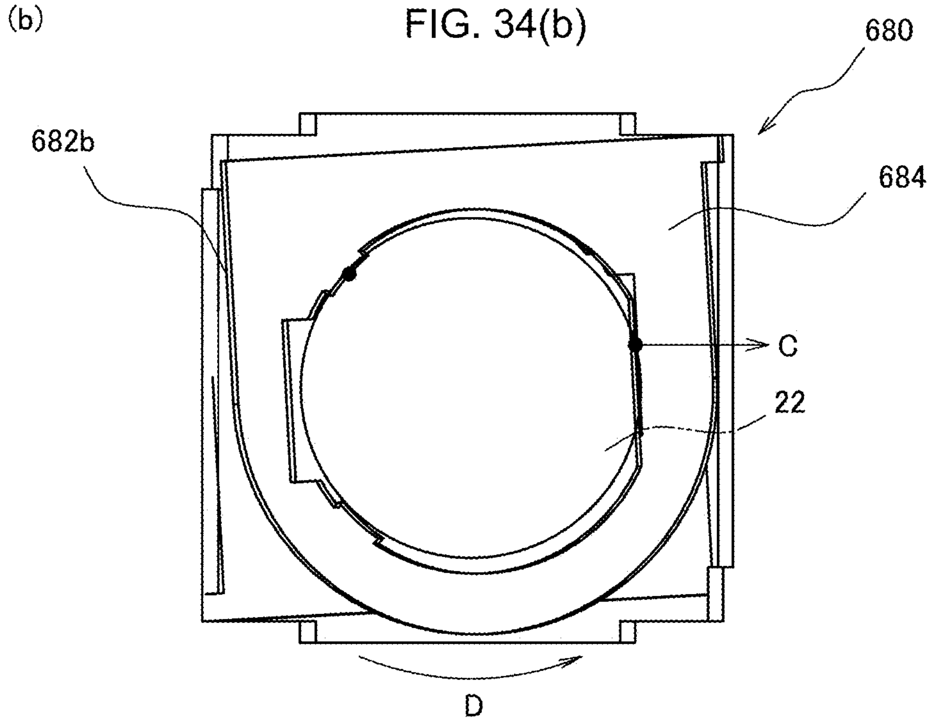
FIG. 34(*a*) is a cross-sectional view illustrating a state in which a pressing force onto the stopper member is cancelled in the coupling device according to the sixth embodiment, and FIG. 34(*b*) is a plan view illustrating a state of the lock mechanism in the state of FIG. 34(*a*).
Figures 38A, 38B, 38C, 38D, 38E, 38F, 38G, 38H, 38I:
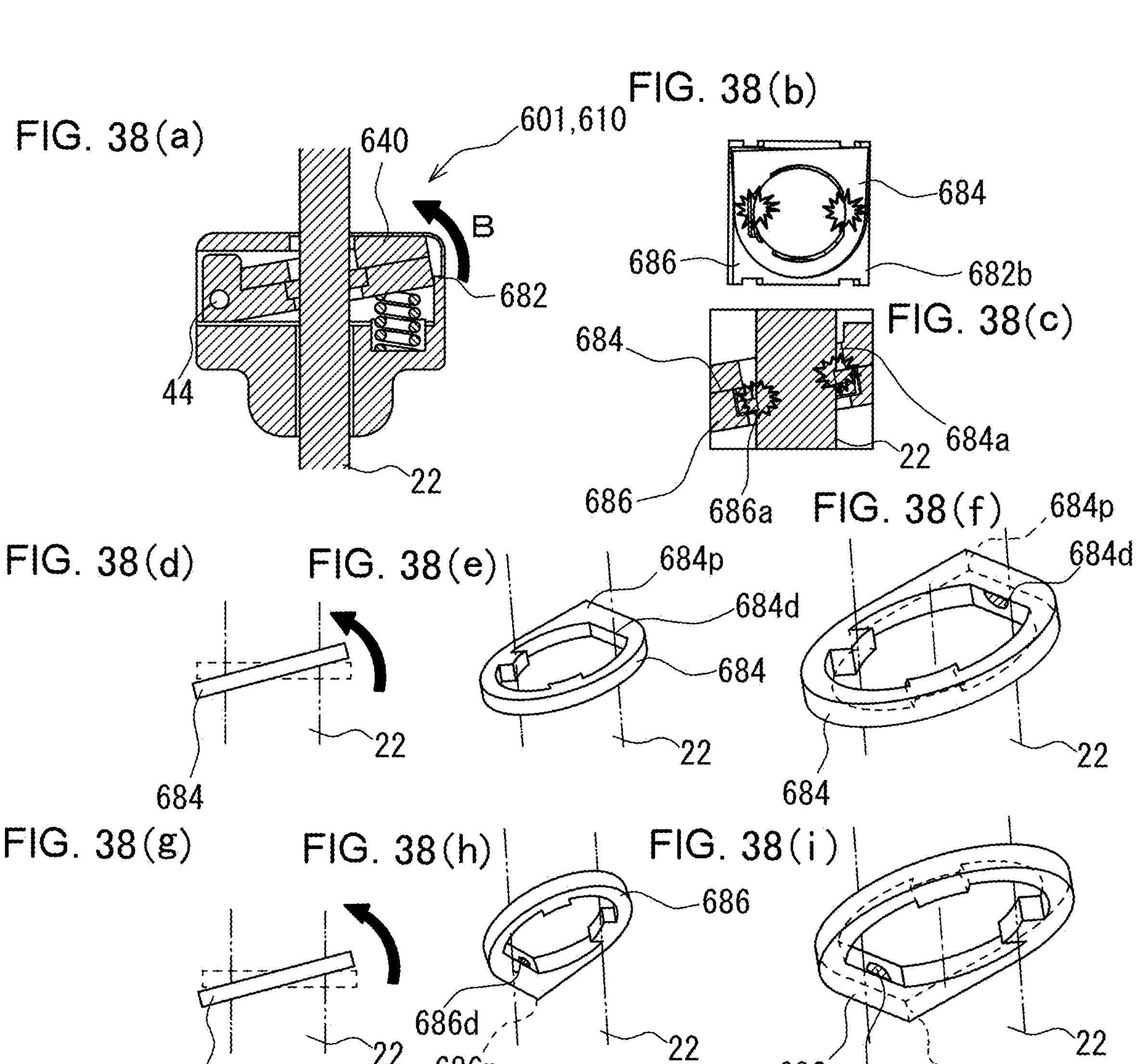
FIG. 38(*a*) to FIG. 38(*i*) are views illustrating a state in which the pressing force onto the stopper member is cancelled in the coupling device according to the sixth embodiment, in which FIG. 38(*a*) is a cross-sectional view, FIG. 38(*b*) is a plan view illustrating a state of the lock mechanism in which markings are applied to abutting points, FIG. 38(*c*) is an enlarged view of a main part of FIG. 38(*a*), FIG. 38(*d*) is a side view illustrating an action of the first control body with respect to the shaft-shaped portion, FIG. 38(*e*) is a perspective view illustrating the relationship between the first control body and the shaft-shaped portion, FIG. 38(*f*) is a perspective view viewed from an angle different from FIG. 38(*e*), FIG. 38(*g*) is a side view illustrating an action of the second control body with respect to the shaft-shaped portion, FIG. 38(*h*) is a perspective view illustrating the relationship between the second control body and the shaft-shaped portion, and FIG. 38(*i*) is a perspective view viewed from an angle different from FIG. 38(*h*).
Figures 40A, 40B, 40C, 40D, 40E, 40F, 40G, 40H:
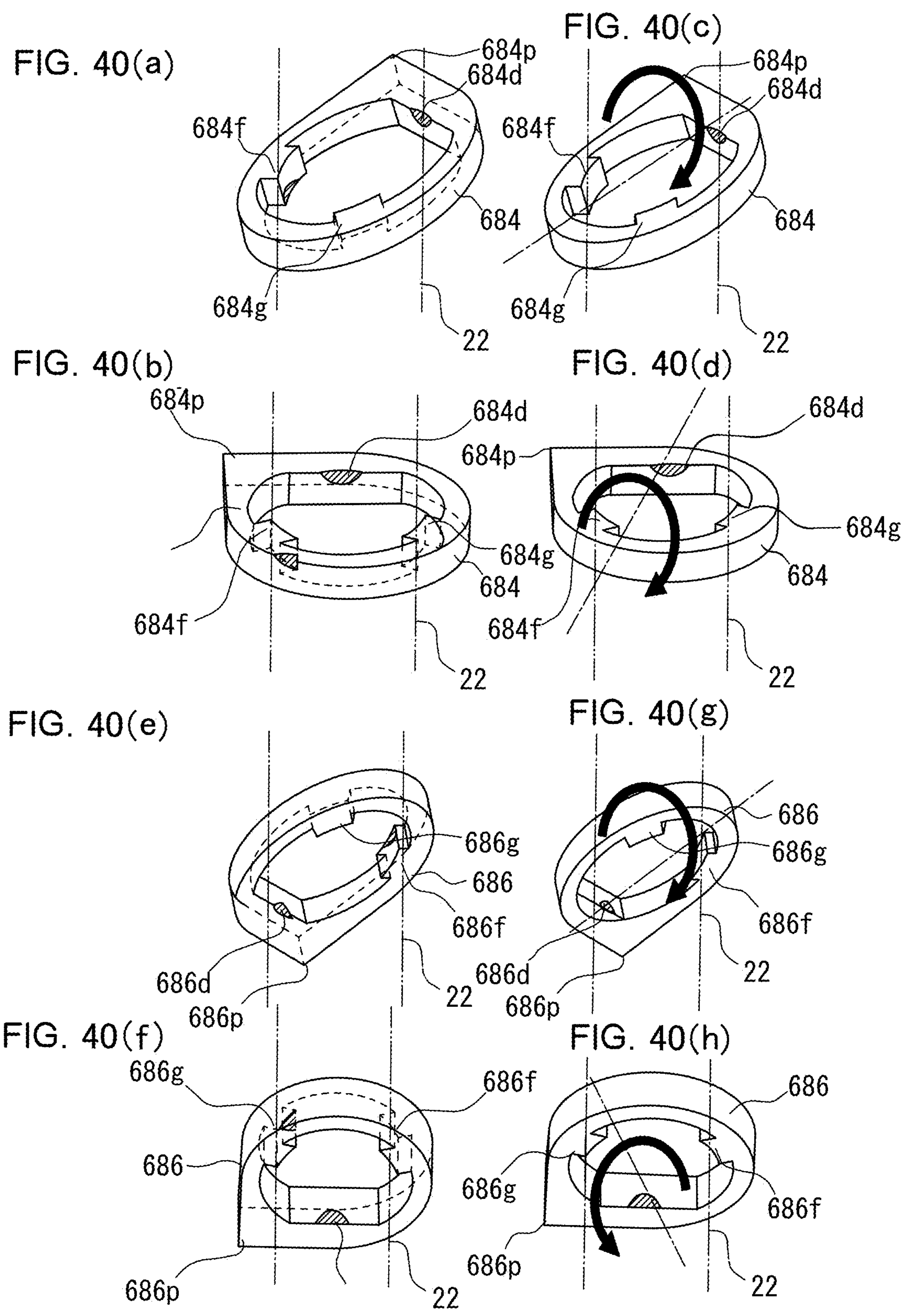
FIG. 40(*a*) is a perspective view illustrating a state of the first control body and the shaft-shaped portion in the second abutting state, FIG. 40(*b*) is a perspective view viewed from an angle different from FIG. 40(*a*), FIG. 40(*c*) is a perspective view illustrating a state in which the first control body and the shaft-shaped portion are switched from the second abutting state to the third abutting state, FIG. 40(*d*) is a perspective view illustrating a state viewed from an angle different from FIG. 40(*c*), FIG. 40(*e*) is a perspective view illustrating a state of the second control body and the shaft-shaped portion in the second abutting state, FIG. 40(*f*) is a perspective view viewed from an angle different from FIG. 40(*e*), FIG. 40(*g*) is a perspective view illustrating a state in which the second control body and the shaft-shaped portion are switched from the second abutting state to the third abutting state, and FIG. 40(*h*) is a perspective view illustrating a state viewed from an angle different from FIG. 40(*g*).

Meanwhile, when the pressing force onto the stopper member 640 is cancelled, etc., and the stopper member 640 is raised by the bias force by the biasing member 50 like an arrow B of FIG. 34 and FIG. 38, the second shaft insertion portion 640*a* provided in the stopper member main body 682 of the stopper member 640 interferes with the first shaft-shaped portion 22 and is brought into a pried state. Similarly, regarding the first control body 684 and the second control body 686 assembled to the stopper member main body 682, the shaft insertion holes 684*a*, 686*a* interfere with the first shaft-shaped portion 22 at parts illustrated by black dots in FIG. 34 or parts highlighted in FIG. 38(*b*), FIG. 38(*c*), and are brought into a pried state. Thereby, the coupling device 610 (coupling structure 601) is brought into a state in which the axial movement of the first shaft-shaped portion 22 is regulated.

Further in detail, when the pressing force onto the stopper member 640 is cancelled and the shaft insertion holes 684*a*, 686*a* interfere with the first shaft-shaped portion 22, the first control body 684 and the second control body 686 are pushed by the first shaft-shaped portion 22 in the direction illustrated by an arrow C of FIG. 34(*b*) and arrows in FIG. 39(*a*), FIG. 39(*g*). At this time, a state of being pushed against the first shaft-shaped portion 22, by moving in the turning direction like an arrow D of FIG. 34(*b*) and FIG. 39(*b*), FIG. 39(*h*) with corner portions of the first control body 684 and the second control body 686 serving as rotation base points, is brought about. Thereby, the first control body 684 and the second control body 686 interfere with the first shaft-shaped portion 22 at points in the circumferential direction and are brought into a pried state. Therefore, the lock mechanism 680 is brought into a fixed state so that in the locked state, the movement in the direction toward the axial one side of the first shaft-shaped portion 22 is firmly restricted, and the movement in the direction toward the axial other side is restricted gently in comparison to the movement in the one direction. Also, the lock mechanism 680 is brought into a state in which turning of the coupling device 610 (coupling structure 601) with respect to the first shaft-shaped portion 22 is restricted in the locked state.

Figure 35A:
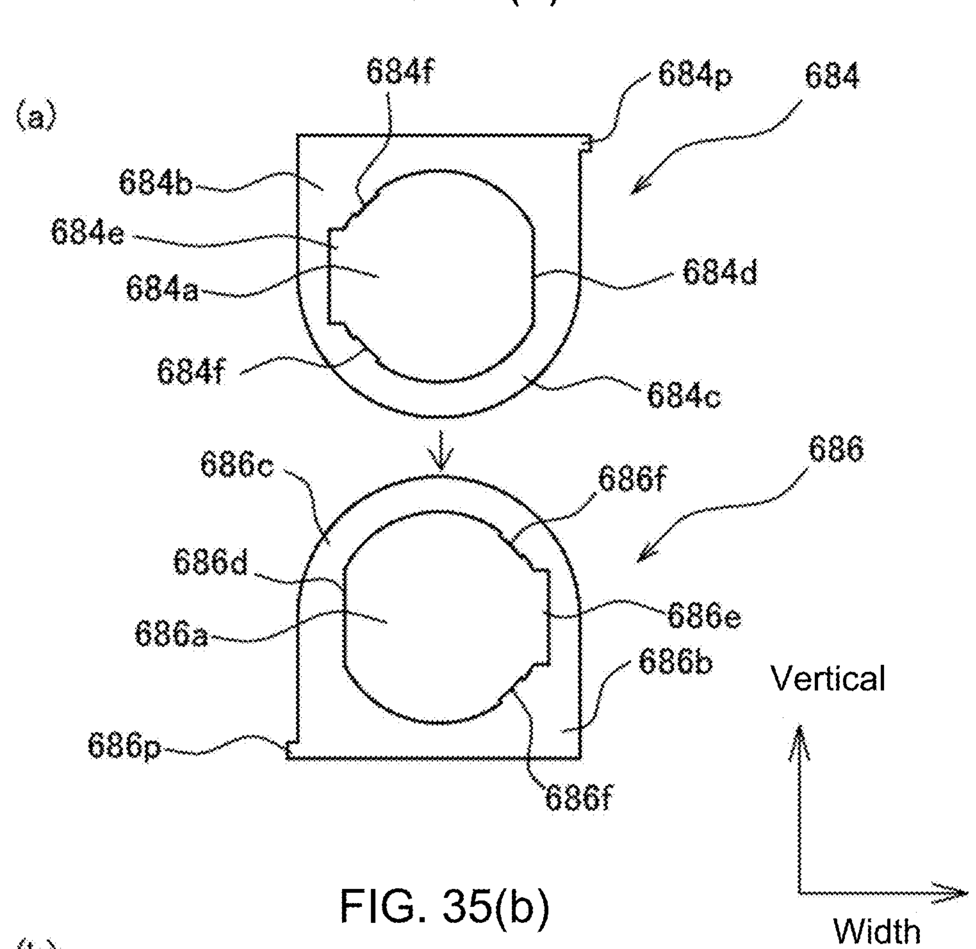
FIG. 35(*a*) is a plan view illustrating a first control body and a second control body used in the sixth embodiment, and FIG. 35(*b*) is a plan view illustrating a state in which the first control body and the second control body according to FIG. 35(*a*) are superimposed.
Figure 35B:
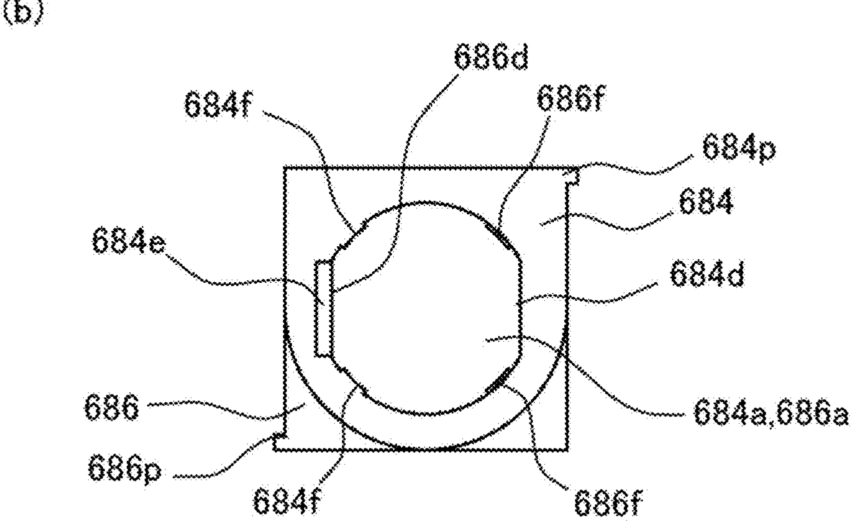

That is, as illustrated in FIG. 35(*a*), FIG. 37(*e*), FIG. 37(*g*), etc., the first control body 684 and the second control body 686 are configured by plate bodies whose one sides via the shaft insertion holes 684*a*, 686*a* provided in a substantially central portion are rectangular portions 684*b*, 686*b* formed in a rectangular shape and whose other sides are arc-shaped portions 684*c*, 686*c* formed in an arc shape respectively in a plan view. Also, the first control body 684 and the second control body 686 have fulcrum point portions 684*p*, 686*p* that project on the outer side in the width direction in parts on one side in the width direction among parts formed in the rectangular portions 684*b*, 686*b*. The fulcrum point portions 684*p*, 686*p* are provided in outer edge parts that extend in the direction intersecting the width directions of the first control body 684 and the second control body 686 (hereinafter, also called as the "vertical direction") in the rectangular portions 684*b*, 686*b*, and project in the width direction.

Also, the shaft insertion holes 684*a*, 686*a* have shaft interference portions 684*d*, 686*d* formed so that inner peripheral surfaces extend linearly toward the direction intersecting the width directions of the first control body 684 and the second control body 686 (hereinafter, also called as the "vertical direction") on the side where the fulcrum point portions 684*p*, 686*p* are provided. Further, the first control body 684 and the second control body 686 have bulged portions 684*e*, 686*e* formed in a shape in which the shaft insertion holes 684*a*, 686*a* are bulged toward the outer side at positions on the opposite side in the width direction with respect to the shaft interference portions 684*d*, 686*d*. Further, in the first control body 684, shaft abutting portions 684*f*, 684*g* that project toward the inner side of the shaft insertion hole 684*a* are provided at positions adjacent to one side and the other side in the circumferential direction of the shaft insertion hole 684*a* with respect to the bulged portion 684*e*. Similarly, in the second control body 686, shaft abutting portions 686*f*, 686*g* that project toward the inner side of the shaft insertion hole 686*a* are provided at positions adjacent to one side and the other side in the circumferential direction of the shaft insertion hole 686*a* with respect to the bulged portion 686*e*.

Figures 36A, 36B, 36C:
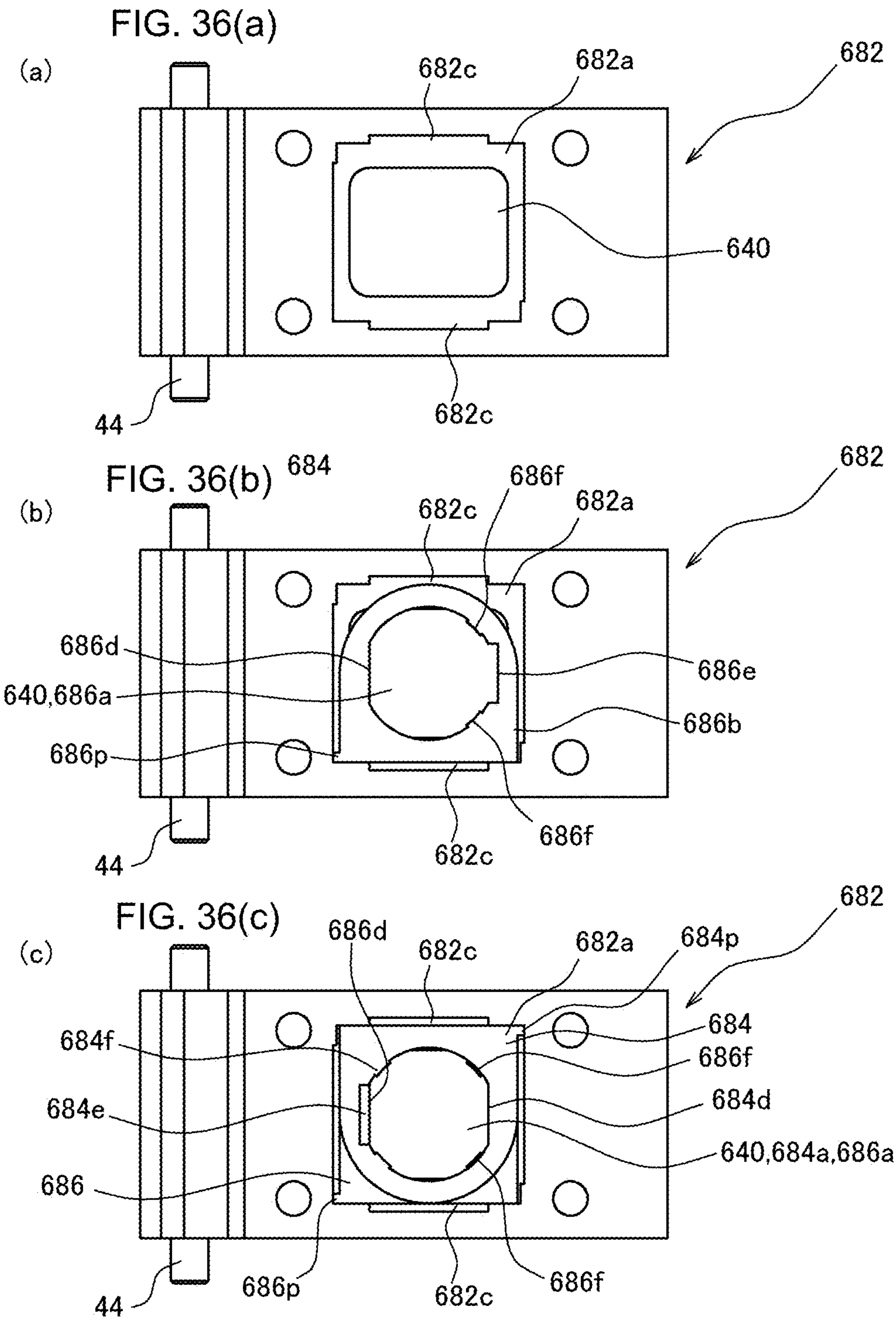
FIG. 36(*a*) is a plan view illustrating a stopper member main body used in the sixth embodiment, FIG. 36(*b*) is a plan view illustrating a state in which the second control body is set on the stopper member main body illustrated in FIG. 36(*a*), and FIG. 36(*c*) is a plan view illustrating a state in which the first control body and the second control body are superimposed and set on the stopper member main body illustrated in FIG. 36(*a*).

As illustrated in FIG. 36(*c*), the accommodating portion 682*a* of the stopper member main body 682 has a size that the first control body 684 and the second control body 686 described above can be accommodated in a superimposed state. Specifically, as illustrated in FIG. 35(*b*) and FIG. 36(*c*), the first control body 684 and the second control body 686 are brought into a superimposed state in which directions are reversed from each other in the vertical direction, and the directions are also reversed from each other in the width direction. Also, the first control body 684 and the second control body 686 are in a posture in which one side in the width direction faces the outside projecting portion 44 side serving as a swing fulcrum point of the stopper member main body 682, and the other end side faces the side serving as a working point of a force onto the stopper member main body 682. The first control body 684 and the second control body 686 are brought into a superimposed state in such a way, and accommodated in the accommodating portion 682*a*. That is, when the second control body 686 is accommodated in the accommodating portion 682*a* having a shape as in FIG. 36(*a*), the state as in FIG. 36(*b*) is obtained. The first control body 684 is set inside the accommodating portion 682*a* by accommodating in the accommodating portion 682*a* as in FIG. 36(*a*) by accommodating to be superimposed on the second control body 686 that is accommodated in the accommodating portion 682*a* in advance as in FIG. 36(*b*), or by being superimposed on the second control body 686 in advance in an exterior of the accommodating portion 682*a*. Thereby, as in FIG. 36(*c*), the first control body 684 and the second control body 686 are accommodated in the accommodating portion 682*a* in a superimposed state in which the directions are reversed from each other in the vertical direction, and the directions are also reversed from each other in the width direction.

Figures 42A, 42B:
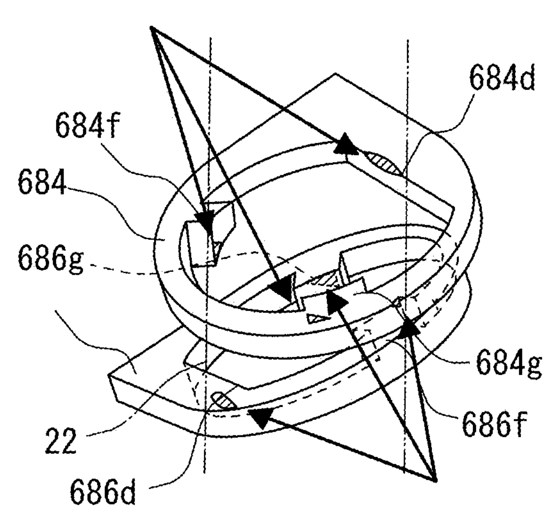
FIG. 42(*a*) is a perspective view illustrating a state in which the first control body and the second control body, and the shaft-shaped portion reach the third abutting state while illustrating an action to reach the third abutting state with arrows, and FIG. 42(*b*) is a perspective view illustrating a state in which the first control body and the second control body, and the shaft-shaped portion are brought into the third abutting state.

Instead of the superimposed state in which the directions are reversed from each other in the vertical direction, and the directions are also reversed from each other in the width direction as described above, the first control body 684 and the second control body 686 can also be configured to be accommodated in the accommodating portion 682*a* so that while the directions in the width direction are reversed from each other and the directions in the vertical direction are the same as each other as illustrated in FIG. 42(*b*), etc., for example. By such a configuration, when the first control body 684 and the second control body 686 are brought into a state as in FIG. 42(*b*) in accordance with turning and swing as described in detail later, the first control body 684 and the second control body 686 are brought into an interfering state (pried state) with respect to each other, and a twist effect is enhanced. Thereby, the lock mechanism 680 is furthermore firmly fixed.

When the first control body 684 and the second control body 686 are arranged as described above, the second shaft insertion portion 640*a* of the stopper member 640 and the shaft insertion holes 684*a*, 686*a* provided in the first control body 684 and the second control body 686 are accommodated in the accommodating portion 682*a* in a communicating state. In a state in which the first control body 684 and the second control body 686 are accommodated in the accommodating portion 682*a* in such a way, clearances are formed on one side and the other side in the width direction of the first control body 684 and the second control body 686. Also, the accommodating portion 682*a* has an arc-shaped portion accommodating portion 682*c* formed so that leading end parts of the arc-shaped portions 684*c*, 686*c* of the first control body 684 and the second control body 686 are housed. Therefore, the first control body 684 and the second control body 686 are turnable about the shaft insertion holes 684*a*, 686*a* within a range in which outer edge parts of the control bodies 684 and 686 do not interfere with an inner edge portion of the accommodating portion 682*a*.

In a state in which the first shaft-shaped portion 22 is inserted into the second shaft insertion portion 640*a* and the shaft insertion holes 684*a*, 686*a*, and in a state in which the stopper member 640 is raised by the bias force by the biasing member 50 like the arrow B of FIG. 34 and FIG. 38, as illustrated in FIG. 34 and FIG. 38, the first shaft-shaped portion 22 interferes with inner edge portions (shaft interference portions 684*d*, 686*d*) of the shaft insertion holes 684*a*, 686*a*, and the first control body 684 and the second control body 686 abut against the first shaft-shaped portion 22 at the interference points (first abutting state). In the first abutting state, a force in the direction illustrated by the arrow C of FIG. 34 and in the direction illustrated by arrows in FIG. 39(*a*) and FIG. 39(*g*) acts on the first control body 684. In accordance with this, the fulcrum point portion 684*p* abuts against the inner edge portion of the accommodating portion 682*a*, and the first control body 684 turns with this as a fulcrum point as illustrated by the arrow D of FIG. 34 and arrows of FIG. 39(*b*), FIG. 39(*d*), FIG. 39(*h*), FIG. 39(*j*). Also, the second control body 686 also turns in the direction reversed from the first control body 684 with the fulcrum point portion 686*p* as a fulcrum point. When the first control body 684 and the second control body 686 perform such an action, while maintaining a state in which the first control body 684 and the second control body 686 interfere in the shaft interference portions 684*d*, 686*d*, the shaft abutting portions 684*f*, 686*f* abut against the outer peripheral surface of the first shaft-shaped portion 22 (second abutting state) (see FIG. 39(*e*), FIG. 39(*f*), FIG. 39(*k*), FIG. 39(*l*)).

Figures 41A, 41B, 41C, 41D, 41E, 41F, 41G, 41H:
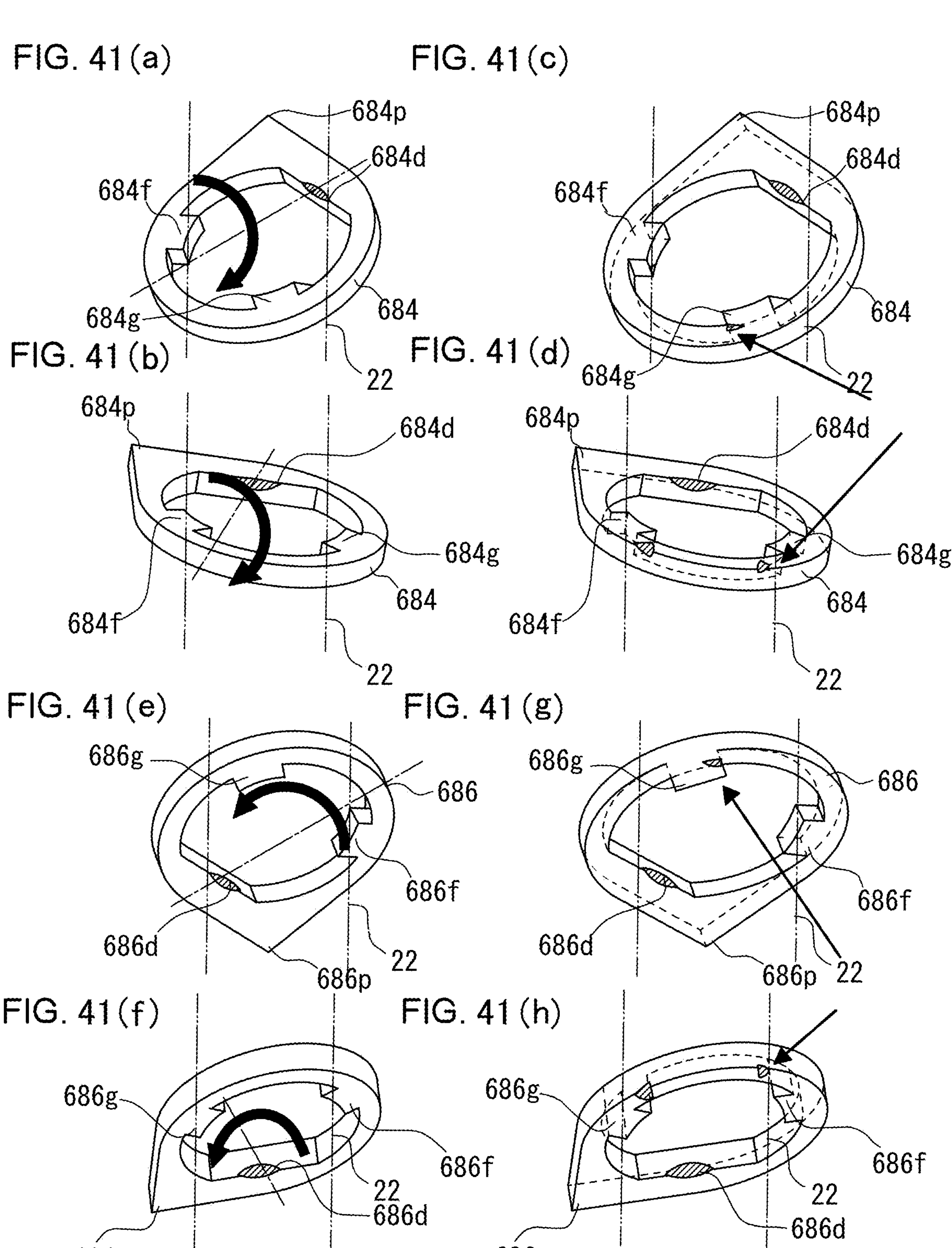
FIG. 41(*a*) and FIG. 41(*b*) are perspective views illustrating a state in which the first control body and the shaft-shaped portion are switched from the second abutting state to the third abutting state, FIG. 41(*c*) and FIG. 41(*d*) are perspective views illustrating a state in which the first control body and the shaft-shaped portion are brought into the third abutting state, FIG. 41(*e*) and FIG. 41(*f*) are perspective views illustrating a state in which the second control body and the shaft-shaped portion are switched from the second abutting state to the third abutting state, and FIG. 41(*g*) and FIG. 41(*h*) are perspective views illustrating a state in which the second control body and the shaft-shaped portion are brought into the third abutting state.

When the first control body 684 abuts against the first shaft-shaped portion 22 in the shaft interference portion 684*d* and the shaft abutting portion 684*f* as described above, as illustrated in FIG. 40, the first control body 684 swings about the swing axis (illustrated by a broken line in FIG. 40, etc.) intersecting the axis of the first shaft-shaped portion 22 with two points of the shaft interference portion 684*d* and the shaft abutting portion 684*f* as the swing fulcrum points due to the influence of the bias force by the biasing member 50. Thereby, as illustrated in FIG. 41, the first control body 684 abuts against the first shaft-shaped portion 22 in the shaft abutting portion 684*g* in addition to the shaft interference portion 684*d* and the shaft abutting portion 684*f* (third abutting state). Similarly, when the second control body 686 abuts against the first shaft-shaped portion 22 in the shaft interference portion 686*d* and the shaft abutting portion 686*f*, the second control body 686 swings about the swing axis intersecting the axis of the first shaft-shaped portion 22 with two points of the shaft interference portion 686*d* and the shaft abutting portion 686*f* as the swing fulcrum points due to the influence of the bias force by the biasing member 50. Thereby, the second control body 686 abuts against the first shaft-shaped portion 22 in the shaft abutting portion 686*g* in addition to the shaft interference portion 686*d* and the shaft abutting portion 686*f* (third abutting state).

When the first control body 684 is brought into the third abutting state as described above, the first control body 684 is brought into a fixed state at a plurality of points (three points in the present embodiment/points indicated by arrows in FIG. 42(*b*)) separated in both the circumferential direction and the axis direction of the first shaft-shaped portion 22 by the shaft interference portion 684*d*, the shaft abutting portion 684*f*, and the shaft abutting portion 684*g*. Similarly, when the second control body 686 is brought into the third abutting state, the second control body 686 is brought into a fixed state at a plurality of points (three points in the present embodiment) separated in both the circumferential direction and the axis direction of the first shaft-shaped portion 22 by the shaft interference portion 686*d*, the shaft abutting portion 686*f*, and the shaft abutting portion 686*g*. Therefore, the lock mechanism 680 is brought into a fixed state with respect to the first shaft-shaped portion 22 at the sum (six points) of the plurality (three) of fixing points configured by the first control body 684 and the plurality (three) of fixing points configured by the second control body 686. Also, the fixing points formed in the third abutting state exist at positions separated from each other in any one of or both of the circumferential direction and the axis direction of the first shaft-shaped portion 22. Therefore, in the third abutting state, the lock mechanism 680 is brought into a fixed state so that the movement in the direction toward the axial one side of the first shaft-shaped portion 22 is firmly restricted, and the movement in the direction toward the axial other side is restricted gently in comparison to the movement in the one direction. Also, the lock mechanism 680 is brought into a state in which turning of the coupling device 610 (coupling structure 601) with respect to the first shaft-shaped portion 22 is restricted in the third abutting state.

Also, as illustrated in FIG. 42(*a*), the lock mechanism 680 is accommodated in the accommodating portion 682*a* in a state in which the first control body 684 and the second control body 686 adjacent in the insertion direction of the first shaft-shaped portion 22 are superimposed so that the turning direction at the time of turning in the direction around the axis of the first shaft-shaped portion 22 due to the influence of the bias force by the biasing member 50 and the swing direction at the time of swinging in the direction intersecting the axis of the first shaft-shaped portion 22 are the opposite directions. Thereby, the first control body 684 and the second control body 686 can smoothly act with respect to each other, and can abut against the first shaft-shaped portion 22 at the plurality of points separated in the axis direction and the circumferential direction of the first shaft-shaped portion 22, and firmly fixed.

It is noted that in the embodiment described above, the example in which the two control bodies 684, 686 are provided is shown. However, the present invention is not limited to this but the coupling structure 601 and the coupling device 610 can include only one of the control bodies 684, 686 or can further include a control body having a similar configuration in addition to the control bodies 684, 686 (include three or more control bodies).

It is noted that in the example illustrated in FIG. 30 to FIG. 42, the coupling device 610 (coupling structure 601) having the configuration in which the stopper member 640 is provided instead of the stopper member 40 while most configurations are similar to the coupling device 10 (coupling structure 1). However, the present invention is not limited to this. Specifically, it is possible to adopt the stopper member 240 and the stopper member 440 that exert the same or similar functions as or to the lock mechanism 680 as well as the stopper member 640 while most configurations are similar to the coupling device 210 (coupling structure 201), the coupling device 310 (coupling structure 301), the coupling device 410 (coupling structure 401), and the coupling device 510 (coupling structure 501).

Actions and Effects: The coupling device 10, 210, 310, 410, 510, 610 and the coupling structure 1, 201, 301, 401, 501, 601 that configures the coupling device exemplified in each of the embodiments described above include characteristic configurations as the following (a) to (j), and can exert the following particular actions and effects by the characteristic configurations.

(a) The coupling structure 1, 201, 301, 401, 501, 601 described above, capable of coupling the support object 24, which is the object of support, to the support device 20 that supports the support object 24, the coupling structure is characterized by including the lock mechanism 60 capable of switching between the locked state in which the axial movement of the first shaft-shaped portion 22 of shaft shape provided in the support device 20 is suppressed and the unlocked state in which the axial movement is permitted, the coupling structure being characterized in that the lock mechanism 60 includes the stopper member 40, 240, 440 that includes the second shaft insertion portion 40*a*, 240*a*, 440*a* (lock mechanism 60 shaft insertion portion) into which the first shaft-shaped portion 22 is inserted and that is made swingable with respect to the first shaft-shaped portion 22 in a state in which the first shaft-shaped portion 22 is inserted into the second shaft insertion portion 40*a*, 240*a*, 440*a* (lock mechanism shaft insertion portion), and the biasing member 50 that biases the stopper member 40, 240, 440 in the axis direction of the first shaft-shaped portion 22 inserted into the second shaft insertion portion 40*a*, 240*a*, 440*a* (lock mechanism shaft insertion portion), and in a state in which the first shaft-shaped portion 22 is inserted into the second shaft insertion portion 40*a*, 240*a*, 440*a* (lock mechanism shaft insertion portion), when the stopper member 40, 240, 440 is biased in the axis direction and the stopper member 40, 240, 440 is brought into contact with the first shaft-shaped portion 22 at the first contact portion P and the second contact portion Q which is placed on the opposite side of the first contact portion P across the axial center position of the first shaft-shaped portion 22 and separated from the first contact portion P in the axis direction, the coupling structure 1, 201, 301, 401, 501, 601 is brought into the locked state, and when the stopper member 40, 240, 440 is pressed and swung against the bias force by the biasing member 50 in the locked state, the contact at the first contact portion P and the second contact portion Q is cancelled, and the coupling structure 1, 201, 301, 401, 501, 601 is brought into the unlocked state.

The coupling structure 1, 201, 301, 401, 501, 601 includes the lock mechanism 60, and can be switched between the locked state in which the axial movement of the first shaft-shaped portion 22 provided in the support device 20 is regulated and the unlocked state in which the axial movement of the first shaft-shaped portion 22 is permitted.

In the coupling structure 1, 201, 301, 401, 501, 601, in a state in which the first shaft-shaped portion 22 is inserted into the second shaft insertion portion 40*a*, 240*a*, 440*a* (lock mechanism shaft insertion portion) provided in the stopper member 40, 240, 440 that configures the lock mechanism 60, while the bias force in the axis direction acts on the stopper member 40, 240, 440, when the stopper member 40, 240, 440 is brought into contact with (interferes with) the first shaft-shaped portion 22 at the first contact portion P and the second contact portion Q which is placed on the opposite side of the first contact portion P across the axial center position of the first shaft-shaped portion 22 and separated from the first contact portion P in the axis direction, and is brought into a pried state. Thereby, the coupling structure 1, 201, 301, 401, 501, 601 is brought into the locked state, the axial movement of the first shaft-shaped portion 22 is suppressed, and the coupling structure 1, 201, 301, 401, 501, 601 is brought into a static state. Also, a force acting on the coupling structure 1, 201, 301, 401, 501, 601 in the fall direction by the gravity is transmitted as a force that pushes the stopper member 40, 240, 440 against the first shaft-shaped portion 22. Therefore, since the stopper member 40, 240, 440 is brought into a pushed state while being in a pried state with respect to the first shaft-shaped portion 22, the coupling structure 1, 201, 301, 401, 501, 601 less easily falls even when receiving a little impact or vibration. Therefore, when the coupling structure 1, 201, 301, 401, 501, 601 is brought into the locked state, it is possible to suppress a fall that is unexpected to the user.

Also, in the coupling structure 1, 201, 301, 401, 501, 601, by pressing the stopper member 40, 240, 440 against the bias force by the biasing member 50 and swinging the stopper member 40, 240, 440, it is possible to cancel the contact between the stopper member 40, 240, 440 and the first shaft-shaped portion 22 at the first contact portion P and the second contact portion Q and bring the coupling structure 1, 201, 301, 401, 501, 601 into the unlocked state. Therefore, by bringing the coupling structure 1, 201, 301, 401, 501, 601 into the unlocked state, it is possible to smoothly move in the axis direction of the first shaft-shaped portion 22.

(b) The coupling structure 1, 201, 301, 401, 501, 601 is characterized by having the main body portion 30, 230, 320, 420, 520 to which the stopper member 40, 240, 440 and the biasing member 50 are assembled, the coupling structure being characterized in that the main body portion 30, 230, 320, 420, 520 has the first shaft insertion portion 30*a*, 230*a*, 430*a* (main body shaft insertion portion) into which the first shaft-shaped portion 22 is inserted and swingably supports the stopper member 40, 240, 440, by biasing the stopper member 40, 240, 440 in the axis direction in a state in which the first shaft-shaped portion 22 is inserted into both the second shaft insertion portion 40*a*, 240*a*, 440*a* (lock mechanism shaft insertion portion) and the first shaft insertion portion 30*a*, 230*a*, 430*a* (main body shaft insertion portion), the lock mechanism 60 is brought into the locked state, and by pressing and swinging the stopper member 40, 240, 440 against the bias force by the biasing member 50 in the locked state, the lock mechanism 60 is brought into the unlocked state.

In a case of the configuration as in (b) described above, the coupling structure 1, 201, 301, 401, 501, 601 has the main body portion 30, 230, 320, 420, 520 to which the stopper member 40, 240, 440 and the biasing member 50 are assembled, and by inserting the first shaft-shaped portion 22 into both the second shaft insertion portion 40*a*, 240*a*, 440*a* (lock mechanism shaft insertion portion) provided in the stopper member 40, 240, 440 and the first shaft insertion portion 30*a*, 230*a*, 430*a* (main body shaft insertion portion) provided in the main body portion 30, 230, 320, 420, 520, the coupling structure 1, 201, 301, 401, 501, 601 is coupled to the first shaft-shaped portion 22. Therefore, in the coupling structure 1, 201, 301, 401, 501, 601, by inserting the first shaft-shaped portion 22 into the first shaft insertion portion 30*a*, 230*a*, 430*a* (main body shaft insertion portion), it is possible to perform the operation of the stopper member 40, 240, 440, etc., in a stable state. Therefore, in the coupling structure 1, 201, 301, 401, 501, 601, it is possible to stably perform the operation of the stopper member 40, 240, 440, etc.

(c) The coupling structure 1, 201, 301, 401, 501, 601 is characterized by having the pressing portion 46 for making the pressing force act on the stopper member 40, 240, 440, and the opposing portion 34 positioned on the opposite side of the pressing portion 46 in the direction in which the pressing force acts, the coupling structure being characterized in that when the user places his/her first finger onto the pressing portion 46 and places the finger different from the first finger onto the opposing portion 34, the user can perform a pressing operation of making the pressing force act on the stopper member 40, 240, 440 while gripping with one hand.

By the configuration as in (c) described above, in the coupling structure 1, 201, 301, 401, 501, 601, when the user places the finger different from the first finger onto the opposing portion 34 while placing the first finger onto the pressing portion 46, it is possible to stably perform the operation of the stopper member 40, 240, 440 with one hand.

(d) The coupling structure 401 is characterized by having the rod-shaped main-body-side gripping portion 420*a* (handle portion) and the lever-shaped stopper gripping portion 440*b* (lever portion) that can perform the operation of directly or indirectly swinging the stopper member 440, the coupling structure being characterized in that the coupling structure 401 can be operated in the direction of bringing the stopper gripping portion 440*b* (lever portion) close to and away from the main-body-side gripping portion 420*a* (handle portion).

By the configuration as in (d) described above, in the coupling structure 401, by gripping and operating the stopper gripping portion 440*b* (lever portion) in a state in which the palm of the user is placed onto the main-body-side gripping portion 420*a* (handle portion) and the finger is placed onto the stopper gripping portion 440*b* (lever portion), it is possible to swing the stopper portion and perform an operation of switching the lock mechanism 60 portion from the locked state to the unlocked state. Also, in a state of being gripped as described above and the lock mechanism 60 portion is brought into the unlocked state, the coupling structure 401 can be moved along the first shaft-shaped portion 22. Therefore, by the configuration as in (d) described above, in the coupling structure 401, it is possible to improve an operativity.

(e) Preferably, the coupling structure 201, 301, 501 is characterized by having the main body portion 230, 320, 520 to which the stopper member 240 and the biasing member 50 are assembled, and the falling-off suppression mechanism 280, 380, 580 (intersecting direction movement regulating portion), the coupling structure being characterized in that the first shaft insertion portion 230*a* (main body shaft insertion portion) into which the first shaft-shaped portion 22 is inserted in the main body portion 230, 320, 520, and the second shaft insertion portion 240*a* (lock mechanism shaft insertion portion) into which the first shaft-shaped portion 22 is inserted in the lock mechanism 60 are brought into a state in which the first shaft-shaped portion 22 is inserted by inserting the first shaft-shaped portion 22 in the direction intersecting the axis direction of the first shaft-shaped portion 22, and the falling-off suppression mechanism 280, 380, 580 (intersecting direction movement regulating portion) regulates relative movement of the main body portion 230, 320, 520 with respect to the first shaft-shaped portion 22 in the direction intersecting the axis direction of the first shaft-shaped portion 22.

By the configuration as in (e) described above, the coupling structure 201, 301, 501 can be attached to and detached from the first shaft-shaped portion 22 when the first shaft-shaped portion 22 which is an object of coupling enters and exits from the side (direction intersecting the axis direction of the first shaft-shaped portion 22) with respect to the first shaft insertion portion 230*a* (main body shaft insertion portion) and the second shaft insertion portion 240*a* (lock mechanism shaft insertion portion). Therefore, the coupling structure 201, 301, 501 can be attached to and detached from a position such as an intermediate portion in the axis direction without moving in the axis direction of the first shaft-shaped portion 22. Therefore, the coupling structure 201, 301, 501 can be favorably utilized for use of attaching to and detaching from the intermediate portion in the axis direction of the first shaft-shaped portion 22 in a state in which the coupling structure 201, 301, 501 cannot be attached and detached by moving in the axis direction of the first shaft-shaped portion 22, for example, when other tools, etc., are already attached.

Also, the coupling structure 201, 301, 501 includes the falling-off suppression mechanism 280, 380, 580 (intersecting direction movement regulating portion) as in (e) described above, and can regulate the relative movement of the main body portion 230, 320, 520 with respect to the first shaft-shaped portion 22 in the direction intersecting the axis direction of the first shaft-shaped portion 22. Thereby, in a state in which the coupling structure 201, 301, 501 is attached to the first shaft-shaped portion 22, it is possible to suppress the fall that is unexpected to the user.

(f) Preferably, the coupling structure 201, 301, 501 is characterized in that the first shaft insertion portion 230*a* (main body shaft insertion portion) has the main body shaft receiving portion 230*b* that is open in the direction intersecting the axis direction of the first shaft-shaped portion 22, the second shaft insertion portion 240*a* (lock mechanism shaft insertion portion) has the lock mechanism shaft receiving portion 240*b* that is open in the direction intersecting the axis direction of the first shaft-shaped portion 22, and the falling-off suppression mechanism 280, 380, 580 (intersecting direction movement regulating portion) can perform the operation of switching between the regulated state in which the entrance and the exit of the first shaft-shaped portion 22 via the main body shaft receiving portion 230*b* and the lock mechanism shaft receiving portion 240*b* are regulated and the regulation cancelled state in which the entrance and the exit of the first shaft-shaped portion 22 via the main body shaft receiving portion 230*b* and the lock mechanism shaft receiving portion 240*b* are permitted.

In a case of the configuration as in (f) described above, when the falling-off suppression mechanism 280, 380, 580 (intersecting direction movement regulating portion) is brought into the regulation cancelled state, and the first shaft-shaped portion 22 which is the object of coupling enters and exits from the side (direction intersecting the axis direction of the first shaft-shaped portion 22) with respect to the first shaft insertion portion 230*a* (main body shaft insertion portion) and the second shaft insertion portion 240*a* (lock mechanism shaft insertion portion), the coupling structure 201, 301, 501 can be attached to and detached from the first shaft-shaped portion 22. Also, in the coupling structure 201, 301, 501, when the falling-off suppression mechanism 280, 380, 580 (intersecting direction movement regulating portion) is brought into the regulated state, it is possible to suppress the first shaft-shaped portion 22 from getting out from the first shaft insertion portion 230*a* (main body shaft insertion portion) and the second shaft insertion portion 240*a* (lock mechanism shaft insertion portion) via the main body shaft receiving portion 230*b* and the lock mechanism shaft receiving portion 240*b*. Thereby, in a state in which the coupling structure 201, 301, 501 is attached to the first shaft-shaped portion 22, it is possible to suppress the fall that is unexpected to the user.

(g) Preferably, the coupling structure 501 is characterized in that the falling-off suppression mechanism 580 (intersecting direction movement regulating portion) has the moving body 582 that is movable in the direction of advancing toward and exiting from the entrance/exit path of the first shaft-shaped portion 22 via the main body shaft receiving portion 230*b* and the lock mechanism shaft receiving portion 240*b*, and the switching mechanism 584 that is capable of switching between the movement regulated state in which the movement of the moving body 582 is regulated and the movement permitted state in which the movement of the moving body 582 is permitted, and the switching operation portion 586 for performing the operation of the switching mechanism 584 can be operated in conjunction with the operation of swinging the stopper member 240.

By the configuration as in (g) described above, in the coupling structure 501, by performing the operation of swinging the stopper member 240 (swinging operation), it is possible to operate the switching operation portion 586 in conjunction with this and also switch the state of the switching mechanism 584. Therefore, with the coupling structure 501, it is possible to make the operativity higher than a case of the configuration in which the operation of the switching operation portion 586 is required separately to the operation of the stopper member 240.

(h) Preferably, the coupling structure 501 is characterized in that the pressing portion 586*a* that is capable of switching from the movement regulated state to the movement permitted state by making the pressing force act is provided as the switching operation portion 586, the pressing portion 586*a* is provided in the movable region of the stopper member 240, and when the stopper member 240 is pressed and swung against the bias force by the biasing member 50 further beyond the position where the lock mechanism 60 is switched from the locked state to the unlocked state, the pressing force acts on the pressing portion 586*a* from the stopper member 240, and the switching mechanism 584 is capable of switching from the movement regulated state to the movement permitted state.

By the configuration as in (h) described above, in the coupling structure 501, by performing the operation of swinging the stopper member 240 (swinging operation), it is possible to operate the pressing portion 586*a* that functions as the switching operation portion 586 in conjunction with this and switch the switching mechanism 584 from the movement regulated state to the movement permitted state. Therefore, with the coupling structure 501, it is possible to make the operativity higher than a case of the configuration in which the operation of the switching operation portion 586 is required separately to the operation of the stopper member 240.

(i) The coupling device 10, 210, 310, 410, 510, 610 is characterized by including the coupling structure 1, 201, 301, 401, 501, 601 according to Claim 1 or 2, the coupling device being capable of coupling the support object 24, which is the object of support, to the support device 20 that supports the support object 24 by being placed between the support object 24 and the support device 20, the coupling device 10, 210, 310, 410, 510, 610 being characterized by including the second coupling portion 72 coupled to the support object 24.

In a case of the configuration as in (i) described above, in the coupling device 10, 210, 310, 410, 510, 610, by coupling to the support object 24 in the second coupling portion 72 while coupling to the first shaft-shaped portion 22 provided in the support device 20, it is possible to couple the support object 24 to the support device 20.

(j) The coupling device 10, 210, 310, 410, 510, 610 capable of coupling the support object 24, which is the object of support, to the support device 20 that supports the support object 24 by being placed between the support object 24 and the support device 20, the coupling device 10, 210, 310, 410, 510, 610 being characterized by including the first coupling portion coupled to the first shaft-shaped portion 22 of shaft shape provided in the support device 20, and the second coupling portion 72 coupled to the second shaft-shaped portion of shaft shape provided in the support object 24, the coupling device being characterized in that at least one of the first coupling portion and the second coupling portion 72 includes the lock mechanism 60 capable of switching between the locked state in which the axial movement of the first shaft-shaped portion 22 which is the object of coupling among the first shaft-shaped portion 22 and the second shaft-shaped portion and the unlocked state in which the axial movement is permitted, the lock mechanism 60 includes the accommodating portion including the first shaft insertion portion 30*a*, 230*a*, 430*a* into which the first shaft-shaped portion 22 is inserted, the stopper member 40, 240, 440 that includes the second shaft insertion portion 40*a*, 240*a*, 440*a* into which the first shaft-shaped portion 22 inserted into the first shaft insertion portion 30*a*, 230*a*, 430*a* is inserted and that is made swingable inside the accommodating portion, and the biasing member 50 that biases the stopper member 40, 240, 440 in the axis direction of the first shaft-shaped portion 22 inserted into the first shaft insertion portion 30*a*, 230*a*, 430*a* and the second shaft insertion portion 40*a*, 240*a*, 440*a*, and in a state in which the first shaft-shaped portion 22 is inserted into the first shaft insertion portion 30*a*, 230*a*, 430*a* and the second shaft insertion portion 40*a*, 240*a*, 440*a*, when the stopper member 40, 240, 440 is biased in the axis direction and the stopper member 40, 240, 440 is brought into contact with the first shaft-shaped portion 22 at the first contact portion P and the second contact portion Q which is separated from the first contact portion P in the axis direction, the coupling device 10, 210, 310, 410, 510, 610 is brought into the locked state, and when the stopper member 40, 240, 440 is pressed against the bias force by the biasing member 50 in the locked state, the contact at the first contact portion P and the second contact portion Q is cancelled, and the coupling device 10, 210, 310, 410, 510, 610 is brought into the unlocked state.

The coupling device 10, 210, 310, 410, 510, 610 includes the lock mechanism 60, and can be switched between the locked state in which the axial movement of the first shaft-shaped portion 22 which is the object of coupling is regulated and the unlocked state in which the axial movement of the first shaft-shaped portion 22 is permitted.

Here, in the coupling device 10, 210, 310, 410, 510, 610, in a state in which the first shaft-shaped portion 22 is inserted into the first shaft insertion portion 30*a*, 230*a*, 430*a* and the second shaft insertion portion 40*a*, 240*a*, 440*a*, while the bias force in the axis direction acts on the stopper member 40, 240, 440, the stopper member 40, 240, 440 is brought into contact with (interferes with) the first shaft-shaped portion 22 at the first contact portion P and the second contact portion Q, and is brought into a pried state. Thereby, the coupling device 10, 210, 310, 410, 510, 610 is brought into the locked state, the axial movement of the first shaft-shaped portion 22 is suppressed, and the coupling device 10, 210, 310, 410, 510, 610 is brought into a static state. Also, a force acting on the coupling device 10, 210, 310, 410, 510, 610 in the fall direction by the gravity is transmitted as the force that pushes the stopper member 40, 240, 440 against the first shaft-shaped portion 22. Therefore, since the stopper member 40, 240, 440 is brought into a pushed state, while being in a pried state, with respect to the first shaft-shaped portion 22, the coupling device 10, 210, 310, 410, 510, 610 less easily falls even when receiving a little impact or vibration. Therefore, when the coupling device 10, 210, 310, 410, 510, 610 is brought into the locked state, it is possible to suppress the fall that is unexpected to the user.

Also, in the coupling device 10, 210, 310, 410, 510, 610, by pressing the stopper member 40, 240, 440 against the bias force by the biasing member 50 and swinging the stopper member 40, 240, 440, it is possible to cancel the contact between the stopper member 40, 240, 440 and the first shaft-shaped portion 22 at the first contact portion P and the second contact portion Q and can bring about the unlocked state. Therefore, by bringing the coupling device 10, 210, 310, 410, 510, 610 into the unlocked state, it is possible to smoothly move in the axis direction of the first shaft-shaped portion 22.

(k) The coupling structure 601 according to an embodiment of the present invention and the coupling device 610 including the coupling structure, capable of coupling the support object 24, which is the object of support, to the support device 20 that supports the support object 24, the coupling structure and the coupling device being characterized by including the lock mechanism 680 capable of switching between the locked state in which the axial movement of the first shaft-shaped portion 22 of shaft shape provided in the support device 20 is suppressed and the unlocked state in which the axial movement is permitted, the coupling structure and the coupling device being characterized in that the lock mechanism 680 includes the control body (also referred to as the first control body 684, the second control body 686/"control bodies 684, 686" simply) that includes the shaft insertion portion (also referred to as the second shaft insertion portion 640*a*/"shaft insertion portion 640*a*" simply) into which the first shaft-shaped portion 22 is inserted and that is made swingable with respect to the first shaft-shaped portion 22 in a state in which the first shaft-shaped portion 22 is inserted into the shaft insertion portion 640*a*, and the biasing member 50 that exerts the bias force in the direction of swinging the control bodies 684, 686 inserted into the shaft insertion portion 640*a*, and when the control bodies 684, 686 swing due to the influence of the bias force by the biasing member 50, and the control bodies 684, 686 swing about the swing axis intersecting the axis of the first shaft-shaped portion 22 while turning in the direction around the axis of the first shaft-shaped portion 22 inserted into the shaft insertion portion 640*a*, and interferes with the first shaft-shaped portion 22 and is brought into a pried state, the coupling structure and the coupling device are brought into the locked state.

By the configuration as in (k) described above, when the control bodies 684, 686 that form the lock mechanism 680 swing due to the influence of the bias force by the biasing member 50, the coupling structure 601 and the coupling device 610 are brought into the third abutting state from the first abutting state via the second abutting state. Thereby, when the control bodies 684, 686 abut at the points in the circumferential direction and the axis direction of the first shaft-shaped portion 22 and interfere with the first shaft-shaped portion 22 and are brought into a pried state, the coupling structure 601 and the coupling device 610 are brought into the locked state. Therefore, by bringing the coupling structure 601 and the coupling device 610 into the locked state, it is possible to suppress turning in the circumferential direction while in a state in which the coupling structure 601 and the coupling device 610 are fixed in the axis direction with respect to the first shaft-shaped portion 22.

(l) The coupling structure 601 according to an embodiment of the present invention and the coupling device 610 including the coupling structure is the coupling structure 601 capable of coupling the support object 24, which is the object of support, to the support device 20 that supports the support object 24, the coupling structure being characterized by including the lock mechanism 680 capable of switching between the locked state in which the axial movement of the first shaft-shaped portion 22 of shaft shape provided in the support device 20 is suppressed and the unlocked state in which the axial movement is permitted, the coupling structure being characterized in that the lock mechanism 680 includes the control bodies 684, 686 that include the shaft insertion portion 640*a* into which the first shaft-shaped portion 22 is inserted and that are made swingable with respect to the first shaft-shaped portion 22 in a state in which the first shaft-shaped portion 22 is inserted into the shaft insertion portion 640*a*, and the biasing member 50 that exerts the bias force in the direction of swinging the control bodies 684, 686 inserted into the shaft insertion portion 640*a*, the shaft interference portions 684*d*, 686*d* (first abutting portion), the shaft abutting portions 684*f*, 686*f* (second abutting portion), and the shaft abutting portions 684*g*, 686*g* (third abutting portion) capable of abutting against the outer peripheral surface of the first shaft-shaped portion 22 inserted into the shaft insertion portion 640*a* when the control bodies 684, 686 swing due to the influence of the bias force by the biasing member 50 are provided at positions separated from each other in the circumferential direction of the shaft insertion portion 640*a*, and the coupling structure is brought into the locked state by being brought into the first abutting state in which the shaft interference portions 684*d*, 686*d* (first abutting portion) abut against the outer peripheral surface of the first shaft-shaped portion 22 when the control bodies 684, 686 are inclined with respect to the first shaft-shaped portion 22 due to the influence of the bias force by the biasing member 50, by being brought into the second abutting state in which the shaft abutting portions 684*f*, 686*f* (second abutting portion) abut against the outer peripheral surface of the first shaft-shaped portion 22 when the control bodies 684, 686 turn in the direction around the axis of the first shaft-shaped portion 22 with the position where the control bodies 684, 686 are out of the shaft interference portions 684*d*, 686*d* (first abutting portion) due to the influence of the bias force by the biasing member 50 as a turning fulcrum point in the first abutting state, and by being brought into the third abutting state in which the control bodies 684, 686 interfere with the first shaft-shaped portion 22 in the shaft interference portions 684*d*, 686*d* (first abutting portion), the shaft abutting portions 684*f*, 686*f* (second abutting portion), and the shaft abutting portions 684*g*, 686*g* (third abutting portion) when, in the second abutting state, the control bodies 684, 686 swing about the swing axis intersecting the axis of the first shaft-shaped portion 22 with the points where the shaft interference portions 684*d*, 686*d* (first abutting portion) and the shaft abutting portions 684*f*, 686*f* (second abutting portion) respectively abut against the outer peripheral surface of the first shaft-shaped portion 22 as the swing fulcrum point due to the influence of the bias force by the biasing member 50, and the shaft abutting portions 684*g*, 686*g* (third abutting portion) abut against the outer peripheral surface of the first shaft-shaped portion 22.

By the configuration as in (l) described above, when the control bodies 684, 686 that form the lock mechanism 680 swing due to the influence of the bias force by the biasing member 50, the coupling structure 601 and the coupling device 610 are brought into the third abutting state from the first abutting state via the second abutting state. Thereby, in the coupling structure 601 and the coupling device 610, the control bodies 684, 686 act in a behavior such as to wind around the first shaft-shaped portion 22 and are brought into an abutting state at the points in the circumferential direction and the axis direction of the first shaft-shaped portion 22. As a result, the control bodies 684, 686 interfere with the first shaft-shaped portion 22 and are brought into a pried state, and the coupling structure 601 and the coupling device 610 are brought into the locked state. Thereby, by bringing the coupling structure 601 and the coupling device 610 into the locked state, it is possible to fix the coupling structure 601 and the coupling device 610 so that the movement in the direction toward the axial one side of the first shaft-shaped portion 22 is firmly restricted, and the movement in the direction toward the axial other side is restricted gently in comparison to the movement in the one direction. Also, in the coupling structure 601 and the coupling device 610, it is possible to suppress turning in the circumferential direction.

(m) As described above, preferably, in the coupling structure 601 and the coupling device 610 including the coupling structure, the lock mechanism 680 has the accommodating portion 682*a* that accommodates the plurality of (two in the embodiment described above) control bodies 684, 686, and inside the accommodating portion 682*a*, the first control body 684 and the second control body 686 adjacent the insertion direction of the first shaft-shaped portion 22 are accommodated in a superimposed state so that the turning direction at the time of turning in the direction around the axis of the first shaft-shaped portion 22 due to the influence of the bias force by the biasing member 50, and the swing direction at the time of swinging in the direction intersecting the axis of the first shaft-shaped portion 22 are opposing directions.

By the configuration as in (m) described above, in the coupling structure 601 and the coupling device 610, the first control body 684 and the second control body 686 that configure a plurality of the control bodies can smoothly act with respect to each other, and can abut against the first shaft-shaped portion 22 at the plurality of points separated in the axis direction and the circumferential direction of the first shaft-shaped portion 22, and firmly fixed.

(n) As described above, preferably, in the coupling structure 601 and the coupling device 610 including the coupling structure, at the time of bringing the first control body 684 and the second control body 686 from the second abutting state to the third abutting state, actions of the first control body 684 and the second control body 686 in the direction of separating in the axis direction of the first shaft-shaped portion 22 are restricted by the accommodating portion 682*a*.

By the configuration as in (n) described above, in the coupling structure 601 and the coupling device 610, the first control body 684 and the second control body 686 arranged so as to be superimposed act on each other at the time of bringing the control bodies from the second abutting state to the third abutting state. Thereby, the first control body 684 and the second control body 686 are brought into a state in which the control bodies more firmly abut against the first shaft-shaped portion 22. Therefore, by the configuration as in (n) described above, in the coupling structure 601 and the coupling device 610, it is possible to furthermore improve a fixing strength with respect to the first shaft-shaped portion 22 at the time of the locked state.

(o) As described above, preferably, in the coupling structure 601 and the coupling device 610 including the coupling structure, the lock mechanism 680 has the accommodating portion 682*a* that accommodates the control bodies 684, 686, and the control bodies 684, 686 have inner wall abutting portions that abut against an inner wall portion of the accommodating portion 682*a* when the control bodies 684, 686 swing due to the influence of the bias force by the biasing member 50, and turn in the direction around the axis of the first shaft-shaped portion 22 inserted into the shaft insertion portion 640*a* with abutting points of the inner wall portion of the accommodating portion 682*a* and the inner wall abutting portions as a turning fulcrum point.

By the configuration as in (o) described above, in the coupling structure 601 and the coupling device 610, it is possible to smoothly and reliably turn the control bodies 684, 686.

The inventions according to (k) to (o) described above are not limited to the configurations exemplified in the sixth embodiment described above but can be appropriately combined with the configurations according to the first embodiment to the fifth embodiment described above. For example, the inventions according to (k) to (o) described above or the configurations of the lock mechanism 680, etc., according to the sixth embodiment that embodies the inventions may be added as configurations according to the first embodiment to the fifth embodiment, or may be applied instead of part of the configurations according to the first embodiment to the fifth embodiment.

It is noted that the embodiments described above only show examples of the present invention, and it is possible to appropriately make changes, additions, omissions, etc., of configurations within a range not departing from the gist of the present invention. For example, the coupling structure and the coupling device of the present invention may include all of the characteristic configurations according to (a) to (o) described above, may include any one of the configurations, may include a combination of a plurality of the configurations, or may include other configurations in addition to the characteristic configurations according to (a) to (o). Also, the embodiments described above exemplify that the coupling structure is applied to the coupling device. However, the coupling structure may not only be used for coupling the support object, which is the object of support, to the support device that supports the support object by being placed between the support object and the support device but also configure part of a device or a tool itself to be coupled to the support device that supports the support object, for example. Also, the support object is not limited to the physicochemical instrument, the experimental tool, etc., which are described above.

The present invention is not limited to the embodiments described above and ones shown as modified examples, etc., but may include other embodiments from the teachings and spirit of the claims within a range not departing from the scope of the claims. The constituent elements of the embodiments described above may be arbitrarily selected, combined, and configured. Also, an arbitrary constituent element of the embodiments may be arbitrarily combined and configured with an arbitrary element including an arbitrary constituent element described herein, or a constituent element that embodies an arbitrary constituent element described herein.

What is claimed:

1. A coupling structure configured to couple a support object to a support device that supports the support object, the coupling structure comprising:

a lock mechanism configured to switch between a locked state in which axial movement of a shaft-shaped portion provided in the support device is restricted and an unlocked state in which the axial movement is permitted, wherein the lock mechanism comprises:

an accommodating portion;

a plurality of control bodies including a first control body and a second control body;

each of the control bodies including a shaft insertion portion configured to receive the shaft-shaped portion; and a biasing member configured to exert a biasing force, wherein each of the first control body and the second control body is configured to swing with respect to the shaft-shaped portion when the shaft-shaped portion is received in the shaft insertion portion, wherein the first control body and the second control body are arranged adjacent to each other in an insertion direction of the shaft-shaped portion and are accommodated in the accommodating portion in an overlapping state, wherein, in response to the biasing force, causes each of the control bodies is configured to:

(i) swing with respect to the shaft-shaped portion about a swing axis intersecting an axis of the shaft-shaped portion; and (ii) rotate with respect to the shaft-shaped portion about the axis of the shaft-shaped portion, wherein the first control body and the second control body are configured such that a rotation direction and a swing direction of the first control body are opposite to a rotation direction and a swing direction of the second control body, and wherein the biasing force causes the control bodies to interfere with the shaft-shaped portion to establish a pried state that restricts axial movement of the shaft-shaped portion, thereby placing the coupling structure in the locked state.

2. The coupling structure according to claim 1, wherein:

wherein each control body has an inner wall abutting portion that abuts against an inner wall portion of the accommodating portion when the control body swings due to the influence of the bias force by the biasing member, and rotates in the direction around the axis of the shaft-shaped portion inserted into the shaft insertion portion with an abutting point of the inner wall portion of the accommodating portion and the inner wall abutting portion of the control body as a rotating fulcrum.

3. A coupling structure configured to couple a support object to a support device that supports the support object, the coupling structure comprising:

a lock mechanism configured to switch between a locked state in which axial movement of a shaft-shaped portion provided in the support device is restricted and an unlocked state in which the axial movement is permitted, wherein the lock mechanism comprises:

an accommodating portion;

a plurality of control bodies including a first control body and a second control body;

each of the control bodies including a shaft insertion portion configured to receive the shaft-shaped portion; and a biasing member configured to exert a biasing force, wherein each of the control bodies includes a first abutting portion, a second abutting portion, and a third abutting portion arranged at positions spaced apart from one another in a circumferential direction of the shaft insertion portion, each of the abutting portions being configured to abut against an outer peripheral surface of the shaft-shaped portion when the control body is acted upon by the biasing force, wherein, in response to the biasing force, each control body is configured to:

(i) incline relative to the shaft-shaped portion such that the first abutting portion abuts the outer peripheral surface to establish a first abutting state;

(ii) turn about an axis of the shaft-shaped portion from the first abutting state to bring the second abutting portion into abutment with the outer peripheral surface to establish a second abutting state; and (iii) swing about a swing axis intersecting the axis of the shaft-shaped portion, with the first and second abutting portions serving as fulcrum points, to bring the third abutting portion into abutment with the outer peripheral surface to establish a third abutting state in which the control body interferes with the shaft-shaped portion, wherein the first control body and the second control body are arranged adjacent to each other in an insertion direction of the shaft-shaped portion and are accommodated in the accommodating portion in a superimposed state such that a rotation direction and a swing direction of the first control body are opposite to a rotation direction and a swing direction of the second control body, and wherein, in the third abutting state, the control bodies restrict axial movement of the shaft-shaped portion to place the coupling structure in the locked state.

4. The coupling structure according to claim 3 wherein at the time of bringing the first control body and the second control body from the second abutting state to the third abutting state, actions of the first control body and the second control body in a direction of separating in a direction of the axis of the shaft-shaped portion are restricted by the accommodating portion.

5. The coupling structure according to claim 3, wherein:

wherein each control body has an inner wall abutting portion that abuts against an inner wall portion of the accommodating portion when the control body swings due to the influence of the bias force by the biasing member, and rotates in the direction around the axis of the shaft-shaped portion inserted into the shaft insertion portion with an abutting point of the inner wall portion of the accommodating portion and the inner wall abutting portion of the control body as a rotating fulcrum.

* * * * *